US012770869B2

(12) United States Patent
Kushida et al.

(10) Patent No.: US 12,770,869 B2
(45) Date of Patent: Oct. 20, 2026

(54) ELECTRODE COMPOSITION, ELECTRODE SHEET FOR ALL-SOLID STATE SECONDARY BATTERY, AND ALL-SOLID STATE SECONDARY BATTERY, AND MANUFACTURING METHODS FOR ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Yo Kushida, Kanagawa (JP); Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 687 days.

(21) Appl. No.: 18/302,796

(22) Filed: Apr. 19, 2023

(65) Prior Publication Data

US 2023/0275221 A1 Aug. 31, 2023

Related U.S. Application Data

(63) Continuation of application No. PCT/JP2021/038802, filed on Oct. 20, 2021.

(30) Foreign Application Priority Data

Oct. 23, 2020 (JP) ................................ 2020-177998

(51) Int. Cl.
*H01M 4/38* (2006.01)
*H01M 4/02* (2006.01)
(Continued)

(52) U.S. Cl.
CPC ....... *H01M 4/386* (2013.01); *H01M 10/0525* (2013.01); *H01M 10/0562* (2013.01);
(Continued)

(58) Field of Classification Search
CPC .......................... H01M 4/386; H01M 10/0562
See application file for complete search history.

(56) References Cited

U.S. PATENT DOCUMENTS 6,200,707 B1 3/2001 Takada et al.
10,541,399 B2 1/2020 Lee et al.
(Continued)

FOREIGN PATENT DOCUMENTS

JP H1186899 3/1999
JP 2007087881 4/2007
(Continued)

OTHER PUBLICATIONS

Shen, et al. Journal of The Electrochemical Society, 166 (14) A3182-A3188 (Year: 2019).*
(Continued)

*Primary Examiner* — Sadie White
(74) *Attorney, Agent, or Firm* — JCIPRNET

(57) ABSTRACT

There is provided an electrode composition that contains a polymer binder a polymer binder constituted by containing an inorganic solid electrolyte, an active material, and a linear polymer, and contains a dispersion medium, where in the electrode composition, a rotation radius α of the polymer binder and converted median diameters $D_{50}$ of the inorganic solid electrolyte and the active material are present within a region (including a boundary line) of a polygonal shape having a point A to a point E as apices, in an orthogonal coordinate system in which the rotation radius α is on an x-axis and the median diameter $D_{50}$ is on a y-axis. There are also provided an electrode sheet for an all-solid state secondary battery and an all-solid state secondary battery, and manufacturing methods for an electrode sheet for an all-solid state secondary battery and an all-solid state secondary battery, in which the electrode composition is used.

12 Claims, 3 Drawing Sheets

(51) Int. Cl.
*H01M 10/0525* (2010.01)
*H01M 10/0562* (2010.01)

(52) U.S. Cl.
CPC ............................ *H01M 2004/027* (2013.01); *H01M 2004/028* (2013.01); *H01M 2300/0068* (2013.01)

(56) References Cited

U.S. PATENT DOCUMENTS

| | | | | |
|---|---|---|---|---|
| 2010/0003515 | A1* | 1/2010 | Tanaka | D01F 6/18 526/341 |
| 2014/0004257 | A1* | 1/2014 | Kubo | H01M 10/0562 427/126.1 |
| 2014/0030304 | A1* | 1/2014 | Koltzenburg | D06M 13/432 514/642 |
| 2016/0164105 | A1* | 6/2016 | Yoon | H01M 4/136 427/126.6 |
| 2017/0088690 | A1* | 3/2017 | Feldhues | C08K 5/103 |
| 2017/0133717 | A1* | 5/2017 | Makino | H01M 10/0562 |
| 2018/0090787 | A1 | 3/2018 | Makino et al. | |
| 2019/0148733 | A1* | 5/2019 | Oura | H01M 10/0562 429/479 |
| 2020/0227726 | A1 | 7/2020 | Suzuki et al. | |

FOREIGN PATENT DOCUMENTS

| | | |
|---|---|---|
| JP | 2020074277 | 5/2020 |
| WO | 2017018456 | 2/2017 |
| WO | 2019087750 | 5/2019 |

OTHER PUBLICATIONS

Lee, et al. Journal of The Electrochemical Society, 164 (9) A2075-A2081 (Year: 2017).*
Bielefeld, et al. J. Phys. Chem. C, 123, 1626â1634 (Year: 2019).*
"International Search Report (Form PCT/ISA/210) of PCT/JP2021/038802", mailed on Dec. 7, 2021, with English translation thereof, pp. 1-5.
"Written Opinion of the International Searching Authority (Form PCT/ISA/237) of PCT/JP2021/038802", mailed on Dec. 7, 2021, with English translation thereof, pp. 1-6.

* cited by examiner

ELECTRODE COMPOSITION, ELECTRODE SHEET FOR ALL-SOLID STATE SECONDARY BATTERY, AND ALL-SOLID STATE SECONDARY BATTERY, AND MANUFACTURING METHODS FOR ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2021/038802 filed on Oct. 20, 2021, which claims priority under 35 U.S.C. § 119 (a) to Japanese Patent Application No. 2020-177998 filed in Japan on Oct. 23, 2020. Each of the above applications is hereby expressly incorporated by reference, in its entirety, into the present application.

BACKGROUND OF THE INVENTION

1. Field of the Invention

The present invention relates to an electrode composition, an electrode sheet for an all-solid state secondary battery, and an all-solid state secondary battery, and manufacturing methods for an electrode sheet for an all-solid state secondary battery and an all-solid state secondary battery.

2. Description of the Related Art

In an all-solid state secondary battery, all of a negative electrode, an electrolyte, and a positive electrode consist of solid, and the all-solid state secondary battery can greatly improve safety and reliability, which are said to be problems to be solved in a secondary battery in which an organic electrolytic solution is used. It is also said to be capable of extending the battery life. Furthermore, all-solid state secondary batteries can be provided with a structure in which the electrodes and the electrolyte are directly disposed in series. As a result, it is possible to increase the energy density to be high as compared with a secondary battery in which an organic electrolytic solution is used, and thus the application to electric vehicles, large-sized storage batteries, and the like is anticipated.

In such an all-solid state secondary battery, examples of substances that form constitutional layers (a solid electrolyte layer, a negative electrode active material layer, a positive electrode active material layer, and the like) include an inorganic solid electrolyte, an active material such as a negative electrode active material or a positive electrode active material, and the like. In recent years, an inorganic solid electrolyte among them, particularly an oxide-based inorganic solid electrolyte or a sulfide-based inorganic solid electrolyte is expected as an electrolyte material having a high ion conductivity comparable to that of the organic electrolytic solution.

Therefore, in order to realize a high ion conductivity required as the basic performance of the all-solid state secondary battery, a material containing the above-described inorganic solid electrolyte and active material has been proposed as a material that forms a negative electrode active material layer or a positive electrode active material layer. For example, JP1999-086899A (JP-H11-086899A) discloses "a slurry containing a solid electrolyte and a specific polymer", where the slurry uses, as "the specific polymer", "a hydrogenated block copolymer obtained by hydrogenating a linear or branched block copolymer that consists of" (A) a block consisting of polybutadiene having a 1,2-vinyl bond content of 15% or less and (B) a block consisting of 50% to 100% by weight of butadiene and 0% to 50% by weight of another monomer and consists of a block consisting of a butadiene (co)polymer having a 1,2-vinyl bond content of butadiene part of 20% to 90% and having (A)/(B)=5/95 to 70/30 (in terms of % by weight)". In addition, WO2017/018456A1 discloses "a solid electrolyte composition containing at least one dendritic polymer selected from the group consisting of a dendron, a dendrimer, and a hyper-branched polymer, and an inorganic solid electrolyte having an ion conductivity of a metal belonging to Group 1 or Group 2 of the periodic table", where the dendritic polymer in solid electrolyte composition has a specific functional group.

SUMMARY OF THE INVENTION

By the way, an interfacial contact state between solid particles is restricted in a constitutional layer that is formed of solid particles such as an inorganic solid electrolyte, an active material, or a conductive auxiliary agent. Therefore, even in a case where the solid particles themselves that form the constitutional layer are those that can exhibit a high ion conductivity, the interface resistance of the solid particles increases and the electron conductivity and the ion conductivity decrease, and thus a large current cannot be taken out (discharged) from the all-solid state secondary battery.

By the way, in a case where an active material layer is formed of a material (also referred to as an electrode material) containing an inorganic solid electrolyte and an active material, the dripping of the applied electrode material (a phenomenon in which an electrode material flows and a shape of an edge of a coating layer collapses (a decrease in thickness)) occurs in the electrode material in the related art in a case where a film of the electrode material is formed on a base material. This dripping is likely to occur in the vicinity of both edges in the width direction of the electrode material applied in a sheet shape. In order to suppress the occurrence of this dripping, it is effective to increase the viscosity (increase the concentration) of the electrode material; however, in such a case, the coating unevenness (the non-uniformity of the layer thickness) occurs in the coating layer of the electrode material. This coating unevenness is likely to occur in the vicinity of the center in the width direction of the electrode material applied in a sheet shape.

In recent years, the development for practical use of an all-solid state secondary battery has been rapidly progressing, and as a countermeasure corresponding to this progress, it has been desired to improve an all-solid state secondary battery from both the viewpoints of battery performance (an increase in energy density) and industrial manufacturing. In order to increase the energy density of the all-solid state secondary battery, it is effective to increase the layer thickness of the active material layer, and as a means to achieve it, a film is formed, for example, by increasing the coating amount of the electrode material or increasing the concentration of solid contents. Even in the formation of a film of an active material layer having an increased layer thickness, it is advantageous from the viewpoint of industrial manufacturing that a film of an electrode material can be formed in a single film formation step. However, in a case where a coating amount of an electrode material having an increased concentration of solid contents in the related art or a coating amount of an electrode material in the related art is increased, dripping or coating unevenness occurs remarkably, and thus it is difficult to obtain a uniform and layer-thickened (film-thickened) active material layer having a predetermined shape in a film forming method in which an electrode material is applied and dried on a base material, in particular, in a film forming method in which a roll-to-roll method, which enables continuous film formation in a sheet shape and has high productivity, is applied.

As described above, there is a demand for an electrode material that is capable of suppressing the occurrence of dripping and the occurrence of coating unevenness in addition to improving the ion conductivity which is the basic performance of the all-solid state secondary battery, even in a case where it is applied to a film forming method. However, JP1999-086899A (JP-H11-086899A) and WO2017/018456A1 do not describe this viewpoint.

An object of the present invention is to provide an electrode composition that makes it possible to form an active material layer capable of exhibiting a high ion conductivity while being capable of suppressing the occurrence of dripping and coating unevenness during film formation. In addition, another object of the present invention is to provide an electrode sheet for an all-solid state secondary battery and an all-solid state secondary battery, and manufacturing methods for an electrode sheet for an all-solid state secondary battery and an all-solid state secondary battery, in which the above electrode composition is used.

From the viewpoints of the improvement of the coatability (dripping and coating unevenness) of the electrode composition and the constructability of the conduction path to be formed of solid particles in a case where the electrode composition is formed into an active material layer, the inventors of the present invention focused on a relationship between the inorganic solid electrolyte, the active material, and the polymer binder, which are used in the electrode composition and proceeded studies. As a result, it was found that in a case of setting the overall particle diameter (median diameter $D_{50}$) of the inorganic solid electrolyte and the active material, which are dispersed in the electrode composition and bound in the active material layer and the rotation radius α of the polymer binder constituted by containing a linear polymer, within a specific region described later, it is possible to suppress both the occurrence of dripping and the occurrence of coating unevenness of the electrode composition during film formation, and moreover, to construct sufficient ion conduction paths between solid particles. The present invention has been completed through further studies based on these findings.

That is, the above problems have been solved by the following means.

<1> An electrode composition comprising:

an inorganic solid electrolyte having an ion conductivity of a metal belonging to Group 1 or Group 2 in the periodic table;

an active material;

a polymer binder; and a dispersion medium, in which a linear polymer is contained to constitute the polymer binder, and a rotation radius α of the polymer binder in the dispersion medium and a median diameter $D_{50}$ obtained by converting, in terms of content, each of median diameters of the inorganic solid electrolyte and the active material are present within a region (provided that a boundary line is included) of a polygonal shape that has, as apices, a point A (50, 60), a point B (178, 4,600), a point C (85, 4,600), a point D (12, 2,000), and a point E (12, 60) in an orthogonal coordinate system in which the rotation radius α is on an x-axis and the median diameter $D_{50}$ is on a y-axis.

<2> The electrode composition according to <1>, in which an SP value of the linear polymer is 16 to 20 $MPa^{1/2}$.

<3> The electrode composition according to <1> or <2>, in which an adsorption rate of the polymer binder with respect to the active material in the dispersion medium is 40% or less.

<4> The electrode composition according to any one of <1> to <3>, in which the linear polymer contains a constitutional component having a functional group having a pKa of 8 or less.

<5> The electrode composition according to any one of <1> to <4>, in which the polymer binder is dissolved in the dispersion medium.

<6> The electrode composition according to any one of <1> to <5>, in which the active material has a silicon element as a constitutional element.

<7> The electrode composition according to any one of <1> to <6>, in which the inorganic solid electrolyte is a sulfide-based inorganic solid electrolyte.

<8> The electrode composition according to any one of <1> to <7>, in which an SP value of the dispersion is 14 to 24 $MPa^{1/2}$.

<9> An electrode sheet for an all-solid state secondary battery, comprising a layer formed of the electrode composition according to any one of <1> to <8>, on a surface of a base material.

<10> An all-solid state secondary battery comprising, in the following order:

a positive electrode active material layer;

a solid electrolyte layer; and a negative electrode active material layer, in which at least one layer of the positive electrode active material layer or the negative electrode active material layer is a layer formed of the electrode composition according to any one of <1> to <8>.

<11> A manufacturing method for an electrode sheet for an all-solid state secondary battery, the manufacturing method comprising forming a film of the electrode composition according to any one of <1> to <8>, on a surface of a base material.

<12> A manufacturing method for an all-solid state secondary battery, the manufacturing method comprising manufacturing an all-solid state secondary battery through the manufacturing method according to <11>.

The present invention can provide an electrode composition that makes it possible to form an active material layer capable of exhibiting a high ion conductivity while being capable of suppressing the occurrence of dripping and coating unevenness during film formation. In addition, according to the present invention, it is possible to provide an electrode sheet for an all-solid state secondary battery and an all-solid state secondary battery, which have an active material layer formed of the above electrode composition. Further, according to the present invention, it is possible to provide manufacturing methods for an electrode sheet for an all-solid state secondary battery and an all-solid state secondary battery, in which the above electrode composition is used.

The above-described and other characteristics and advantages of the present invention will be further clarified by the following description with appropriate reference to the accompanying drawing.

DESCRIPTION OF THE PREFERRED EMBODIMENTS

Figure 1:
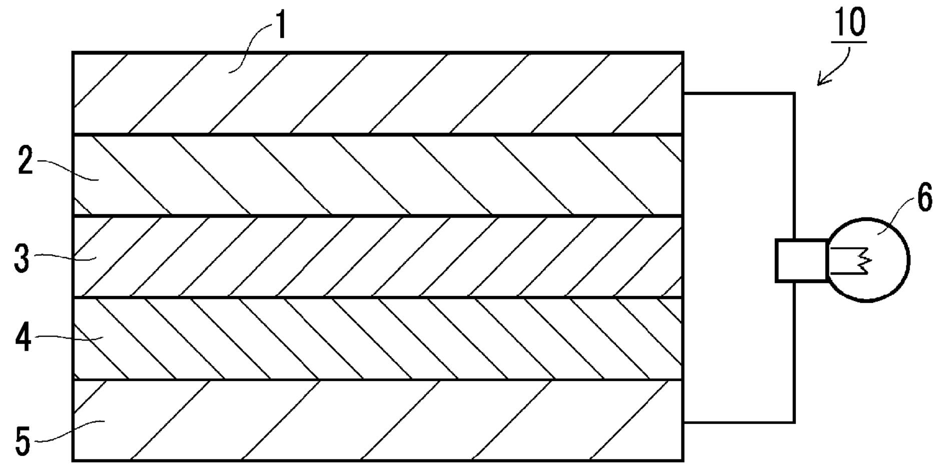
FIG. 1 is a vertical cross-sectional view schematically illustrating an all-solid state secondary battery according to a preferred embodiment of the present invention.

In the present invention, a numerical value range indicated using "to" means a range including numerical values before and after the "to" as the lower limit value and the upper limit value. In a case where a plurality of numerical value ranges are set and described for the content, physical properties, and the like of a component in the present invention, the upper limit value and the lower limit value, which form the numerical value range, are not limited to a specific combination of the upper limit value and the lower limit value and can be set to a numerical value range obtained by appropriately combining the upper limit value and the lower limit value of each numerical value range.

In the present invention, the expression of a compound (for example, in a case where a compound is represented by an expression in which "compound" is attached to the end) refers to not only the compound itself but also a salt or an ion thereof. In addition, this expression also refers to a derivative obtained by modifying a part of the compound, for example, by introducing a substituent into the compound within a range where the effect of the present invention is not impaired.

In the present invention, (meth)acryl means one or both of acryl and methacryl. The same applies to (meth)acrylate.

In the present invention, a substituent, a linking group, or the like (hereinafter, referred to as a substituent or the like), which is not specified regarding whether to be substituted or unsubstituted, may have an appropriate substituent. Accordingly, even in a case where a YYY group is simply described in the present invention, this YYY group includes not only an aspect not having a substituent but also an aspect having a substituent. The same shall be applied to a compound that is not specified regarding whether to be substituted or unsubstituted. Examples of the preferred substituent include a substituent Z described later.

In the present invention, in a case where a plurality of substituents or the like represented by a specific reference numeral are present or a plurality of substituents or the like are simultaneously or alternatively defined, the respective substituents or the like may be the same or different from each other. In addition, unless specified otherwise, in a case where a plurality of substituents or the like are adjacent to each other, the substituents may be linked or fused to each other to form a ring.

In the present invention, the polymer means a polymer; however, it has the same meaning as a so-called polymeric compound. In addition, a polymer binder (also simply referred to as a binder) means a binder formed of a polymer and includes a polymer itself and a binder constituted (formed) by containing a polymer.

In the present invention, a composition containing an inorganic solid electrolyte and an active material and used as a material (an active material layer forming material) that forms an active material layer of an all-solid state secondary battery is referred to as an electrode composition. On the other hand, a composition containing an inorganic solid electrolyte and used as a material that forms a solid electrolyte layer of an all-solid state secondary battery is referred to as an inorganic solid electrolyte-containing composition, where this composition generally does not contain an active material.

In the present invention, the electrode composition includes a positive electrode composition containing a positive electrode active material and a negative electrode composition containing a negative electrode active material. Therefore, any one of the positive electrode composition and the negative electrode composition, or collectively both of them may be simply referred to as an electrode composition, and any one of the positive electrode active material layer and the negative electrode active material layer, or collectively both of them may be simply referred to as an active material layer or an electrode active material layer. Further, in the present invention, any one of the positive electrode active material and the negative electrode active material, or collectively both of them may be simply referred to as an active material or an electrode active material.

[Electrode Composition]

An electrode composition according to the embodiment of the present invention contains an inorganic solid electrolyte having an ion conductivity of a metal belonging to Group 1 or Group 2 in the periodic table, an active material, a polymer binder, and a dispersion medium.

Figure 3:
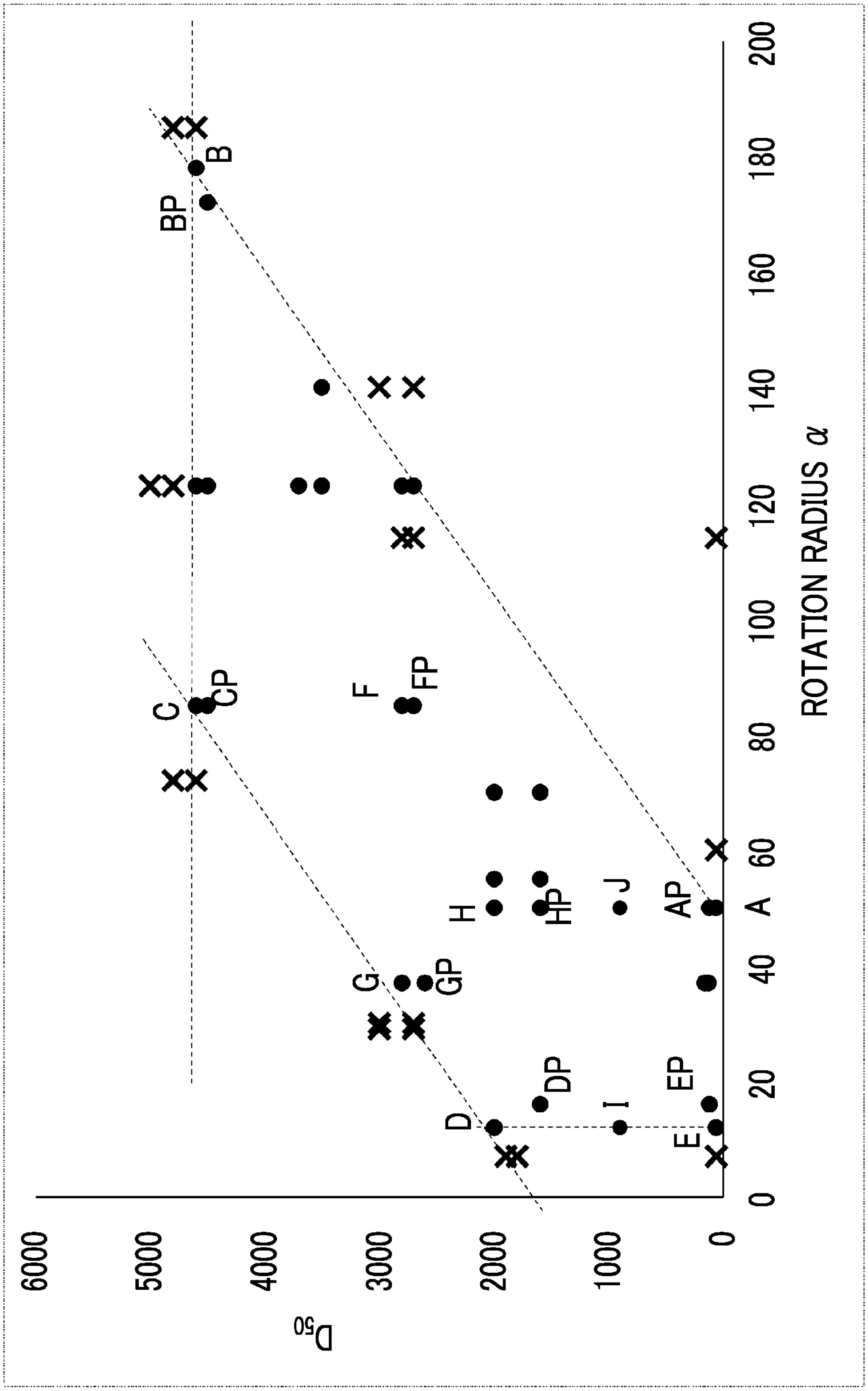
FIG. 3 is a graph showing a relationship between a median diameter $D_{50}$ and a rotation radius $\alpha$ in the present invention.

The electrode composition according to the embodiment of the present invention satisfies a relationship in which a rotation radius $\alpha$ of a polymer binder in the dispersion medium, the polymer binder being constituted by containing a linear polymer, and a median diameter $D_{50}$ obtained by converting each median diameters of the inorganic solid electrolyte (particles) and the active material (particles) in terms of the content (mass fraction) in the electrode composition are present within a region (provided that a boundary line is included) of a pentagonal shape that has, as apices, specific five points A to E described later in an orthogonal coordinate system in which the rotation radius $\alpha$ is on an x-axis and the median diameter $D_{50}$ is on a y-axis as shown in FIG. 3. The electrode composition according to the embodiment of the present invention that satisfies this relationship makes it possible to form an active material layer that is capable of exhibiting a high ion conductivity while being capable of suppressing the occurrence of dripping and coating unevenness during film formation. In addition, in a case of using this electrode composition as an active material layer forming material, it is possible to realize, even in a film forming method, an electrode sheet for an all-solid state secondary battery, which has an active material layer having a uniform layer thickness and a predetermined shape and capable of having an appropriately increased layer thickness on a base material surface, and furthermore, to realize an all-solid state secondary battery that exhibits a high ion conductivity (low resistance).

Although the details of the reason for the above are not yet clear, they are conceived to be as follows.

That is, since the polymer binder is constituted by containing a linear polymer and satisfies the relationship between the median diameter $D_{50}$ and the rotation radius $\alpha$, which will be described later, in a case where an inorganic solid electrolyte and an active material are formed into an active material layer without excessively coating the surface of solid particles such as the inorganic solid electrolyte and the active material in the electrode composition, it is possible to secure the contact between solid particles and construct sufficient conduction paths. In addition, since the inorganic solid electrolyte, the active material, and the polymer binder satisfy the relationship between the median diameter $D_{50}$ and the rotation radius $\alpha$, it is possible to set the size and the number (the number of molecules per contained mass) of the polymer binder with respect to the inorganic solid electrolyte and the active material in a well-balanced manner and to improve the dispersibility of the inorganic solid electrolyte and the active material while reducing excessive interaction between the polymer binders. As a result, it is possible to suppress an excessive increase in viscosity in the electrode composition and achieve both the fluidity during coating and the non-fluidity after coating in a well-balanced manner.

In this way, the electrode composition according to the embodiment of the present invention makes it possible to suppress the occurrence of dripping and coating unevenness during film formation, which provides a uniform layer thickness and a predetermined shape even in a film forming method, and moreover, to form an active material layer that is capable of exhibiting a high ion conductivity. Further, in this electrode composition, since the inorganic solid electrolyte, the active material, and the polymer binder satisfy the relationship between the median diameter $D_{50}$ and the rotation radius $\alpha$, the fluidity during coating and the non-fluidity after coating can be maintained even in a case where the contents of the inorganic solid electrolyte and the active material are increased. Therefore, even in a case of a layer-thickened active material layer or by a film forming method, for example, a roll-to-roll method having high productivity, it is possible to form an active material layer having a uniform layer thickness and a predetermined shape.

The relationship between the median diameter $D_{50}$ and the rotation radius $\alpha$, which the electrode composition according to the embodiment of the present invention should satisfy, will be described.

The rotation radius $\alpha$ of a polymer binder in the dispersion medium contained in the electrode composition, the polymer binder being constituted by containing a linear polymer, means the size of a polymer binder (a linear polymer molecule) in this dispersion medium, and the median diameter $D_{50}$ means the overall size of an inorganic solid electrolyte and an active material, on which the polymer binder acts in the electrode composition and an active material layer formed from the electrode composition. In addition, in the electrode composition, the rotation radius $\alpha$ also means the number of particles of the polymer binder present per unit mass, and the median diameter $D_{50}$ also means the total number of particles of the inorganic solid electrolyte and active material present per unit mass.

In the present invention, since the above-described relationship is satisfied, the size of the polymer binder, the sizes of the inorganic solid electrolyte and the active material, and the numbers of particles of the polymer binder, inorganic solid electrolyte, and active material present per unit mass are set in a well-balanced manner, and thus it is possible to achieve, as described above, both the high ion conductivity in the active material layer, and the fluidity during coating and the non-fluidity after coating in the electrode composition.

The rotation radius $\alpha$ and the median diameter $D_{50}$ satisfy a relationship in which they are present within a region (provided that a boundary line is included) of a pentagonal shape that has, as apices, a point A (50, 60), a point B (178, 4,600), a point C (85, 4,600), a point D (12, 2,000), and a point E (12, 60) in the orthogonal coordinate system shown in FIG. 3. In a case where the rotation radius $\alpha$ and the median diameter $D_{50}$ are present within the above-described region, it is possible to form an active material layer that is capable of exhibiting a high ion conductivity while suppressing the occurrence of dripping and coating unevenness of the electrode composition as described above. On the other hand, in a case where the rotation radius $\alpha$ and the median diameter $D_{50}$ are present outside the above-described region, it is not possible to achieve both the suppression of the occurrence of dripping and coating unevenness of the electrode composition and the improvement of ion conductivity. Specifically, it is as follows.

In a case where they are present inside the above-described region (including a straight line, the same applies hereinafter) with respect to a straight line connecting a point A and a point B (for example, $D_{50}=35\alpha-1{,}700$), an effect of improving coating unevenness is particularly excellent, and in a case where they are present outside the above-described region, an effect of improving coating unevenness and ion conductivity is inferior.

In a case where they are present inside the above-described region with respect to a straight line connecting the point B and a point C ($D_{50}=4{,}600$), an effect of suppressing the occurrence of coating unevenness and dripping is exhibited, and in particular, the sizes of the inorganic solid electrolyte and the active material becomes sizes at which the surfaces thereof are suitably coated with the polymer binder, and thus an effect of improving ion conductivity is excellent.

In a case where they are present inside the above-described region with respect to a straight line connecting the point C and a point D (for example, $D_{50}=36\alpha+1{,}600$), an effect of improving dripping and ion conductivity is particularly excellent, and in a case where they are present outside the above-described region, an effect of improving dripping and ion conductivity is inferior.

In a case where they are present inside the above-described region with respect to a straight line connecting the point D and a point E ($\alpha=12$), the size of the polymer binder becomes a size at which the surfaces of the inorganic solid electrolyte and the active material can be suitably coated, and thus it is possible to particularly enhance an effect of improving ion conductivity while maintaining the effect of suppressing the occurrence of dripping and coating unevenness.

In a case where they are present inside the above-described region with respect to the straight line connecting the point E and the point A ($D_{50}=60$), the sizes of the inorganic solid electrolyte and the active material become sizes at which the surfaces thereof are suitably coated with the polymer binder, and thus an effect of improving the ion conductivity is particularly excellent.

In the present invention, the region in the orthogonal coordinate system, in which the rotation radius $\alpha$ and the median diameter $D_{50}$ are satisfied, can be a region (provided that a boundary line is included) of a polygonal shape in which at least one of the above-described five points is replaced with one or two or more points other than the above-described five points in the region. In this region as well, it is possible to suppress the occurrence of dripping and coating unevenness and to improve ion conductivity.

From the viewpoint that the suppression of the occurrence of dripping and coating unevenness of the electrode composition and the improvement of ion conductivity can be achieved at a higher level in a well-balanced manner, the rotation radius α and the median diameter $D_{50}$ are preferably present within a region (provided that a boundary line is included) of a hexagonal shape having, as apices, the point A, a point F (85, 2,800), the point C, a point G (37, 2,800), the point D, and the point E in the orthogonal coordinate system shown in FIG. 3, where a straight line connecting the point A and the point F is represented by, for example, $D_{50}$=78α−3,900.

The rotation radius α and the median diameter $D_{50}$ are more preferably present within a region (provided that a boundary line is included) of a pentagonal shape having, as apices, the point A, the point F, the point G, the point D, and the point E, still more preferably within a region (provided that a boundary line is included) of a quadrangular shape having, as apices, the point A, a point H (50, 2,000), the point D, and the point E, and particularly preferably present within a region of (provided that a boundary line is included) of a quadrangular shape having, as apices, a point J (50, 900), the point H, the point D, and a point I (12, 900).

Also in a case where the electrode composition contains a positive electrode active material as the active material, it is possible to form an active material layer that is capable of exhibiting a high ion conductivity while suppressing the occurrence of dripping and coating unevenness of the electrode composition in a case where the rotation radius α and the median diameter $D_{50}$ are within each of the above-described regions.

However, each of the above-described regions can be each region, which will be defined below.

In the orthogonal coordinate system shown in FIG. 3, the rotation radius α and the median diameter $D_{50}$ are present within a region (provided that a boundary line is included) of a pentagonal shape that has, as apices, a point AP (50, 120), a point BP (172, 4,500), a point CP (85, 4,500), a point DP (16, 1,600), and a point EP (16, 120). Here, a straight line connecting the point AP and the point BP is represented by, for example, $D_{50}$=36α−1,700, and a straight line connecting the point CP and the point DP is represented by, for example, $D_{50}$=42α+930. The meaning of the straight line, which connects two points among the five points defining the pentagonal shape, has the same meaning as those at the point A to the point E.

This region can be also a region of a polygonal shape in which at least one of the above-described five points is replaced with one or two or more points other than the above-described five points in the region.

From the viewpoint that the suppression of the occurrence of dripping and coating unevenness of the electrode composition and the improvement of ion conductivity can be achieved at a higher level in a well-balanced manner, examples of the preferred region in the orthogonal coordinate system include a region within a region (provided that a boundary line is included) of a hexagonal shape having, as apices, the point AP, a point FP (85, 2,700), the point CP, a point GP (37, 2,600), the point DP, and the point EP. Here, a straight line connecting the point AP and the point FP is represented by, for example, $D_{50}$=74α−3,600.

In the positive electrode composition, the rotation radius α and the median diameter $D_{50}$ are more preferably present within a region (provided that a boundary line is included) of a pentagonal shape that has, as apices, the point AP, the point FP, the point GP, the point DP, and the point EP, and still more preferably within a region (provided that a boundary line is included) of a polygonal shape having, as apices, the point AP, a point HP (50, 1,600), the point DP, and the point EP.

The rotation radius α is not particularly limited as long as the above relationship is satisfied. For example, the rotation radius α is preferably set to 12 or more, more preferably set to 16 or more, still more preferably set to 20 or more, and particularly preferably set to 25 or more, with respect to the median diameter $D_{50}$ in a range described later. On the other hand, the upper limit value thereof is preferably set to 178 or less, more preferably set to 172 or less, still more preferably set to 140 or less, particularly preferably set to 100 or less, and most preferably set to 70 or less.

The rotation radius α can be measured using the following polymer binder solution. That is, using a static light scattering measuring device (DLS-8000, manufactured by Otsuka Electronics Co., Ltd., laser wavelength λ=632.8 nm), the scattering intensities $I_{soln}$, $I_{solv}$, and $I_{tol}$ at a scattering angle θ=50°, 60°, 70°, 80°, 90°, 100°, 110°, 120°, and 130° are measured with respect to a polymer binder solution (four points of polymer concentration, for example, c=0.25 mg/mL, 0.50 mg/mL, 0.75 mg/mL, and 1.00 mg/mL), a dispersion medium, and toluene, and the excess Rayleigh ratio is calculated from the following expression.

Further, from the obtained excess Rayleigh ratio $R_θ$, a Zimm plot is created based on Expression (I), and the slope of $q^2$ obtained when the zero concentration extrapolation (c→0) has been carried out regarding the polymer concentration c is evaluated, whereby the rotation radius α can be calculated.

In the following expression, n and δn/δc are respectively the refractive index of the polymer binder solution and the rate of change in concentration thereof, which can be determined using, for example, a differential refractive index meter (DRM-3000, manufactured by Otsuka Electronics Co., Ltd.). $n_{tol}$ and $R_{tol}$ are respectively the refractive index and the Rayleigh ratio of toluene, known values of which can be referenced to, for example, a document [1] (E. R. Pike, W. R. M. Pomeroy, J. M. Vaughan, J. Chem. Phys., 62 (1975), 3188-3192). q is a scattering vector, and k is an optical constant, each of which is defined by the following expression. $M_w$ is the mass average molecular weight of a polymer as a measurement target, and NA is the Avogadro constant. $A_2$ is the second virial coefficient. In this measurement, the values of O ($q^4$) and O ($c^2$) become smaller and thus are ignored. The polymer binder solution is prepared by dissolving a polymer as a measurement target in a dispersion medium (butyl butyrate in Examples) that is used in the preparation of the electrode composition.

$$\text{Excess Rayleigh ratio } R_\theta = \frac{I_{soln} - I_{solv}}{I_{tol}}\left(\frac{n}{n_{tol}}\right)^2 R_{tol} \qquad \text{Expression (I)}$$

$$Kc/R_\theta = \frac{1}{M_w}\left(1 + \frac{1}{3}\alpha^2 q^2 + O(q^4)\right) + 2A_2 c + O(c^2)$$

$$q \equiv \frac{4\pi}{\lambda}\sin\frac{\theta}{2} \quad K \equiv \frac{4\pi^2 n^2}{N_A \lambda^4}\left(\frac{\partial n}{\partial c}\right)^2$$

The rotation radius α of the polymer binder can be appropriately adjusted according to a molecular structure (a linear shape) and a mass average molecular weight of a polymer (in general, a linear polymer) that forms a polymer binder, the presence or absence of a functional group having a pKa of 8 or less, which will be described later, a content of a constitutional component having the functional group in the polymer, as well as an SP value and the like. For example, a method for increasing the rotation radius α includes increasing the mass average molecular weight, introducing a functional group having a pKa of 8 or less, and setting the difference between the SP value of the polymer binder and the SP value of the dispersion medium to 2 or less.

The median diameter $D_{50}$ is not particularly limited as long as the above relationship is satisfied. For example, the median diameter $D_{50}$ is preferably set to 60 nm or more, more preferably set to 300 nm or more, and still more preferably set to 500 nm or more, with respect to the rotation radius α in the above-described range. On the other hand, the upper limit thereof is preferably set to 4,600 nm or less, more preferably set to 4,500 nm or less, still more preferably set to 3,000 nm or less, particularly preferably set to 2,000 nm or less, and most preferably set to 1,500 nm or less.

The median diameter $D_{50}$ shall be a value, which is obtained by calculating a value according to the following expression by measuring the median diameter $D_{S\text{-}50}$ of the inorganic solid electrolyte and the median diameter $D_{A\text{-}50}$ of the active material by the methods described below, respectively, and rounding off it to two digits of significant figures.

$$\text{Median diameter } D_{50} = (D_{S-50} \times W_S) + (D_{A-50} \times W_A)$$

In the expression, $D_{S\text{-}50}$ indicates the median diameter of the inorganic solid electrolyte, and $D_{A\text{-}50}$ indicates the median diameter of the active material. $W_S$ and $W_A$ respectively indicate the mass fraction of the inorganic solid electrolyte and the mass fraction of the active material with respect to the total mass of the inorganic solid electrolyte and the active material in the electrode composition.

The electrode composition according to the embodiment of the present invention is preferably a slurry in which an inorganic solid electrolyte and an active material are dispersed in a dispersion medium in a particle shape.

In the electrode composition according to the embodiment of the present invention, it is preferable that the polymer binder exhibits a function of dispersing an inorganic solid electrolyte and an active material in a dispersion medium. In addition, it is not particularly limited whether or not the polymer binder is adsorbed to an inorganic solid electrolyte; however, it is preferable that the polymer binder is adsorbed to an active material in a range in which the adsorption rate described below is satisfied. This makes it possible to enhance the dispersibility without excessively coating the surface of the active material.

On the other hand, the polymer binder functions in the active material layer as a binding agent that binds solid particles such as an active material, an inorganic solid electrolyte, and a co-existable conductive auxiliary agent. Further, it also functions as a binding agent that binds a collector to solid particles. In the electrode composition, the polymer binder may not have a function of causing solid particles to mutually bind therebetween.

In the electrode composition according to the embodiment of the present invention, the viscosity (initial viscosity) after preparation is not particularly limited. In the present invention, in order for the electrode composition to contain the inorganic solid electrolyte and the active material, which satisfy the above-described relationship, and a polymer binder, the viscosity under the following measurement conditions is preferably 300 to 4,000 cP and more preferably 800 to 4,000 cP from the viewpoint of enabling excellent coatability without dripping and coating unevenness.

—Measurement Conditions—

Temperature: 23° C.

Shear rate: 10/s

Measuring equipment: TV-35 type viscometer (manufactured by TOKI SANGYO Co., Ltd.)

Measuring method: 1.1 ml of the composition is dropwise added to a sample cup, the sample cup is set on a main body of the viscometer equipped with a standard cone rotor (1° 34'×R24), the measurement range is set to "U", rotation is carried out at the above-described shear rate, and then the value after 1 minute is read.

The electrode composition according to the embodiment of the present invention is preferably a non-aqueous composition. In the present invention, the non-aqueous composition includes not only an aspect including no watery moisture but also an aspect where the moisture content (also referred to as the "watery moisture content") is preferably 500 ppm or less. In the non-aqueous composition, the moisture content is more preferably 200 ppm or less, still more preferably 100 ppm or less, and particularly preferably 50 ppm or less. In a case where the electrode composition is a non-aqueous composition, it is possible to suppress the deterioration of the inorganic solid electrolyte. The water content refers to the amount of water (the mass proportion thereof to the electrode composition) in the electrode composition and specifically is a value measured by Karl Fischer titration after filtering the solid electrolyte composition through a membrane filter having a pore size of 0.02 m.

The electrode composition according to the embodiment of the present invention can be preferably used as an active material layer forming material of an electrode sheet for an all-solid state secondary battery or an all-solid state secondary battery. In particular, it can be preferably used as a material for forming a negative electrode sheet for an all-solid state secondary battery or a material for forming a negative electrode active material layer, which contains a negative electrode active material having a large expansion and contraction due to charging and discharging.

Hereinafter, the components that are included in the electrode composition according to the embodiment of the present invention and components that may be included therein will be described.

<Inorganic Solid Electrolyte>

The electrode composition of the embodiment of the present invention contains the inorganic solid electrolyte.

In the present invention, the inorganic solid electrolyte is an inorganic solid electrolyte, where the solid electrolyte refers to a solid-form electrolyte capable of migrating ions therein. The inorganic solid electrolyte is clearly distinguished from the organic solid electrolyte (the polymeric electrolyte such as polyethylene oxide (PEO) or the organic electrolyte salt such as lithium bis(trifluoromethanesulfonyl) imide (LiTFSI)) since it does not include any organic substance as a principal ion-conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has a lithium ion conductivity.

The inorganic solid electrolyte contained in the electrode composition according to the embodiment of the present invention has a particle shape at least in the electrode composition. The shape of the particle is not particularly limited and may be a flat shape, an amorphous shape, or the like; however, a spherical shape or a granular shape is preferable.

The particle diameter (volume average particle diameter: median diameter) $D_{S-50}$ of the inorganic solid electrolyte is not particularly limited as long as the median diameter $D_{50}$ is satisfied, and thus it is appropriately set. For example, $D_{S-50}$ is preferably 0.01 m or more, more preferably 0.05 m or more, still more preferably 1.4 m or more, and particularly preferably 2.7 m or more. The upper limit of $D_{S-50}$ is preferably 4.5 m or less, more preferably 4.0 m or less, still preferably 3.2 m or less, particularly preferably 2.1 m or less, and most preferably 1.9 μm or less.

The particle diameter of the inorganic solid electrolyte is measured according to the following procedure. Using water (heptane in a case where the inorganic solid electrolyte is unstable in water), the inorganic solid electrolyte particles are diluted in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle size distribution analyzer LA-920 (product name, manufactured by Horiba Ltd.), and a quartz cell for measurement at a temperature of 25° C. to obtain the volume average particle diameter $D_{S-50}$. Other detailed conditions and the like can be found in Japanese Industrial Standards (JIS) Z8828: 2013 "particle diameter Analysis-Dynamic Light Scattering" as necessary. Five samples per level are produced and measured, and the average values thereof are employed.

In a case where the electrode composition contains two or more kinds of inorganic solid electrolytes, a practical median diameter $D_{S-50}$ as a mixture can be measured according to the above-described method; however, in the present invention, the median diameter of each inorganic solid electrolyte is measured according to the above method and calculated from the following expression.

$$\text{Median diameter } D_{S-50} = D_{S1-50} \times W_{S1} + D_{S2-50} \times W_{S2} + \ldots$$

In the expression, $D_{S1-50}$, $D_{S2-50}$ . . . indicates the median diameter of the inorganic solid electrolyte, and $W_{S1}$, $W_{S2}$ . . . indicates the mass fraction with respect to the total volume of the inorganic solid electrolyte.

The method of adjusting the average particle diameter is not particularly limited, and a known method can be applied. Examples thereof include a method using a normal pulverizer or a classifier. As the pulverizer or a classifier, for example, a mortar, a ball mill, a sand mill, a vibration ball mill, a satellite ball mill, a planetary ball mill, a swirling airflow-type jet mill, or a sieve is suitably used. During pulverization, it is possible to carry out wet-type pulverization in which water or a dispersion medium such as methanol is made to be present together. In order to provide the desired particle diameter, classification is preferably carried out. The classification is not particularly limited and can be carried out using a sieve, a wind power classifier, or the like. Both the dry-type classification and the wet-type classification can be carried out.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based inorganic solid electrolyte. The sulfide-based inorganic solid electrolytes are preferably used from the viewpoint that it is possible to form a more favorable interface between the active material and the inorganic solid electrolyte.

(i) Sulfide-Based Inorganic Solid Electrolyte

The sulfide-based inorganic solid electrolyte is preferably an electrolyte that contains a sulfur atom, has an ion conductivity of a metal belonging to Group 1 or Group 2 in the periodic table, and has electron-insulating properties. The sulfide-based inorganic solid electrolytes are preferably inorganic solid electrolytes which contain, as elements, at least Li, S, and P and have a lithium ion conductivity; however, the sulfide-based inorganic solid electrolytes may appropriately include elements other than Li, S, and P.

Examples of the sulfide-based inorganic solid electrolyte include a lithium ion-conductive inorganic solid electrolyte satisfying the composition represented by Formula (S1).

$$L_{a1}M_{b1}P_{c1}S_{d1}A_{e1}\ (S1)$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios between the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio of $Li_2S$ to $P_2S_5$ in Li—P—S-based glass and Li—P—S-based glass ceramic is preferably 60:40 to 90:10 and more preferably 68:32 to 78:22 in terms of the molar ratio, $Li_2S$:$P_2S_5$. In a case where the ratio between $Li_2S$ and $P_2S_5$ is set in the above-described range, it is possible to increase a lithium ion conductivity. Specifically, the lithium ion conductivity can be preferably set to $1\times10^{-4}$ S/cm or more and more preferably set to $1\times10^{-3}$ S/cm or more. The upper limit is not particularly limited but practically $1\times10^{-1}$ S/cm or less.

As specific examples of the sulfide-based inorganic solid electrolytes, combination examples of raw materials will be described below. Examples thereof include $Li_2S—P_2S_5$, $Li_2S—P_2S_5—LiCl$, $Li_2S—P_2S_5—H_2S$, $Li_2S—P_2S_5—H_2S—LiCl$, $Li_2S—LiI—P_2S_5$, $Li_2S—LiI—Li_2O—P_2S_5$, $Li_2S—LiBr—P_2S_5$, $Li_2S—Li_2O—P_2S_5$, $Li_2S—Li_3PO_4—P_2S_5$, $Li_2S—P_2S_5—P_2O_5$, $Li_2S—P_2S_5—SiS_2$, $Li_2S—P_2S_5—SiS_2—LiCl$, $Li_2S—P_2S_5—SnS$, $Li_2S—P_2S_5—Al_2S_3$, $Li_2S—GeS_2$, $Li_2S—GeS_2—ZnS$, $Li_2S—Ga_2S_3$, $Li_2S—GeS_2—Ga_2S_3$, $Li_2S—GeS_2—P_2S_5$, $Li_2S—GeS_2—Sb_2S_5$, $Li_2S—GeS_2—Al_2S_3$, $Li_2S—SiS_2$, $Li_2S—Al_2S_3$, $Li_2S—SiS_2—Al_2S_3$, $Li_2S—SiS_2—P_2S_5$, $Li_2S—SiS_2—P_2S_5—LiI$, $Li_2S—SiS_2—LiI$, $Li_2S—SiS_2—Li_4SiO_4$, $Li_2S—SiS_2—Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This is because treatments at a normal temperature is possible, and it is possible to simplify manufacturing steps.

(ii) Oxide-Based Inorganic Solid Electrolyte

The oxide-based inorganic solid electrolyte is preferably an electrolyte that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it is practically $1\times10^{-1}$ S/cm or less.

Specific examples of the compound include $Li_{xa}La_{ya}TiO_3$ (LLT) [xa satisfies $0.3\leq xa\leq0.7$, and ya satisfies $0.3\leq ya\leq0.7$]; $Li_{xb}La_{yb}Zr_{zb}M^{bb}{}_{mb}O_{nb}$ ($M^{bb}$ is one or more elements selected from Al, Mg, Ca, Sr, V, Nb, Ta, Ti, Ge, In, and Sn, xb satisfies $5\leq xb\leq10$, yb satisfies $1\leq yb\leq4$, zb satisfies $1\leq zb\leq4$, mb satisfies $0\leq mb\leq2$, and nb satisfies $5\leq nb\leq20$); $Li_{xc}B_{yc}M^{cc}{}_{zc}O_{nc}$ ($M^{cc}$ is one or more elements selected from C, S, Al, Si, Ga, Ge, In, and Sn, xc satisfies $0<xc\leq5$, yc satisfies $0<yc\leq1$, zc satisfies $0<zc\leq1$, and nc satisfies $0<nc\leq6$); $Li_{xd}(Al, Ga)_{yd}(Ti, Ge)_{zd}Si_{ad}P_{md}O_{nd}$ (xd satisfies $1\leq xd\leq3$, yd satisfies $0\leq yd\leq1$, zd satisfies $0\leq zd\leq2$, ad satisfies $0\leq ad\leq1$, md satisfies $1\leq md\leq7$, and nd satisfies $3\leq nd\leq13$); $Li_{(3-2xe)}M^{ee}{}_{xe}D^{ee}O$ (xe represents a number of 0 or more and 0.1 or less, and $M^{ee}$ represents a divalent metal atom, $D^{ee}$ represents a halogen atom or a combination of two or more halogen atoms); $Li_{xf}Si_{yf}O_{zf}$ (xf satisfies $1\leq xf\leq5$, yf satisfies $0<yf\leq3$, zf satisfies $1\leq zf\leq10$); $Li_{xg}S_{yg}O_{zg}$ (xg satisfies $1\leq xg\leq3$, yg satisfies $0<yg\leq2$, zg satisfies $1\leq zg\leq10$); $Li_3BO_3$; $Li_3BO_3—Li_2SO_4$; $Li_2O—B_2O_3—P_2O_5$; $Li_2O—SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0\leq xh\leq1$, and yh satisfies $0\leq yh\leq1$); and $Li_7La_3Zr_2O_{12}$ (LLZ) having a garnet-type crystal structure.

In addition, a phosphorus compound containing Li, P, or O is also desirable. Examples thereof include lithium phosphate ($Li_3PO_4$); LiPON in which a part of oxygen atoms in lithium phosphate are substituted with a nitrogen element; and $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au).

Further, it is also possible to preferably use $LiA^1ON$ ($A^1$ is one or more elements selected from Si, B, Ge, Al, C, and Ga).

(iii) Halide-Based Inorganic Solid Electrolyte

The halide-based inorganic solid electrolyte is preferably a compound that contains a halogen atom, has an ion conductivity of a metal belonging to Group 1 or Group 2 in the periodic table, and has electron-insulating properties.

The halide-based inorganic solid electrolyte is not particularly limited; however, examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited; however, examples thereof include $LiBH_4$, $Li_4(BH_4)_3I$, and $3LiBH_4—LiCl$.

One kind of inorganic solid electrolyte may be contained, or two or more kinds thereof may be contained.

The content of the inorganic solid electrolyte in the electrode composition is not particularly limited. However, in terms of dispersibility, ion conductivity, and the like, the total content of the inorganic solid electrolyte and the active material is preferably 50% by mass or more, more preferably 70% by mass or more, and still more preferably 90% by mass or more, in the solid content of 100% by mass. From the same viewpoint, the upper limit thereof is preferably 99.9% by mass or less, more preferably 99.5% by mass or less, and particularly preferably 99% by mass or less.

In the present invention, the solid content (solid component) refers to components that neither volatilize nor evaporate and disappear in a case where the electrode composition is subjected to drying treatment at 150° C. for 6 hours in a nitrogen atmosphere at a pressure of 1 mmHg. Typically, the solid content refers to a component other than a dispersion medium described below.

In the electrode composition, the content ratio of the inorganic solid electrolyte to the active material described below [content of inorganic solid electrolyte:content of active material] is not particularly limited, and it is appropriately set in consideration of the median diameter $D_{50}$ and the like. For example, the content ratio [content of inorganic solid electrolyte:content of active material] can be set to 1:1 to 1:10, and it is preferably 1:1 to 1:6.

<Active Material>

The electrode composition according to the embodiment of the present invention can also contain an active material capable of intercalating and deintercalating ions of a metal belonging to Group 1 or Group 2 in the periodic table.

The active material contained in the electrode composition according to the embodiment of the present invention has a particle shape at least in the electrode composition. The shape of the particle is not particularly limited and may be a flat shape, an amorphous shape, or the like; however, a spherical shape or a granular shape is preferable.

The average particle diameter (median diameter $D_{A\text{-}50}$) of the active material that is used in the present invention is not particularly limited as long as the median diameter $D_{50}$ is satisfied, and thus it is appropriately set. In terms of, for example, dispersibility and conductivity, $D_{A\text{-}50}$ is preferably 10 m or less, more preferably 5 m or less, still more preferably 1 m or less, and particularly preferably 0.6 m or less. The lower limit value of the average particle diameter is practically 0.01 m or more, and it is, for example, preferably 0.05 m or more, more preferably 0.2 m or more, and still more preferably 0.3 m or more.

The average particle diameter of the active material can be measured using the same method as that of the particle diameter of the inorganic solid electrolyte.

As the method of adjusting the average particle diameter, a known method described in the section of the inorganic solid electrolyte can be applied without particular limitation.

Examples of the active material include a positive electrode active material and a negative electrode active material.

(Positive Electrode Active Material)

The positive electrode active material is an active material capable of intercalating and deintercalating an ion of a metal belonging to Group 1 or Group 2 of the periodic table, and it is preferably one capable of reversibly intercalating and deintercalating a lithium ion. The above-described material is not particularly limited as long as the material has the above-described characteristics and may be a transition metal oxide, an organic substance, or an element, which is capable of being complexed with Li, such as sulfur or the like by disassembling the battery.

Among the above, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The mixing amount thereof is preferably 0% to 30% by mole of the amount (100% by mole) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$(LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V_2(PO_4)_3$ (lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

A positive electrode active material obtained using a baking method may be used after being washed with water, an acidic aqueous solution, an alkaline aqueous solution, or an organic solvent.

The positive electrode active material contained in the electrode composition may be one kind or two or more kinds.

The content of the positive electrode active material in the electrode composition is not particularly limited; however, it is preferably 10% to 97% by mass, more preferably 30% to 95% by mass, still more preferably 40% to 93% by mass, and particularly preferably 50% to 90% by mass, with respect to 100% by mass of the solid content.

(Negative Electrode Active Material)

The negative electrode active material is an active material capable of intercalating and deintercalating an ion of a metal belonging to Group 1 or Group 2 of the periodic table, and it is preferably one capable of reversibly intercalating and deintercalating a lithium ion. The material is not particularly limited as long as it has the above-described characteristics, and examples thereof include a carbonaceous material, a metal oxide, a metal composite oxide, a lithium single body, a lithium alloy, and a negative electrode active material that is capable of forming an alloy (capable of being alloyed) with lithium. Among the above, a carbonaceous material, a metal composite oxide, or a lithium single body is preferably used from the viewpoint of reliability. An active material that is capable of being alloyed with lithium is preferable since the capacity of the all-solid state secondary battery can be increased.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by baking a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-22066A (JP-S62-22066A), JP1990-6856A (JP-H2-6856A), and JP1991-45473A (JP-H3-45473A). The carbonaceous material is not necessarily a single material and, for example, may be a mixture of natural graphite and artificial graphite described in JP1993-90844A (JP-H5-90844A) or graphite having a coating layer described in JP1994-4516A (JP-H6-4516A).

As the carbonaceous material, hard carbon or graphite is preferably used, and graphite is more preferably used.

The oxide of a metal or a metalloid element that is applied as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably noncrystalline oxides, and preferred examples thereof include chalcogenides which are reaction products between metal elements and elements in Group 16 of the periodic table. In the present invention, the metalloid element refers to an element having intermediate properties between properties of a metal element and properties of a non-metalloid element. Typically, the metalloid elements include six elements including boron, silicon, germanium, arsenic, antimony, and tellurium, and further include three elements including selenium, polonium, and astatine. In addition, "noncrystalline" represents an oxide having a broad scattering band with an apex in a range of 200 to 400 in terms of 20 value in case of being measured by an X-ray diffraction method using CuKα rays, and the oxide may have a crystalline diffraction line. The highest intensity in a crystalline diffraction line observed in a range of 40° to 70° in terms of 20 value is preferably 100 times or less and more preferably 5 times or less with respect to the intensity of a diffraction line at the apex in a broad scattering band observed in a range of 200 to 400 in terms of 20 value, and it is still more preferable that the oxide does not have a crystalline diffraction line.

In the compound group consisting of the noncrystalline oxides and the chalcogenides, noncrystalline oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Group 13 (IIIB) to Group 15 (VB) in the periodic table or chalcogenides are more preferable. Specific examples of the preferred noncrystalline oxide and chalcogenide preferably include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, and $Sb_2S_5$.

Suitable examples of the negative electrode active material which can be used in combination with a noncrystalline oxide containing Sn, Si, or Ge as a major component include a carbonaceous material capable of intercalating and/or deintercalating lithium ions or lithium metal, a lithium single body, a lithium alloy, and a negative electrode active material that is capable of being alloyed with lithium.

It is preferable that an oxide of a metal or a metalloid element, in particular, a metal (composite) oxide and the chalcogenide contain at least one of titanium or lithium as the constitutional component from the viewpoint of high current density charging and discharging characteristics. Examples of the metal composite oxide (lithium composite metal oxide) including lithium include a composite oxide of lithium oxide and the above metal (composite) oxide or the above chalcogenide, and specifically, $Li_2SnO_2$.

As the negative electrode active material, for example, a metal oxide (titanium oxide) having a titanium element is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it is possible to improve the life of the lithium ion secondary battery.

The lithium alloy as the negative electrode active material is not particularly limited as long as it is typically used as a negative electrode active material for a secondary battery, and examples thereof include a lithium aluminum alloy, and specifically, a lithium aluminum alloy, using lithium as a base metal, to which 10% by mass of aluminum is added.

The negative electrode active material capable of forming an alloy with lithium is not particularly limited as long as it is typically used as a negative electrode active material for a secondary battery. Examples of such an active material include a (negative electrode) active material (an alloy or the like) having a silicon element or a tin element and a metal such as Al or In, a negative electrode active material (a silicon element-containing active material) having a silicon element capable of exhibiting higher battery capacity is preferable, and a silicon element-containing active material in which the content of the silicon element is 50% by mole or more with respect to all the constitutional elements is more preferable.

In general, a negative electrode including the negative electrode active material (for example, a Si negative electrode including a silicon element-containing active material or an Sn negative electrode containing an active material containing a tin element) can intercalate a larger amount of Li ions than a carbon negative electrode (for example, graphite or acetylene black). That is, the amount of Li ions intercalated per unit mass increases. As a result, the battery capacity (the energy density) can be increased. As a result, there is an advantage in that the battery driving duration can be extended.

Examples of the silicon element-containing active material include a silicon-containing alloy (for example, $LaSi_2$, $VSi_2$, La—Si, Gd—Si, or Ni—Si) including a silicon material such as Si or SiOx ($0<x\leq1$) and titanium, vanadium, chromium, manganese, nickel, copper, lanthanum, or the like or a structured active material thereof (for example, $LaSi_2/Si$), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) capable of being alloyed with lithium.

Examples of the negative electrode active material including the tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is still more preferable to include a negative electrode active material containing silicon (Si) or a silicon-containing alloy.

The negative electrode active material contained in the electrode composition may be one kind or two or more kinds.

The content of the negative electrode active material in the electrode composition is not particularly limited, and it is preferably 10% to 90% by mass, more preferably 20% to 85% by mass, still more preferably 30% to 80% by mass, and even still more preferably 40% to 75% by mass, in the solid content of 100% by mass.

The chemical formulae of the compounds obtained by the above baking method can be calculated using an inductively coupled plasma (ICP) emission spectroscopy as a measuring method from the mass difference of powder before and after baking as a convenient method.

(Coating of Active Material)

The surfaces of the positive electrode active material and the negative electrode active material may be subjected to surface coating with another metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, the surface of the electrode containing the positive electrode active material or negative electrode active material may be subjected to a surface treatment with sulfur or phosphorus.

Further, the particle surface of the positive electrode active material or negative electrode active material may be subjected to a surface treatment with an actinic ray or an active gas (plasma or the like) before and after the surface coating.

<Polymer Binder>

The polymer binder contained in the electrode composition according to the embodiment of the present invention is a binder that is constituted by containing a linear polymer. In a case where the polymer binder is constituted by containing a linear polymer, the action due to the above-described relationship satisfied by the rotation radius α and the median diameter $D_{50}$ is reinforced, and thus it is possible to realize the suppression of the occurrence of dripping and coating unevenness of the electrode composition and realize the improvement of ion conductivity.

In the present invention, the linear polymer is a polymer having a main chain that is formed by linearly polymerizing or condensing a polycondensable compound, where the polymer refers to a polymer that does not have a branched polymerized chain (including a graft chain) and a cross-linked structure. Examples thereof include a chain polymer of a polymerizable compound having one carbon-carbon double bond and a sequential polymer between bifunctional condensable compounds.

In the present invention, a main chain of the polymer refers to a linear molecular chain in which all the molecular chains that constitute the polymer other than the main chain can be conceived as a branched chain or a pendant group with respect to the main chain. Although it depends on the mass average molecular weight of the branched chain regarded as a branched chain or pendant group, the longest chain among the molecular chains that constitute the polymer is typically the main chain. In this case, a terminal group at the polymer terminal is not included in the main chain. In addition, side chains of the polymer refer to branched chains other than the main chain and include a short chain and a long chain.

—Physical Properties, Characteristics, or Like of Linear Polymer or Polymer Binder—

The linear polymer preferably satisfies the SP value in the following range, and it is preferable that the polymer binder exhibits an adsorption rate in the following range and further exhibits solubility in a dispersion medium. Further, it is also preferable that in addition to these physical properties or characteristics, the polymer binder or the linear polymer appropriately has the following physical properties or characteristics.

The SP value as a preferred characteristic of the linear polymer is not particularly limited and can be set to, for example, 12.0 to 21.5 $MPa^{1/2}$. However, in terms of the dispersibility of the electrode composition, it is preferably 12.0 to 21.5 $MPa^{1/2}$, more preferably 16 to 20 $MPa^{1/2}$, still more preferably 17 to 20 $MPa^{1/2}$, particularly preferably 17 to 19.5 $MPa^{1/2}$, and most preferably 18 to 19.5 $MPa^{1/2}$.

The method of calculating an SP value will be described.

First, the SP value ($MPa^{1/2}$) of each constitutional component (constitutional unit) that constitutes a linear polymer is determined according to the Hoy method unless otherwise specified (see the following formula in H. L. Hoy JOURNAL OF PAINT TECHNOLOGY, Vol. 42, No. 541, 1970, 76-118, and POLYMER HANDBOOK $4^{th}$, Chapter 59, VII, page 686, Table 5, Table 6, and the following formula in Table 6).

$$\delta_t = \frac{F_t + \frac{B}{\bar{n}}}{V};\ B = 277$$

In the expression, $\delta_t$ indicates an SP value. $F_t$ is a molar attraction function $(J\times cm^3)^{1/2}/mol$ and represented by the following expression. V is a molar volume ($cm^3/mol$) and represented by the following expression. $\bar{n}$ is represented by the following expression.

$$F_t = \sum n_i F_{t,i} \qquad V = \sum n_i V_i$$

$$\bar{n} = \frac{0.5}{\Delta_T^{(P)}} \qquad \Delta_T^{(P)} = \sum n_i \Delta_{T,i}^{(P)}$$

In the above expression, $F_{t,i}$ indicates a molar attraction function of each constitutional unit, $V_i$ indicates a molar volume of each constitutional unit, $\Delta^{(P)}{}_{T,i}$ indicates a correction value of each constitutional unit, and $n_i$ indicates the number of each constitutional unit.

Using the obtained SP value of the constitutional component, which has been determined as described above ($MPa^{1/2}$), the SP value ($MPa^{1/2}$) of the linear polymer is calculated from the following expression. It is noted that the SP value of the constitutional component obtained according to the above document is converted into an SP value ($MPa^{1/2}$) (for example, 1 $cal^{1/2}$ $cm^{-3/2}$≈2.05 $J^{1/2}$ $cm^{-3/2}$≈2.05 $MPa^{1/2}$) and used.

$$SP_p^2 = (SP_1^2 \times W_1) + (SP_2^2 \times W_2) + \ldots$$

In the expression, $SP_1$, $SP_2$ . . . indicates the SP values of the constitutional components, and $W_1$, $W_2$ . . . indicates the mass fractions of the constitutional components. In the present invention, the mass fraction of a constitutional component shall be a mass fraction of the constitutional component (the raw material compound from which this constitutional component is derived) in the linear polymer.

The SP value of the polymer can be adjusted depending on the kind or the composition (the kind and the content of the constitutional component) of the linear polymer.

It is preferable that the SP value of the linear polymer satisfies a difference (in terms of absolute value) in SP value in a range described later with respect to the SP value of the dispersion medium from the viewpoint of achieving a higher dispersibility.

The adsorption rate as a preferred characteristic of the polymer binder is an adsorption rate $A_{AM}$ with respect to an active material contained in the electrode composition, regarding the dispersion medium contained in the electrode composition, which is not particularly limited; however, it is preferably 40% or less. A case of the adsorption rate $A_{AM}$ with respect to the active material is 40% or less contributes to the improvement of the dispersibility and the improvement of the conductivity without the excessive adsorption to the active material.

In the present invention, the adsorption rate $A_{AM}$ of the polymer binder is a value measured by using an active material and a dispersion medium, which are contained in the electrode composition, and it is an indicator that indicates the degree of adsorption of the polymer binder to an active material in the dispersion medium. Here, the adsorption of the polymer binder to the active material includes not only physical adsorption but also chemical adsorption (adsorption by chemical bond formation, adsorption by transfer of electrons, or the like).

In a case where the electrode composition contains a plurality of kinds of active materials, the adsorption rate shall be an adsorption rate with respect to an active material having the same composition as the active material composition (the kind and the content) in the electrode composition. Similarly, in a case where the electrode composition contains a plurality of kinds of dispersion media, the adsorption rate is measured by using a dispersion medium having the same composition (the kind and the content) as the dispersion media in the electrode composition. In addition, also in a case where a plurality of kinds of polymer binders are used, the adsorption rate is an adsorption rate in the case where the plurality of kinds of polymer binders are used, similar to the electrode composition or the like.

In the present invention, the adsorption rate of the polymer binder is a value calculated according to the method described in Examples.

In the present invention, the adsorption rate $A_{AM}$ with respect to the active material can be appropriately set depending on the kind (the structure and the composition of the polymer chain) of polymer that is contained in the polymer binder, the kind or content of the functional group contained in the polymer, the configuration of the polymer binder (the amount dissolved in the dispersion medium).

From the viewpoint that the dispersibility can be further enhanced, the adsorption rate $A_{AM}$ can be set to 60% or less, and it is preferably 45% or less and still more preferably 30% or less. On the other hand, the lower limit of the adsorption rate $A_{AM}$ is not particularly limited and can be set to 0%. From the viewpoint of dispersibility, the lower limit of the adsorption rate is preferably small, and it is, for example, preferably 0.1% or more and more preferably 1% or more.

Examples of the preferred characteristics of the polymer binder (the linear polymer) include a characteristic (solubility) of being dissolved in a dispersion medium contained in the electrode composition. The polymer binder in the electrode composition generally is present in a state of being dissolved in a dispersion medium in the electrode composition, which depends on the content thereof. In this case, the polymer binder stably exhibits the function of dispersing solid particles in the dispersion medium.

In the present invention, the description that a polymer binder is dissolved in a dispersion medium in an electrode composition is not limited to an aspect in which the entire polymer binder is dissolved in the dispersion medium, and for example, a part of the polymer binder may be present in an insoluble form in the electrode composition as long as the following solubility in a dispersion medium is 80% or more.

The measuring method for solubility is as follows. That is, a specified amount of a polymer binder serving as a measurement target is weighed in a glass bottle, 100 g of a dispersion medium that is the same kind as the dispersion medium contained in the electrode composition is added thereto, and stirring is carried out at a temperature of 25° C. on a mix rotor at a rotation speed of 80 rpm for 24 hours. After stirring for 24 hours, the obtained mixed solution is subjected to the transmittance measurement under the following conditions. This test (the transmittance measurement) is carried out by changing the amount of the binder dissolved (the above-described specified amount), and the upper limit concentration X (% by mass) at which the transmittance is 99.8% is defined as the solubility of the polymer binder in the above dispersion medium.

<Transmittance Measurement Conditions>

Dynamic Light Scattering (DLS) Measurement

Device: DLS measuring device DLS-8000 manufactured by Otsuka Electronics Co., Ltd.

Laser wavelength, output: 488 nm/100 mW

Sample cell: NMR tube

It suffices that the linear polymer has the rotation radius α in the above-described range, where the mass average molecular weight of the linear polymer is not particularly limited and is appropriately set in consideration of the rotation radius α. The mass average molecular weight of the linear polymer can be set to, for example, 10,000 or more, and it is preferably 15,000 or more, more preferably 30,000 or more, and still more preferably 50,000 or more. The upper limit thereof is practically 5,000,000 or less, preferably 4,000,000 or less, more preferably 3,000,000 or less, still more preferably 2,000,000 or less, and particularly more preferably 500,000 or less.

The mass average molecular weight of the fluorine-based polymer described below can be also set in the above-described range. However, in consideration of the rotation radius α and the like, it is still more preferably 150,000 or more, particularly preferably 200,000 or more, and most preferably 300,000 or more. The upper limit thereof is still more preferably 1,500,000 or less and particularly preferably 1,200,000 or less.

—Measurement of Molecular Weight—

In the present invention, unless specified otherwise, molecular weights of a polymer, a polymer chain, and a macromonomer refer to a mass average molecular weight and number average molecular weight in terms of standard polystyrene conversion, which are determined according to gel permeation chromatography (GPC). The measuring method thereof includes, basically, a method under Conditions 1 or Conditions 2 (preferential) described below. However, depending on the kind of polymer or macromonomer, an appropriate eluant may be suitably selected and used.

Condition 1

Column: Connect two TOSOH TSKgel Super AWM-H (product name, manufactured by Tosoh Corporation)

Carrier: 10 mM LiBr/N-methylpyrrolidone

Measurement temperature: 40° C.

Carrier flow rate: 1.0 ml/min
Sample concentration: 0.1% by mass
Detector: refractive indicator (RI) detector Condition 2

Column: A column obtained by connecting TOSOH TSKgel Super HZM-H, TOSOH TSKgel Super HZ4000, and TOSOH TSKgel Super HZ2000 (all of which are product names, manufactured by Tosoh Corporation)
Carrier: tetrahydrofuran
Measurement temperature: 40° C.
Carrier flow rate: 1.0 ml/min
Sample concentration: 0.1% by mass
Detector: refractive indicator (RI) detector The watery moisture concentration of the polymer binder (the linear polymer) is preferably 100 ppm (mass basis) or less. Further, as this polymer binder, a polymer may be crystallized and dried, or a dispersion liquid of the polymer binder may be used as it is.

The linear polymer is preferably noncrystalline. In the present invention, the description that a polymer is "noncrystalline" typically refers to that no endothermic peak due to crystal melting is observed when the measurement is carried out at the glass transition temperature.

—Linear Polymer—

The kind and composition of the linear polymer are not particularly limited as long as the above-described preferred characteristics or physical properties are satisfied, and various polymers can be used as a binder polymer for an all-solid state secondary battery.

The linear polymer preferably contains a constitutional component having a functional group having a pKa of 8 or less. In a case where the linear polymer contains this constitutional component, the rotation radius α can be set in an appropriate range, and the coatability and the ion conductivity of the electrode composition due to the polymer binder can be further improved.

This constitutional component has a functional group having a pKa of 8 or less, directly or through a linking group in a partial structure that is incorporated into the main chain of the linear polymer. The partial structure that is incorporated into the main chain of the linear polymer is appropriately selected depending on the kind of the linear polymer and the like, and examples thereof include a carbon chain (a carbon-carbon bond).

pKa means a negative common logarithm (−logKa) of the acid dissociation constant (Ka) in water at 25° C. pKa can be calculated by dropwise adding a 0.01 mol/L sodium hydroxide aqueous solution to an aqueous solution of the polymer binder and reading the amount of the sodium hydroxide aqueous solution that has been dropwise added up to the half-equivalent point. The functional group having a pKa of 8 or less is not particularly limited, and examples thereof include acidic functional groups such as a carboxy group, a phosphoryl group (a phosphate group), a phosphonate group, a sulfo group (a sulfonate group), and a phenolic hydroxyl group.

The linking group is not particularly limited; however, examples thereof include an alkylene group (preferably having 1 to 12 carbon atoms, more preferably 1 to 6 carbon atoms, and still more preferably having 1 to 3 carbon atoms), an alkenylene group (preferably having 2 to 6 carbon atoms and more preferably having 2 or 3 carbon atoms), an arylene group (preferably having 6 to 24 carbon atoms and more preferably having 6 to 10 carbon atoms), an oxygen atom, a sulfur atom, an imino group (—$NR^N$—: $R^N$ represents a hydrogen atom, an alkyl group having 1 to 6 carbon atoms or an aryl group having 6 to 10 carbon atoms), a carbonyl group, a phosphate linking group (—O—P(OH)(O)—O—), a phosphonate linking group (—P(OH)(O)—O—), and a group involved in the combination thereof. The linking group is preferably a group obtained by combining an alkylene group, an arylene group, a carbonyl group, an oxygen atom, a sulfur atom, and an imino group, more preferably a group obtained by combining an alkylene group, an arylene group, a carbonyl group, an oxygen atom, an imino group, or a polyalkyleneoxy chain (a combination of an alkylene group and an oxygen atom), still more preferably a group containing a —CO—O— group or a —CO—N($R^N$)— group ($R^N$ represents a hydrogen atom, an alkyl group having 1 to 6 carbon atoms, or an aryl group having 6 to 10 carbon atoms), or an arylene group. Examples of the group containing a —CO—O— group or a —CO—N($R^N$)— group include a group further containing an alkylene group, an arylene group, a —CO—O— group, a polyalkyleneoxy chain, or the like. The number of atoms that constitute the linking group and the number of linking atoms are as described below. However, the above does not apply to the polyalkyleneoxy chain that constitutes the linking group.

In the present invention, the number of atoms constituting the linking group is preferably 1 to 36, more preferably 1 to 24, and still more preferably 1 to 12. The number of linking atoms of the linking group is preferably 10 or less and more preferably 8 or less. The lower limit thereof is 1 or more. The number of linking atoms refers to the minimum number of atoms linking predetermined structural parts. For example, in a case of —$CH_2$—C(═O)—O—, the number of atoms that constitute the linking group is 6; however, the number of linking atoms is 3.

Each of the partial structure and the linking group, which are incorporated into the main chain, may have a substituent. Such a substituent is not particularly limited, and examples thereof include a group selected from the following substituent Z described later.

The constitutional component having a functional group having a pKa of 8 or less can be constituted by appropriately combining the partial structure to be incorporated in the main chain, the functional group having a pKa of 8 or less, and furthermore, a linking group. For example, it is preferably a constitutional component derived from a (meth)acrylic acid compound described below, a constitutional component derived from a compound obtained by introducing a functional group having a pKa of 8 or less into a (meth)acrylic compound (M1), or a constitutional component derived from a compound obtained by introducing a functional group having a pKa of 8 or less into a vinyl compound (M2) described below, and examples thereof include a (meth)acrylic acid compound, an acrylic acid ester compound obtained by introducing a functional group having a pKa of 8 or less, and a vinyl compound (M2) obtained by introducing a functional group having a pKa of 8 or less (in particular, a styrene compound obtained by introducing a functional group having a pKa of 8 or less, a ring-opened form (including a monoester form) of an unsaturated carboxylic acid anhydride (for example, a maleic acid anhydride compound) or the like). In a case where the ring-opened form of the unsaturated carboxylic acid anhydride is a monoester form, the group that forms the ester is not particularly limited, and examples thereof include a group selected from the substituent Z described later, where an alkyl group is preferable.

Specific examples of the constitutional component having a functional group having a pKa of 8 or less include constitutional components in Examples and in the linear polymer described later; however, the present invention is not limited thereto.

The linear polymer may have one or two or more constitutional components having a functional group having a pKa of 8 or less. The content of the constitutional component having a functional group having a pKa of 8 or less in the linear polymer is determined in an appropriate consideration of the rotation radius α of the linear polymer, the SP value, and the like, details of which will be described later.

Preferred examples of the linear polymer include a polymer having, in the main chain, at least one bond selected from a urethane bond, a urea bond, an amide bond, an imide bond, and an ester bond, or a polymerized chain of carbon-carbon double bonds.

The above bond is not particularly limited as long as it is contained in the main chain of the polymer, and it may have any aspect in which it is contained in the constitutional component (the repeating unit) and/or an aspect in which it is contained as a bond that connects different constitutional components to each other). Further, the above-described bond contained in the main chain is not limited to one kind, it may be 2 or more kinds, and it is preferably 1 to 6 kinds and more preferably 1 to 4 kinds. In this case, the bonding mode of the main chain is not particularly limited. The main chain may randomly have two or more kinds of bonds and may be a main chain that is segmented to a segment having a specific bond and a segment having another bond.

The main chain having the above-described bonds is not particularly limited. However, it is preferably a main chain having at least one segment of the above-described bonds, and it is more preferably a main chain consisting of polyamide, polyurea, or polyurethane.

Examples of the polymer having, among the above bonds, a urethane bond, a urea bond, an amide bond, an imide bond, or an ester bond in the main chain include sequential polymerization (polycondensation, polyaddition, or addition condensation) polymers such as polyurethane, polyurea, polyamide, polyimide, and polyester, and copolymers thereof. The copolymer may be a block copolymer having each of the above polymers as a segment, or a random copolymer in which each constitutional component that constitutes two or more polymers among the above polymers is randomly bonded.

Examples of the polymer having a polymerized chain of carbon-carbon double bonds in the main chain include chain polymerization polymers such as a fluorine-based polymer (a fluorine-containing polymer), a hydrocarbon-based polymer, a vinyl polymer, and a (meth)acrylic polymer. The polymerization mode of these chain polymerization polymers is not particularly limited. The chain polymerization polymer may be any one of a block copolymer, an alternating copolymer, or a random copolymer; however, it is preferably a random copolymer.

As the linear polymer, each of the above-described polymers can be appropriately selected; however, a (meth)acrylic polymer, a fluorine-based polymer, or a vinyl polymer is preferable, and a (meth)acrylic polymer or a fluorine-based polymer is more preferable.

Examples of the (meth)acrylic polymer suitable as a linear polymer include a (co)polymer with a (meth)acrylic compound (M1) and furthermore, preferably with a compound from which a constitutional component having a functional group having a pKa of 8 or less is derived, where the polymer is a polymer consisting of a polymer containing 50% by mass or more of a constitutional component derived from a (meth)acrylic compound. Here, in a case where the constitutional component having a functional group having a pKa of 8 or less is a constitutional component derived from a (meth)acrylic acid compound or a (meth)acrylic compound, the content of the constitutional component having a functional group having a pKa of 8 or less is included for calculation in the content of the constitutional component derived from a (meth)acrylic compound. Further, the (meth)acrylic polymer is also preferably a copolymer with a vinyl monomer other than the (meth)acrylic compound (M1).

Examples of the fluorine-based polymer suitable as a linear polymer include a (co)polymer of a polymerizable compound (a fluorine-containing polymerizable compound) containing a fluorine atom. Further, the fluorine-based polymer is also preferably a copolymer with a (meth)acrylic compound (M1), a vinyl monomer other than the (meth)acrylic compound (M1), a compound from which a constitutional component having a functional group having a pKa of 8 or less is derived, or the like.

Examples of the vinyl polymer suitable as a linear polymer include a (co)polymer with a vinyl monomer other than the (meth)acrylic compound (M1) and furthermore, preferably with a compound from which a constitutional component having a functional group having a pKa of 8 or less is derived, where the polymer is a polymer consisting of a copolymer containing 50% by mass or more of a constitutional component derived from a vinyl monomer. Here, in a case where the constitutional component having a functional group having a pKa of 8 or less is a constitutional component derived from a vinyl monomer, the content of the constitutional component having a functional group having a pKa of 8 or less is included for calculation in the content of the constitutional component derived from a vinyl monomer. Further, the vinyl polymer is also preferably a copolymer with the (meth)acrylic compound (M1).

Examples of the (meth)acrylic compound (M1) include a compound (into which a functional group having a pKa of 8 or less is not introduced) other than the compound from which the constitutional component having a functional group having a pKa of 8 or less is derived, among the (meth)acrylic acid ester compound, the (meth)acrylamide compound, the (meth)acrylonitrile compound, and the like. Among the above, a (meth)acrylic acid ester compound or a (meth)acrylamide compound is preferable.

Examples of the (meth)acrylic acid ester compound include a (meth)acrylic acid alkyl ester compound, a (meth)acrylic acid aryl ester compound, a (meth)acrylic acid ester compound having a heterocyclic group, and a (meth)acrylic acid ester compound having a polymerized chain, where a (meth)acrylic acid alkyl ester compound is preferable. The number of carbon atoms of the alkyl group that constitutes the (meth)acrylic acid alkyl ester compound is not particularly limited; however, it can be set to, for example, 1 to 24, and it is preferably 3 to 20, more preferably 4 to 16, and still more preferably 6 to 14, in terms of dispersibility and adhesiveness. In the present invention, as the (meth)acrylic acid alkyl ester compound, it is also possible to use, in combination, a (meth)acrylic acid ester compound having a long-chain alkyl group having 4 to 16 carbon atoms and a (meth)acrylic acid ester compound having a short-chain alkyl group having 1 to 3 carbon atoms. The number of carbon atoms of the aryl group that constitutes the aryl ester is not particularly limited; however, it can be set to, for example, 6 to 24, and it is preferably 6 to 10 and more preferably 6. In the (meth)acrylamide compound, the nitrogen atom of the amide group may be substituted with an alkyl group or an aryl group. The polymerized chain contained in the (meth)acrylic acid ester compound is not particularly limited; however, it is preferably an alkylene oxide polymerized chain and more preferably a polymerized chain consisting of an alkylene oxide having 2 to 4 carbon atoms. The degree of polymerization of the polymerized chain is not particularly limited and is appropriately set. An alkyl group or an aryl group is generally bonded to the end part of the polymerized chain.

The fluorine-containing polymerizable compound is not particularly limited, and examples thereof include a compound that is generally used in a fluorine-based polymer. For example, it refers to a compound in which a fluorine atom is bonded to a carbon-carbon double bond directly or through a linking group. The linking group is not particularly limited; however, examples thereof include a linking group in the above-described constitutional component having a functional group having a pKa of 8 or less. The fluorine-containing polymerizable compound is not particularly limited; however, examples thereof include fluorinated vinyl compounds such as vinylidene fluoride (VDF), hexafluoropropylene (HFP), tetrafluoroethylene (TFE), trifluoroethylene, monofluoroethylene, and chlorotrifluoroethylene, and perfluoroalkyl ether compounds such as trifluoromethyl vinyl ether and pentafluoroethyl vinyl ether.

The vinyl monomer is not particularly limited. However, among the vinyl compounds that is copolymerizable with the (meth)acrylic compound (M1) or the like, the vinyl compound (M2) other than the vinyl compound from which the constitutional component having a functional group having a pKa of 8 or less is preferable, and examples thereof include aromatic vinyl compounds such as a styrene compound, a vinylnaphthalene compound, and a vinylcarbazole compound, as well as compounds into which a functional group having a pKa of 8 or less is not introduced, such as an allyl compound, a vinyl ether compound, a vinyl ester compound, a dialkyl itaconate compound, and an unsaturated carboxylic acid anhydride. Examples of the vinyl compound include the “vinyl monomer” disclosed in JP2015-88486A.

Each of the (meth)acrylic compound (M1), the fluorine-containing polymerizable compound, and the vinyl compound (M2) may have a substituent. The substituent is not particularly limited as long as it is a group other than the functional group having pKa8 or less, and examples thereof include a group selected from the substituent Z described later.

The (meth)acrylic compound (M1) and the vinyl compound (M2) are preferably a compound represented by Formula (b-1). It is preferable that this compound is different from the above-described compound from which a constitutional component having a functional group having a pKa of 8 or less is derived.

(b-1)

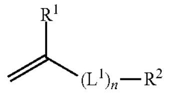

In the formula, $R^1$ represents a hydrogen atom, a hydroxy group, a cyano group, a halogen atom, an alkyl group (preferably having 1 to 24 carbon atoms, more preferably 1 to 12 carbon atoms, and particularly preferably 1 to 6 carbon atoms), an alkenyl group (preferably having 2 to 24 carbon atoms, more preferably 2 to 12 carbon atoms, and particularly preferably 2 to 6 carbon atoms), an alkynyl group (preferably having 2 to 24 carbon atoms, more preferably 2 to 12 carbon atoms, and particularly preferably 2 to 6 carbon atoms), or an aryl group (preferably having 6 to 22 carbon atoms and more preferably 6 to 14 carbon atoms). Among the above, a hydrogen atom or an alkyl group is preferable, and a hydrogen atom or a methyl group is more preferable.

$R^2$ represents a hydrogen atom or a substituent. The substituent that can be adopted as $R^2$ is not particularly limited. However, examples thereof include an alkyl group (preferably a linear chain although it may be a branched chain), an alkenyl group (preferably having 2 to 12 carbon atoms, more preferably 2 to 6 carbon atoms, and particularly preferably 2 or 3 carbon atoms), an aryl group (preferably having 6 to 22 carbon atoms and more preferably 6 to 14 carbon atoms), an aralkyl group (preferably having 7 to 23 carbon atoms and more preferably 7 to 15 carbon atoms), and a cyano group.

The number of carbon atoms of the alkyl group has the same meaning as the number of carbon atoms of the alkyl group that constitutes the (meth)acrylic acid alkyl ester compound, and the same applies to the preferred range thereof.

$L^1$ is a linking group and is not particularly limited; however, examples thereof include a linking group in the above-described constitutional component having a functional group having a pKa of 8 or less.

In a case where $L^1$ adopts a —CO—O— group or a —CO—N($R^N$)— group ($R^N$ is as described above) (here, an aspect in which —O— or —N($R^N$)— is bonded to $R^2$), the compound represented by Formula (b-1) corresponds to the (meth)acrylic compound (M1), the others correspond to the vinyl compound (M2).

n is 0 or 1 and preferably 1. However, in a case where $-(L^1)_n-R^2$ represents one kind of substituent (for example, an alkyl group), n is set to 0, and $R^2$ is set to a substituent (an alkyl group).

The (meth)acrylic compound (M1) is preferably a compound represented by Formula (b-2) or (b-3). It is preferable that each of these compounds is different from the above-described compound from which a constitutional component having a functional group having a pKa of 8 or less is derived.

(b-2)

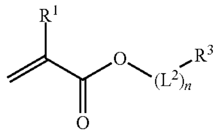

(b-3)

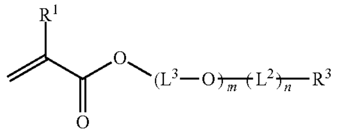

$R^1$ and n respectively have the same meanings as those in Formula (b-1).

$R^3$ has the same meaning as $R^2$.

$L^2$ is a linking group and has the same meaning as the above $L^1$.

$L^3$ is a linking group and has the same meaning as the above $L^1$; however, it is preferably an alkylene group having 1 to 6 carbon atoms (preferably 2 to 4).

m is preferably an integer of 1 to 200, more preferably an integer of 1 to 100, and still more preferably an integer of 1 to 50.

In Formulae (b-1) to (b-3), the carbon atom which forms a polymerizable group and to which $R^1$ is not bonded is represented as an unsubstituted carbon atom ($H_2C$═); however, it may have a substituent. The substituent is not particularly limited; however, examples thereof include the above group that can be adopted as $R^1$.

Further, in Formulae (b-1) to (b-3), the group which may adopt a substituent such as an alkyl group, an aryl group, an alkylene group, or an arylene group may have a substituent within a range where the effect of the present invention is not impaired. The substituent is not particularly limited, and examples thereof include a group selected from the substituent Z described later, where specific examples thereof include a halogen atom.

Specific examples of the (meth)acrylic compound (M1) and the vinyl compound (M2) include compounds from which constitutional components in the linear polymer are derived, where the polymers will be described later and are those in Examples; however, the present invention is not limited thereto.

The linear polymer may have one kind of the above-described (meth)acrylic compound (M1), fluorine-containing polymerizable compound, or vinyl monomer, or it may have two or more kinds thereof.

The linear polymer can adopt a form having or a form not having a constitutional component derived from a macromonomer having a number average molecular weight of 1,000 or more. In the present invention, a form not having a constitutional component derived from a macromonomer is preferable. The macromonomer having a number average molecular weight of 1,000 or more is not particularly limited as long as it does not include the compound represented by any one of Formulae (b-1) to (b-3), and examples thereof include the macromonomer (X) described in JP2015-088486A.

The content of each constitutional component in the linear polymer is not particularly limited, is determined by appropriately considering the rotation radius α of the polymer, the SP value, and the like, and is set, for example, in the following range.

The content of each constitutional component in the (meth)acrylic polymer is set, for example, in the following range such that the total content of all the constitutional components is 100% by mass.

The content of the constitutional components derived from the (meth)acrylic compound (the constitutional component derived from the (meth)acrylic compound and the constitutional component derived from the (meth)acrylic compound (M1) among the constitutional components having a functional group having a pKa of 8 or less) is preferably 50% by mass or more, more preferably 70% by mass or more, and still more preferably 90% by mass or more. The upper limit content can be set to 100% by mass; however, it can be also set to 98% by mass or less.

The content of the constitutional component (excluding the constitutional component having a functional group having a pKa of 8 or less) derived from the (meth)acrylic compound (M1) is, for example, preferably 45% to 100% by mass, more preferably 50% to 100% by mass, still more preferably 70% to 100% by mass, and particularly preferably 90% to 98% by mass.

The content of the constitutional component having a functional group having a pKa of 8 or less is, for example, preferably 0% to 55% by mass, more preferably 1% to 30% by mass, still more preferably 3% to 20% by mass, and particularly preferably 3% to 7% by mass.

The content of the constitutional component derived from the vinyl compound (excluding the constitutional component having a functional group having a pKa of 8 or less) is set to 50% by mass or less, and it is preferably 0% to 40% by mass and more preferably 0% to 30% by mass. The content of the constitutional component derived from the styrene compound among the vinyl compounds is set in consideration of the above-described range; however, it is preferably 0% to 40% by mass and more preferably 10% to 30% by mass.

The content of the constitutional component derived from the macromonomer is, for example, preferably 0% to 30% by mass.

The content of each constitutional component in the fluorine-based polymer is set, for example, in the following range such that the total content of all the constitutional components is 100% by mass.

The contents of the constitutional components derived from a fluorine-containing polymerizable compound (a constitutional component derived from a fluorine-containing polymerizable compound among the constitutional components having a functional group having a pKa of 8 or less and a constitutional component derived from a fluorine-containing polymerizable compound not having a functional group having a pKa of 8 or less) are not particularly limited, and they are, for example, more preferably 60% by mass or more and still more preferably 80% by mass or more. The upper limit content can be set to 100% by mass; however, it is preferably 97% by mass or less and more preferably 94% by mass or less.

The content of the constitutional component (excluding the constitutional component having a functional group having a pKa of 8 or less) derived from a fluorine-containing polymerizable compound is, for example, preferably 50% to 100% by mass, more preferably 60% to 100% by mass, and still more preferably 70% to 100% by mass. The content of the constitutional component derived from a vinylidene fluoride compound among the fluorine-containing polymerizable compounds is set in consideration of the above-described range; however, it is preferably 50% to 90% by mass and more preferably 60% to 85% by mass. In addition, the content of the constitutional component derived from a hexafluoropropylene compound is set in consideration of the above-described range; however, it is preferably 10% to 50% by mass and more preferably 15% to 40% by mass.

The content of the constitutional component having a functional group having a pKa of 8 or less is, for example, preferably 0% to 30% by mass, more preferably 0% to 20% by mass, and still more preferably 0.05% to 10% by mass.

Each of contents of the constitutional components derived from the (meth)acrylic compound (M1), the constitutional components derived from the vinyl compound, or the constitutional component derived from the macromonomer is not particularly limited, and it can be set to, for example, 0% to 15% by mass.

The content of each constitutional component in the vinyl polymer is set, for example, in the following range such that the total content of all the constitutional components is 100% by mass.

The contents of constitutional components derived from a vinyl monomer (a constitutional component derived from a vinyl monomer and a constitutional component derived from a vinyl monomer other than the (meth)acrylic compound (M1), among the components having a functional group having a pKa of 8 or less) is preferably more than 50% by mass, more preferably 60% by mass or more, and still more preferably 70% by mass or more. The upper limit content can be set to 100% by mass; however, it can be also set to 90% by mass or less.

The content of the constitutional component (excluding the constitutional component having a functional group having a pKa of 8 or less) derived from a vinyl compound is, for example, preferably 50% to 90% by mass, more preferably 60% to 90% by mass, and still more preferably 65% to 85% by mass. The content of the constitutional component derived from the styrene compound among the vinyl compounds is set in consideration of the above-described range; however, it is preferably 0% to 80% by mass and more preferably 10% to 50% by mass.

The content of the constitutional component having a functional group having a pKa of 8 or less is, for example, preferably 0% to 30% by mass, more preferably 0% to 20% by mass, and still more preferably 0.05% to 10% by mass.

It suffices that the content of the constitutional component (excluding the constitutional component having a functional group having a pKa of 8 or less) derived from the (meth) acrylic compound (M1) is less than 50% by mass, where the content of the constitutional component is, for example, preferably 0% to 40% by mass and more preferably 0% to 30% by mass.

The content of the constitutional component derived from the macromonomer is, for example, preferably 0% to 30% by mass.

The linear polymer may have a substituent. The substituent is not particularly limited; however, examples thereof preferably include a group selected from the following substituent Z.

The linear polymer can be synthesized with a known method by selecting a raw material compound depending on the kind of bond of the main chain and subjecting the raw material compound to polyaddition or polycondensation.

—Substituent Z—

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, and oleyl), an alkynyl group (preferably an alkynyl group having 2 to 20 carbon atoms, for example, ethynyl, butadienyl, and phenylethynyl), a cycloalkyl group (preferably a cycloalkyl group having 3 to 20 carbon atoms, such as cyclopropyl, cyclopentyl, cyclohexyl, and 4-methylcyclohexyl; in the present invention, the alkyl group generally has a meaning including a cycloalkyl group therein when being referred to, however, it will be described separately here), an aryl group (preferably an aryl group having 6 to 26 carbon atoms, such as phenyl, 1-naphthyl, 4-methoxyphenyl, 2-chlorophenyl, and 3-methylphenyl), an aralkyl group (preferably an aralkyl group having 7 to 23 carbon atoms, for example, benzyl or phenethyl), and a heterocyclic group (preferably a heterocyclic group having 2 to 20 carbon atoms and more preferably a 5- or 6-membered heterocyclic group having at least one oxygen atom, one sulfur atom, or one nitrogen atom. The heterocyclic group includes an aromatic heterocyclic group and an aliphatic heterocyclic group. Examples thereof include a tetrahydropyran ring group, a tetrahydrofuran ring group, a 2-pyridyl group, a 4-pyridyl group, a 2-imidazolyl group, a 2-benzimidazolyl group, a 2-thiazolyl group, a 2-oxazolyl group, or a pyrrolidone group); an alkoxy group (preferably an alkoxy group having 1 to 20 carbon atoms, for example, a methoxy group, an ethoxy group, an isopropyloxy group, or a benzyloxy group); an aryloxy group (preferably an aryloxy group having 6 to 26 carbon atoms, for example, a phenoxy group, a 1-naphthyloxy group, a 3-methylphenoxy group, or a 4-methoxyphenoxy group); a heterocyclic oxy group (a group in which an —O— group is bonded to the above-described heterocyclic group), an alkoxycarbonyl group (preferably an alkoxycarbonyl group having 2 to 20 carbon atoms, for example, an ethoxycarbonyl group, a 2-ethylhexyloxycarbonyl group, or a dodecyloxycarbonyl group); an aryloxycarbonyl group (preferably an aryloxycarbonyl group having 6 to 26 carbon atoms, for example, a phenoxycarbonyl group, a 1-naphthyloxycarbonyl group, a 3-methylphenoxycarbonyl group, or a 4-methoxyphenoxycarbonyl group); a heterocyclic oxycarbonyl group (a group in which a —O—CO— group is bonded to the above-described heterocyclic group); an amino group (preferably an amino group having 0 to 20 carbon atoms, an alkylamino group, or an arylamino group, for example, an amino ($-NH_2$) group, an N,N-dimethylamino group, an N,N-diethylamino group, an N-ethylamino group, or an anilino group); a sulfamoyl group (preferably a sulfamoyl group having 0 to 20 carbon atoms, for example, an N,N-dimethylsulfamoyl group or an N-phenylsufamoyl group); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, an acetyl group, a propionyl group, a butyryl group, an octanoyl group, a hexadecanoyl group, an acryloyl group, a methacryloyl group, a crotonoyl group, a benzoyl group, a naphthoyl group, or a nicotinoyl group); an acyloxy group (an alkylcarbonyloxy group, an alkenylcarbonyloxy group, an alkynylcarbonyloxy group, or a heterocyclic carbonyloxy group, preferably an acyloxy group having 1 to 20 carbon atoms, for example, an acetyloxy group, a propionyloxy group, a butyryloxy group, an octanoyloxy group, a hexadecanoyloxy group, an acryloyloxy group, a methacryloyloxy group, a crotonoyloxy group, or a nicotinoyloxy group); an aryloyloxy group (preferably an aryloyloxy group having 7 to 23 carbon atoms, for example, a benzoyloxy group or a naphthoyloxy group); a carbamoyl group (preferably a carbamoyl group having 1 to 20 carbon atoms, for example, an N,N-dimethylcarbamoyl group or an N-phenylcarbamoyl group); an acylamino group (preferably an acylamino group having 1 to 20 carbon atoms, for example, an acetylamino group or a benzoylamino group); an alkylthio group (preferably an alkylthio group having 1 to 20 carbon atoms, for example, a methylthio group, an ethylthio group, an isopropylthio group, or a benzylthio group); an arylthio group (preferably an arylthio group having 6 to 26 carbon atoms, for example, a phenylthio group, a 1-naphthylthio group, a 3-methylphenylthio group, or a 4-methoxyphenylthio group); a heterocyclic thio group (a group in which an —S— group is bonded to the above-described heterocyclic group), an alkylsulfonyl group (preferably an alkylsulfonyl group having 1 to 20 carbon atoms, for example, a methylsulfonyl group or an ethylsulfonyl group), an arylsulfonyl group (preferably an arylsulfonyl group having 6 to 22 carbon atoms, for example, a benzenesulfonyl group), an alkylsilyl group (preferably an alkylsilyl group having 1 to 20 carbon atoms, for example, a monomethylsilyl group, a dimethylsilyl group, a trimethylsilyl group, or a triethylsilyl group); an arylsilyl group (preferably an arylsilyl group having 6 to 42 carbon atoms, for example, a triphenylsilyl group), an alkoxysilyl group (preferably an alkoxysilyl group having 1 to 20 carbon atoms, for example, a monomethoxysilyl group, a dimethoxysilyl group, a trimethoxysilyl group, or a triethoxysilyl group), an aryloxysilyl group (preferably an aryloxysilyl group having 6 to 42 carbon atoms, for example, a triphenyloxysilyl group), a phosphoryl group (preferably a phosphate group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a phosphonate group (preferably a phosphonate group having 0 to 20 carbon atoms, for example, —PO(O$R^P$)$_2$), a sulfo group (a sulfonate group), a carboxy group, a hydroxy group, a sulfanyl group, a cyano group, and a halogen atom (for example, a fluorine atom, a chlorine atom, a bromine atom, or an iodine atom). $R^P$ represents a hydrogen atom or a substituent (preferably a group selected from the substituent Z).

In addition, each group exemplified in the substituent Z may be further substituted with the substituent Z.

The alkyl group, the alkylene group, the alkenyl group, the alkenylene group, the alkynyl group, the alkynylene group, and/or the like may be cyclic or chained, may be linear or branched.

Specific examples of the linear polymer include polymers shown below in addition to those synthesized in Examples; however, the present invention is not limited thereto. It is noted that in the following specific example, the content of the constitutional component is appropriately set in consideration of the rotation radius α, the SP value, and the like.

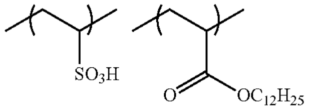

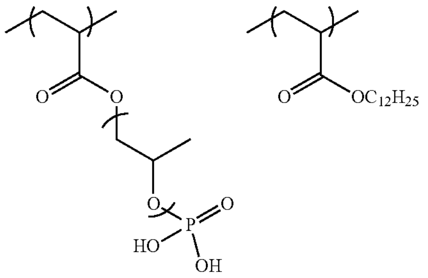

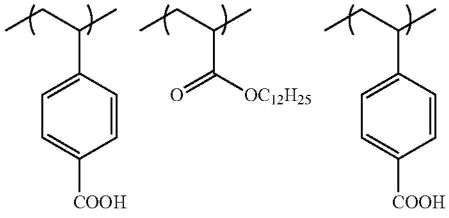

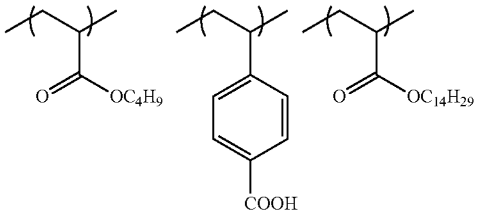

-continued

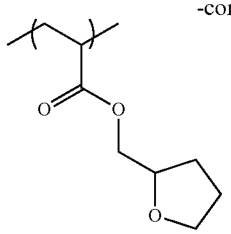

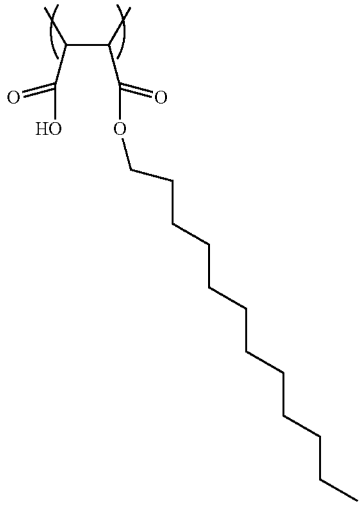

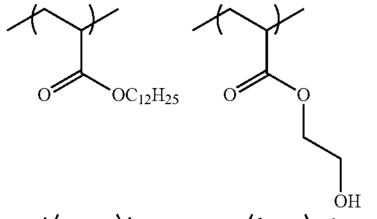

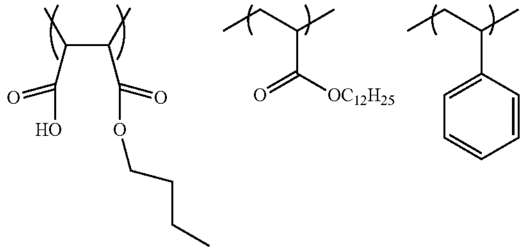

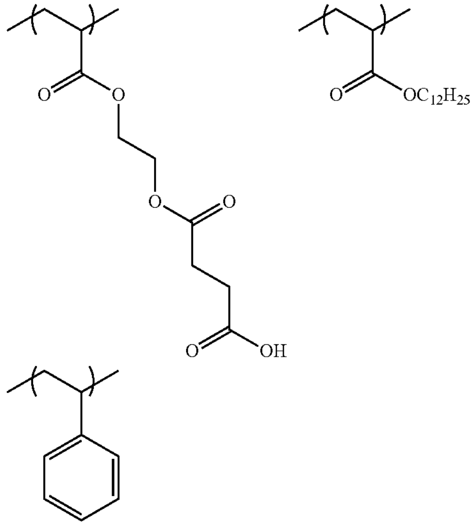

The linear polymer, which is contained in the polymer binder, may be one kind or two or more kinds. In addition, the polymer binder may contain another polymer as long as the action of the linear polymer is not impaired. As another polymer, a polymer that is generally used as a binder for an all-solid state secondary battery can be used without particular limitation.

The binder contained in the electrode composition may be one kind or two or more kinds.

The content of the binder in the electrode composition is not particularly limited. However, in terms of the improvement of the dispersibility and the suppression of the decrease in ion conductivity as well as in terms of the reinforcement of the binding property of solid particles, it is preferably 0.05% to 8.0% by mass, more preferably 0.1% to 6.0% by mass, still more preferably 0.2% to 4.0% by mass, and particularly preferably 0.2% to 1.0% by mass. In addition, for the same reason, the content of the binder in 100% by mass of the solid content of the electrode composition is preferably 0.1% to 10.0% by mass, more preferably 0.2% to 8% by mass, still more preferably 0.3% to 6.0% by mass, and particularly preferably 0.3% to 1.0% by mass.

In the present invention, the mass ratio [(the mass of the inorganic solid electrolyte+the mass of the active material)/(the mass of the polymer binder)] of the total mass (the total amount) of the inorganic solid electrolyte and the active material to the mass of the polymer binder in the solid content of 100% by mass is preferably in a range of 1,000 to 1. Furthermore, this ratio is more preferably 500 to 2 and still more preferably 100 to 10.

<Dispersion Medium>

The electrode composition according to the embodiment of the present invention contains a dispersion medium that disperses or dissolves each of the above components.

It suffices that such a dispersion medium is an organic compound that is in a liquid state in the use environment, examples thereof include various organic solvents, and specific examples thereof include an alcohol compound, an ether compound, an amide compound, an amine compound, a ketone compound, an aromatic compound, an aliphatic compound, a nitrile compound, and an ester compound.

The dispersion medium may be a non-polar dispersion medium (a hydrophobic dispersion medium) or a polar dispersion medium (a hydrophilic dispersion medium); however, a non-polar dispersion medium is preferable from the viewpoint that excellent dispersibility can be exhibited. The non-polar dispersion medium generally refers to a dispersion medium having a property of a low affinity to water; however, in the present invention, examples thereof include an ester compound, a ketone compound, an ether compound, an aromatic compound, and an aliphatic compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (diethylene glycol, triethylene glycol, polyethylene glycol, dipropylene glycol, or the like), an alkylene glycol monoalkyl ether (ethylene glycol monomethyl ether, ethylene glycol monobutyl ether, diethylene glycol monomethyl ether, propylene glycol monomethyl ether, dipropylene glycol monomethyl ether, tripropylene glycol monomethyl ether, diethylene glycol monobutyl ether, or the like), alkylene glycol dialkyl ether (ethylene glycol dimethyl ether or the like), a dialkyl ether (dimethyl ether, diethyl ether, diisopropyl ether, dibutyl ether, or the like), and a cyclic ether (tetrahydrofuran, dioxane (including 1,2-, 1,3- or 1,4-isomer), or the like).

Examples of the amide compound include N,N-dimethylformamide, N-methyl-2-pyrrolidone, 2-pyrrolidinone, 1,3-dimethyl-2-imidazolidinone, F-caprolactam, formamide, N-methylformamide, acetamide, N-methylacetamide, N,N-dimethylacetamide, N-methylpropanamide, and hexamethylphosphoric triamide.

Examples of the amine compound include triethylamine, diisopropylethylamine, and tributylamine.

Examples of the ketone compound include acetone, methyl ethyl ketone, methyl isobutyl ketone (MIBK), cyclopentanone, cyclohexanone, cycloheptanone, dipropyl ketone, dibutyl ketone, diisopropyl ketone, diisobutyl ketone (DIBK), isobutyl propyl ketone, sec-butyl propyl ketone, pentyl propyl ketone, and butyl propyl ketone.

Examples of the aromatic compound include benzene, toluene, xylene, and perfluorotoluene.

Examples of the aliphatic compound include hexane, heptane, octane, nonane, decane, dodecane, cyclohexane, methylcyclohexane, ethylcyclohexane, cycloheptane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, propyl acetate, butyl acetate, ethyl butyrate, propyl butyrate, isopropyl butyrate, butyl butyrate, isobutyl butyrate, butyl pentanoate, pentyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

In the present invention, among them, an ether compound, a ketone compound, an aromatic compound, an aliphatic compound, or an ester compound is preferable, and an ester compound, a ketone compound, an aromatic compound, or an ether compound is more preferable.

The number of carbon atoms of the compound that constitutes the dispersion medium is not particularly limited, and it is preferably 2 to 30, more preferably 4 to 20, still more preferably 6 to 15, and particularly preferably 7 to 12.

In terms of the dispersibility of the solid particles, the dispersion medium preferably has an SP value (unit: $MPa^{1/2}$) of 14 to 24, more preferably 15 to 22, and still more preferably 17 to 20. The difference (in terms of absolute value) in SP value between the dispersion medium and the linear polymer is not particularly limited and can be set to, for example, 7.0 or less. However, it is preferably 3 or less, more preferably 0 to 2, and still more preferably 0 to 1, in that the molecular chain of the linear polymer is extended in the dispersion medium to improve the dispersibility thereof, whereby the dispersibility of the solid particles can be further improved.

The SP value of the dispersion medium is defined as a value obtained by converting the SP value calculated according to the Hoy method described above into the unit of $MPa^{12}$. In a case where the electrode composition contains two or more kinds of dispersion media, the SP value of the dispersion medium means the SP value of the entire dispersion media, and it is the sum of the products of the SP values and the mass fractions of the respective dispersion media. Specifically, the calculation is carried out in the same manner as the above-described method of calculating the SP value of the polymer, except that the SP value of each of the dispersion media is used instead of the SP value of the constitutional component.

The SP values (the units are omitted) of the main dispersion media are shown below.

MIBK (18.4), diisopropyl ether (16.8), dibutyl ether (17.9), diisopropyl ketone (17.9), DIBK (17.9), butyl butyrate (18.6), butyl acetate (18.9), toluene (18.5), ethylcyclohexane (17.1), cyclooctane (18.8), isobutyl ethyl ether (15.3), N-methylpyrrolidone (NMP, 25.4), perfluorotoluene (13.4)

The dispersion medium preferably has a boiling point of 50° C. or higher and more preferably 70° C. or higher at normal pressure (1 atm). The upper limit thereof is preferably 250° C. or lower and more preferably 220° C. or lower.

The dispersion medium contained in the electrode composition according to the embodiment of the present invention may be one kind or may be two or more kinds. Examples of the example thereof in which two or more kinds of dispersion media are contained include mixed xylene (a mixture of o-xylene, p-xylene, m-xylene, and ethylbenzene).

In the present invention, the content of the dispersion medium in the electrode composition is not particularly limited and can be appropriately set. For example, the content of the dispersion medium in the electrode composition is preferably 10% to 80% by mass, more preferably 30% to 70% by mass, and still more preferably 40% to 60% by mass.

Since the electrode composition according to the embodiment of the present invention contains an inorganic solid electrolyte and an active material, which satisfy the above-described relationship, as well as a polymer binder, the electrode composition can have a high concentration of solid contents (have a reduced content of the dispersion medium) without impairing the dispersibility and the like. For example, the content of the dispersion medium in the electrode composition can be set to 40% by mass or less and can be reduced to 30% by mass or less. The lower limit of the content in this case is practically 5% by mass or more, and it is preferably 10% by mass or more. Such an electrode composition having an increased concentration of solid contents makes it possible to form an active material layer having an increased layer thickness, which is suitable for increasing the energy density.

<Conductive Auxiliary Agent>

The electrode composition according to the embodiment of the present invention preferably contains a conductive auxiliary agent, and for example, it is preferable that the silicon atom-containing active material as the negative electrode active material is used in combination with a conductive auxiliary agent.

The conductive auxiliary agent is not particularly limited, and conductive auxiliary agents that are known as ordinary conductive auxiliary agents can be used. It may be, for example, graphite such as natural graphite and artificial graphite, carbon black such as acetylene black, Ketjen black, and furnace black, amorphous carbon such as needle cokes, carbon fibers such as a vapor-grown carbon fiber and a carbon nanotube, or a carbonaceous material such as graphene or fullerene, which are electron-conductive materials, and it may be also a metal powder or metal fiber of copper, nickel, or the like. A conductive polymer such as polyaniline, polypyrrole, polythiophene, polyacetylene, or a polyphenylene derivative may also be used.

In the present invention, in a case where the active material is used in combination with the conductive auxiliary agent, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material at the time of charging and discharging of a battery is not unambiguously determined but is determined by the combination with the active material.

The conductive auxiliary agent contained in the electrode composition according to the embodiment of the present invention may be one kind or two or more kinds.

The shape of the conductive auxiliary agent is not particularly limited but is preferably a particle shape.

In a case where the electrode composition according to the embodiment of the present invention contains the conductive auxiliary agent, the content of the conductive auxiliary agent in the electrode composition is preferably 0% to 10% by mass and more preferably 0% to 5% by mass with respect to 100% by mass of the solid content.

<Lithium Salt>

It is also preferable that the electrode composition according to the embodiment of the present invention contains a lithium salt (supporting electrolyte).

Generally, the lithium salt is preferably a lithium salt that is used for this kind of product and is not particularly limited. For example, lithium salts described in paragraphs 0082 to 0085 of JP2015-088486A are preferable.

In a case where the electrode composition according to the embodiment of the present invention contains a lithium salt, the content of the lithium salt is preferably 0.1 parts by mass or more and more preferably 5 parts by mass or more with respect to 100 parts by mass of the solid electrolyte. The upper limit thereof is preferably 50 parts by mass or less and more preferably 20 parts by mass or less.

<Dispersing Agent>

Since the above-described polymer binder functions as a dispersing agent as well, the electrode composition according to the embodiment of the present invention may not contain a dispersing agent other than this polymer binder; however, it may contain a dispersing agent. As the dispersing agent, a dispersing agent that is generally used for an all-solid state secondary battery can be appropriately selected and used. Generally, a compound intended for particle adsorption and steric repulsion and/or electrostatic repulsion is suitably used.

<Other Additives>

As components other than the respective components described above, the electrode composition according to the embodiment of the present invention may appropriately contain an ionic liquid, a thickener, a polymerization initiator (an agent that generates an acid or a radical by heat or light), an antifoaming agent, a leveling agent, a dehydrating agent, or an antioxidant. The ionic liquid is contained in order to further improve the ion conductivity, and the known one in the related art can be used without particular limitation. Further, a polymer other than the above-described linear polymer, a commonly used binding agent, and the like may be contained.

(Preparation of Electrode Composition)

The electrode composition according to the embodiment of the present invention can be prepared by mixing an inorganic solid electrolyte, an active material, the above-described polymer binder, a dispersion medium, preferably, a conductive auxiliary agent, and further appropriately a lithium salt, and any other optional components, as a mixture and preferably as a slurry by using, for example, various mixers that are used generally.

The mixing method is not particularly limited, and it can be carried out using a known mixer such as a ball mill, a beads mill, a planetary mixer, a blade mixer, a roll mill, a kneader, a disc mill, a self-rotation type mixer, or a narrow gap type disperser. Each component may be mixed collectively or may be mixed sequentially. A mixing environment is not particularly limited; however, examples thereof include a dry air environment and an inert gas environment. In addition, the mixing conditions are not particularly limited and are appropriately set.

[Electrode Sheet for all-Solid State Secondary Battery]

The electrode sheet for an all-solid state secondary battery according to the embodiment of the present invention (simply, may be also referred to as an electrode sheet) is a sheet-shaped molded body with which an active material layer or electrode (a laminate of an active material layer and a collector) of an all-solid state secondary battery can be formed, and it includes various aspects depending on use applications thereof.

The electrode sheet according to the embodiment of the present invention has an active material layer formed of the above-described electrode composition according to the embodiment of the present invention on the surface of the base material. Therefore, the electrode sheet according to the embodiment of the present invention has an active material layer having a uniform layer thickness and a predetermined shape even by an industrial manufacturing method, for example, a roll-to-roll method having high productivity. This electrode sheet is used as an active material layer of an all-solid state secondary battery and as an electrode of an all-solid state secondary battery in a case where a collector is used as a base material.

The electrode sheet according to the embodiment of the present invention may be any electrode sheet having an active material layer on the surface of the base material. In addition, the electrode sheet includes an aspect including the base material, the active material layer, and the solid electrolyte layer in this order and an aspect including the base material, the active material layer, the solid electrolyte layer, and the active material layer in this order. The electrode sheet may have another layer in addition to each of the above-described layers. Examples of the other layer include a protective layer (a stripping sheet) and a coating layer.

The base material is not particularly limited as long as it can support the active material layer, and examples thereof include sheet bodies (plate-shaped bodies) such as a material described in the section of the collector described later, an organic material, and an inorganic material. Examples of the organic materials include various polymers, and specific examples thereof include polyethylene terephthalate, polypropylene, polyethylene, and cellulose. Examples of the inorganic materials include glass and ceramic.

The active material layer is formed of the electrode composition according to the embodiment of the present invention. In the active material layer formed of the electrode composition according to the embodiment of the present invention, the content of each component is not particularly limited; however, it is preferably synonymous with the content of each component in the solid content of the electrode composition according to the embodiment of the present invention. The layer thickness of each of the layers forming the electrode sheet according to the embodiment of the present invention is the same as the layer thickness of each of the layers described in the section of the all-solid state secondary battery described later.

In the present invention, each layer that constitutes a sheet for an all-solid state secondary battery may have a monolayer structure or a multilayer structure.

It is noted that the solid electrolyte layer as well as the active material layer in a case where the electrode composition according to the embodiment of the present invention is not formed is formed of a general constitutional layer forming material.

In the electrode sheet according to the embodiment of the present invention, the active material layer on the surface of the base material is formed of the electrode composition according to the embodiment of the present invention. Therefore, in a case of using the electrode sheet according to the embodiment of the present invention as an active material layer of an all-solid state secondary battery or as an electrode of an all-solid state secondary battery in a case where a collector is used as a base material, it is possible to realize an all-solid state secondary battery that exhibits a high ion conductivity (low resistance).

The electrode sheet for an all-solid state secondary battery according to the embodiment of the present invention includes an active material layer having a uniform layer thickness and a predetermined shape even in a case of being produced by industrial manufacturing, for example, a roll-to-roll method having high productivity. In addition, the electrode sheet for an all-solid state secondary battery according to the embodiment of the present invention can be used as it is (without cutting off the edge or the like of the sheet-shaped body) as an electrode of the all-solid state secondary battery. The use of this electrode sheet for an all-solid state secondary battery as an electrode contributes to the manufacture of an all-solid state secondary battery having a high ion conductivity and low resistance, in particular, to the application of industrial manufacturing, while suppressing the production cost. As a result, the electrode sheet for an all-solid state secondary battery according to the embodiment of the present invention is suitably used as a sheet with which an electrode of an all-solid state secondary battery can be formed. In the present invention, the active material layer having a uniform layer thickness and a predetermined shape is an active material layer formed by suppressing the occurrence of dripping and coating unevenness of the electrode composition and can be evaluated as described in Examples.

[Manufacturing Method for Electrode Sheet for all-Solid State Secondary Battery]

The manufacturing method for an electrode sheet for an all-solid state secondary battery according to the embodiment of the present invention is not particularly limited, and examples thereof include a method of forming a film (carrying out coating and drying) of the electrode composition according to the embodiment of the present invention on the surface of a base material (another layer may be interposed) to form a layer (a coated and dried layer) consisting of the electrode composition. This makes it possible to produce a sheet having a base material and a coated and dried layer. Here, the coated and dried layer refers to a layer formed by applying the electrode composition according to the embodiment of the present invention and drying the dispersion medium (that is, a layer formed using the electrode composition according to the embodiment of the present invention and consisting of a composition obtained by removing the dispersion medium from the electrode composition according to the embodiment of the present invention). In the coated and dried layer or the active material layer consisting of the coated and dried layer, the dispersion medium may remain within a range where the effect of the present invention does not deteriorate, and the residual amount thereof, for example, in each of the layers may be 3% by mass or lower.

In the manufacturing method for an electrode sheet for an all-solid state secondary battery according to the embodiment of the present invention, each of the steps such as coating and drying will be described in the section of the manufacturing method for an all-solid state secondary battery.

In this way, it is possible to produce an electrode sheet for an all-solid state secondary battery having an active material layer that has been produced by appropriately subjecting an active material layer consisting of a coated and dried layer or a coated and dried layer to a pressurization treatment or the like. The pressurizing condition and the like of the coated and dried layer will be described later in the section of the manufacturing method for an all-solid state secondary battery.

In addition, in the manufacturing method for a sheet for an all-solid state secondary battery according to the embodiment of the present invention, the base material, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The all-solid state secondary battery according to the embodiment of the present invention is not particularly limited in the configuration as long as it has a solid electrolyte layer between the positive electrode active material layer and the negative electrode active material layer, and for example, a known configuration for an all-solid state secondary battery can be employed. The positive electrode active material layer is preferably formed on a positive electrode collector to configure a positive electrode. The negative electrode active material layer is preferably formed on a negative electrode collector to configure a negative electrode.

It is preferable that at least one layer of the negative electrode active material layer or the positive electrode active material layer is formed of the electrode composition according to the aspect of the present invention or both the negative electrode active material layer and the positive electrode active material layer are formed of the electrode composition according to the aspect of the present invention. The all-solid state secondary battery according to the embodiment of the present invention, in which at least one of the negative electrode active material layer or the positive electrode active material layer is formed of the electrode composition according to the embodiment of the present invention, exhibits a high ion conductivity (low resistance) even in a case of being manufactured by an industrially advantageous roll-to-roll method and can take out a large current.

In the active material layer formed of the electrode composition according to the embodiment of the present invention, it is preferable that the kinds of components to be included and the content thereof are the same as those of the solid content of the electrode composition according to the embodiment of the present invention. In a case where the active material layer or the solid electrolyte layer is not formed of the electrode composition according to the embodiment of the present invention, a known material in the related art can be used.

In the present invention, each constitutional layer (including a collector and the like) that constitutes an all-solid state secondary battery may have a monolayer structure or a multilayer structure.

<Positive Electrode Active Material Layer and Negative Electrode Active Material Layer>

The thickness of each of the negative electrode active material layer and the positive electrode active material layer is not particularly limited. In case of taking a dimension of a general all-solid state secondary battery into account, the thickness of each of the layers is preferably 10 to 1,000 m and more preferably 20 m or more and less than 500 m. In the all-solid state secondary battery according to the embodiment of the present invention, the thickness of at least one layer of the positive electrode active material layer or the negative electrode active material layer is still more preferably 50 m or more and less than 500 m.

The active material layer having the above-described thickness may be a single layer (single application of an electrode composition) or may be a plurality of layers (a plurality of times of application of an electrode composition). However, in terms of resistance reduction and productivity, it is preferable to form, as a single layer, an active material layer having a large layer thickness using the electrode composition according to the embodiment of the present invention, which enables layer thickening. The layer thickness of the layer-thickened single-layer active material, which can be preferably formed with the electrode composition according to the embodiment of the present invention, can be set to, for example, 70 m or more and can be also set to furthermore, 100 m or more.

<Solid Electrolyte Layer>

The solid electrolyte layer is formed using a known material that is capable of forming a solid electrolyte layer of an all-solid state secondary battery. The thickness thereof is not particularly limited; however, it is preferably 10 to 1,000 m, and more preferably 20 m or more and less than 500 m.

<Collector>

Each of the positive electrode active material layer and the negative electrode active material layer may include a collector on the side opposite to the solid electrolyte layer. Such a positive electrode collector and such a negative electrode collector are preferably an electron conductor.

In the present invention, either or both of the positive electrode collector and the negative electrode collector will also be simply referred to as the collector.

As a material that forms the positive electrode collector, not only aluminum, an aluminum alloy, stainless steel, nickel, or titanium but also a material (a material on which a thin film has been formed) obtained by treating the surface of aluminum or stainless steel with carbon, nickel, titanium, or silver is preferable. Among these, aluminum or an aluminum alloy is more preferable.

As a material that forms the negative electrode collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, a film sheet shape is typically used; however, it is also possible to use shapes such as a net shape, a punched shape, a lath body, a porous body, a foaming body, and a molded body of a fiber group.

The thickness of the collector is not particularly limited; however, it is preferably 1 to 500 m. In addition, protrusions and recesses are preferably provided on the surface of the collector by carrying out a surface treatment.

<Other Configurations>

In the present invention, a functional layer, a functional member, or the like may be appropriately interposed or disposed between or on the outside of the respective layers of the negative electrode collector, the negative electrode active material layer, the solid electrolyte layer, the positive electrode active material layer, and the positive electrode collector.

<Housing>

Depending on the use application, the all-solid state secondary battery according to the embodiment of the present invention may be used as the all-solid state secondary battery having the above-described structure as it is but is preferably sealed in an appropriate housing to be used in the form of a dry cell. The housing may be a metallic housing or a resin (plastic) housing. In a case where a metallic housing is used, examples thereof include an aluminum alloy housing and a stainless steel housing. It is preferable that the metallic housing is classified into a positive electrode-side housing and a negative electrode-side housing and that the positive electrode-side housing and the negative electrode-side housing are electrically connected to the positive electrode collector and the negative electrode collector, respectively. The positive electrode-side housing and the negative electrode-side housing are preferably integrated by being joined together through a gasket for short circuit prevention.

Hereinafter, the all-solid state secondary battery according to the preferred embodiment of the present invention will be described with reference to FIG. 1; however, the present invention is not limited thereto.

FIG. 1 is a cross-sectional view schematically illustrating an all-solid state secondary battery (a lithium ion secondary battery) according to a preferred embodiment of the present invention. In a case of being seen from the negative electrode side, an all-solid state secondary battery 10 of the present embodiment includes a negative electrode collector 1, a negative electrode active material layer 2, a solid electrolyte layer 3, a positive electrode active material layer 4, and a positive electrode collector 5 in this order. The respective layers are in contact with each other, and thus structures thereof are adjacent. In a case in which the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated in the negative electrode return to the positive electrode side, and electrons are supplied to an operation portion 6. In an example illustrated in the drawing, an electric bulb is employed as a model at the operation portion 6 and is lit by discharging.

Figure 2:
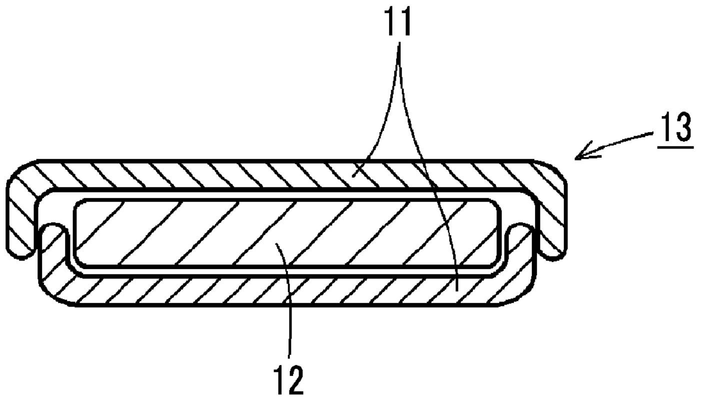
FIG. 2 is a vertical cross-sectional view schematically illustrating a coin-type all-solid state secondary battery produced in Examples.

In a case where the all-solid state secondary battery having a layer configuration illustrated in FIG. 1 is placed in a 2032-type coin case, the all-solid state secondary battery will be referred to as a laminate 12 for an all-solid state secondary battery, and a battery produced by placing this laminate 12 for an all-solid state secondary battery into a 2032-type coin case 11 (for example, a coin-type all-solid state secondary battery illustrated in FIG. 2) will be referred to as an all-solid state secondary battery 13, whereby both batteries may be distinctively referred to in some cases.

(Solid Electrolyte Layer)

As the solid electrolyte layer, a solid electrolyte layer in the related art, which is applied to an all-solid state secondary battery, can be used without particular limitation. This solid electrolyte layer contains an inorganic solid electrolyte having an ion conductivity of a metal belonging to Group 1 or Group 2 in the periodic table, any component described above, and the like within a range where the effect of the present invention is not impaired, and it generally does not contain an active material.

(Positive Electrode Active Material Layer and Negative Electrode Active Material Layer)

In the all-solid state secondary battery 10, both the positive electrode active material layer and the negative electrode active material layer are formed of the electrode composition according to the embodiment of the present invention. Preferably, the positive electrode in which the positive electrode active material layer and the positive electrode collector are laminated, and the negative electrode in which the negative electrode active material layer and the negative electrode collector are laminated are formed of the electrode sheet according to the embodiment of the present invention, to which a collector is applied as a base material.

The positive electrode active material layer contains an inorganic solid electrolyte having an ion conductivity of a metal belonging to Group 1 or Group 2 in the periodic table, a positive electrode active material, a polymer binder, any component described above, and the like within a range where the effect of the present invention is not impaired.

The negative electrode active material layer contains an inorganic solid electrolyte having an ion conductivity of a metal belonging to Group 1 or Group 2 in the periodic table, a negative electrode active material, a polymer binder, any component described above, and the like within a range where the effect of the present invention is not impaired. In the all-solid state secondary battery 10, the negative electrode active material layer can be a lithium metal layer. Examples of the lithium metal layer include a layer formed by depositing or molding a lithium metal powder, a lithium foil, and a lithium vapor deposition film. The thickness of the lithium metal layer can be, for example, 1 to 500 m regardless of the above thickness of the above negative electrode active material layer.

The kinds of the inorganic solid electrolyte and the polymer binder which are contained in the positive electrode active material layer 4, the solid electrolyte layer 3, and the negative electrode active material layer 2 may be identical to or different from each other.

In the present invention, in a case of forming the active material layer with the electrode composition according to the embodiment of the present invention, it is possible to realize an all-solid state secondary battery exhibiting a high ion conductivity (having low resistance) even in a case of being manufactured by a roll-to-roll method which is advantageous industrially.

(Collector)

The positive electrode collector 5 and the negative electrode collector 1 are as described above.

[Manufacture of all-Solid State Secondary Battery]

The all-solid state secondary battery can be manufactured by a conventional method. Specifically, the all-solid state secondary battery can be manufactured by forming at least one active material layer by using the electrode composition according to the embodiment of the present invention or the like, and then forming a solid electrolyte layer and appropriately the other active material layer or an electrode by using the known materials.

The all-solid state secondary battery according to the embodiment of the present invention can be manufactured by carrying out a method (a manufacturing method for an electrode sheet for an all-solid state secondary battery according to the embodiment of the present invention) which includes (is carried out through) a step of coating and drying on a surface of a base material (for example, a metal foil serving as a collector) with the electrode composition according to the embodiment of the present invention to form a coating film (form a film).

For example, a film of an electrode composition which contains a positive electrode active material and serves as a positive electrode material (a positive electrode composition) is formed on a metal foil which is a positive electrode collector, to form a positive electrode active material layer, thereby producing a positive electrode sheet for an all-solid state secondary battery. Next, a film of the solid electrolyte composition for forming a solid electrolyte layer is formed on the positive electrode active material layer to form the solid electrolyte layer. Furthermore, a film of the electrode composition containing a negative electrode active material as a negative electrode material (a negative electrode composition) is formed on the solid electrolyte layer to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the forming method for each layer in reverse order to form a negative electrode active material layer, a solid electrolyte layer, and a positive electrode active material layer on a negative electrode collector and overlaying a positive electrode collector thereon.

As another method, the following method can be exemplified. That is, the positive electrode sheet for an all-solid state secondary battery is produced as described above. In addition, a film of an electrode composition which contains a negative electrode active material and serves as a negative electrode material (a negative electrode composition) is formed on a metal foil which is a negative electrode collector, to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. In this manner, an all-solid state secondary battery can be manufactured.

As still another method, for example, the following method can be used. That is, the positive electrode sheet for an all-solid state secondary battery and the negative electrode sheet for an all-solid state secondary battery are produced as described above. In addition, separately from the positive electrode sheet for an all-solid state secondary battery and the negative electrode sheet for an all-solid state secondary battery, a film of the inorganic solid electrolyte-containing composition is formed on a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated such that the solid electrolyte layer peeled from the base material is sandwiched therebetween. In this manner, an all-solid state secondary battery can be manufactured.

Further, as another method, a positive electrode sheet for an all-solid state secondary battery, a negative electrode sheet for an all-solid state secondary battery, and a solid electrolyte sheet for an all-solid state secondary battery are produced as described above. Next, the positive electrode sheet for an all-solid state secondary battery or negative electrode sheet for an all-solid state secondary battery, and the solid electrolyte sheet for an all-solid state secondary battery are overlaid and pressurized into a state where the positive electrode active material layer or the negative electrode active material layer is brought into contact with the solid electrolyte layer. In this way, the solid electrolyte layer is transferred to the positive electrode sheet for an all-solid state secondary battery or the negative electrode sheet for an all-solid state secondary battery. Then, the solid electrolyte layer from which the base material of the solid electrolyte sheet for an all-solid state secondary battery has been peeled off and the negative electrode sheet for an all-solid state secondary battery or positive electrode sheet for an all-solid state secondary battery are overlaid and pressurized (into a state where the negative electrode active material layer or positive electrode active material layer is brought into contact with the solid electrolyte layer). In this way, an all-solid state secondary battery can be manufactured. The pressurizing method and the pressurizing conditions in this method are not particularly limited, and a method and pressurizing conditions described in the pressurization step, which will be described later, can be applied.

The active material layer or the like can also be formed on the substrate or the active material layer, for example, by pressure-molding the electrode composition or the like under a pressurizing condition described below, or a sheet molded body can also be used.

In the above-described manufacturing method, it suffices that the electrode composition according to the embodiment of the present invention is used for any one of the positive electrode composition or the negative electrode composition, and the electrode composition according to the embodiment of the present invention can be also used for both the positive electrode composition and the negative electrode composition.

In a case where the active material layer is formed of a composition other than the electrode composition according to the embodiment of the present invention, examples thereof include a typically used composition. In addition, the negative electrode active material layer can also be formed by bonding ions of a metal belonging to Group 1 or Group 2 in the periodic table, which are accumulated on a negative electrode collector during initialization described later or during charging for use, without forming the negative electrode active material layer during the manufacturing of the all-solid state secondary battery to electrons and precipitating the ions on a negative electrode collector the like as a metal.

<Formation of Individual Layer (Film Formation)>

The coating method for each composition is not particularly limited and can be appropriately selected. Examples thereof include coating (preferably wet-type coating), spray coating, spin coating, dip coating, slit coating, stripe coating, and bar coating.

The applied composition is preferably subjected to a drying treatment (a heat treatment). The drying treatment may be carried out each time after the composition is applied or may be carried out after it is subjected to multilayer application. The drying temperature is not particularly limited; however, is preferably 30° C. or higher, more preferably 60° C. or higher, and still more preferably 80° C. or higher. The upper limit thereof is not particularly limited; however, it is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (coated and dried layer). This temperature range is preferable since the temperature is not excessively increased and each member of the all-solid state secondary battery is not impaired. As a result, excellent overall performance is exhibited in the all-solid state secondary battery, and it is possible to obtain a good ion conductivity.

After applying each composition, it is preferable to pressurize each layer or the all-solid state secondary battery after superimposing the constitutional layers or producing the all-solid state secondary battery. Examples of the pressurizing methods include a method using a hydraulic cylinder press machine. The pressurizing force is not particularly limited; however, it is generally preferably in a range of 5 to 1,500 MPa.

In addition, each of the applied compositions may be heated while being pressurized. The heating temperature is not particularly limited but is generally in a range of 30° C. to 300° C. The press can also be applied at a temperature higher than the glass transition temperature of the inorganic solid electrolyte. It is also possible to carry out the press at a temperature higher than the glass transition temperature of the polymer contained in the polymer binder. However, in general, the temperature does not exceed the melting point of this polymer.

The pressurization may be carried out in a state where the coating solvent or dispersion medium has been dried in advance or in a state where the solvent or the dispersion medium remains.

The respective compositions may be applied at the same time, and the application, the drying, and the pressing may be carried out simultaneously and/or sequentially. Each of the compositions may be applied onto each of the separate base materials and then laminated by carrying out the transfer.

The atmosphere in the film forming method (coating, drying, and pressurization (under heating)) is not particularly limited and may be any one of the atmospheres such as atmospheric air, an atmosphere of dry air (the dew point: −20° C. or lower), and an atmosphere of inert gas (for example, an argon gas, a helium gas, or a nitrogen gas).

The pressing time may be a short time (for example, within several hours) under the application of a high pressure or a long time (one day or longer) under the application of an intermediate pressure. In case of members other than the electrode sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be variable depending on the area or the film thickness of the portion under pressure. In addition, the pressure can also be variable stepwise for the same portion.

A pressing surface may be flat or roughened.

In the present invention, the formation of each layer described above, particularly the formation of a film of the electrode composition according to the embodiment of the present invention can be carried out using a sheet-like base material in a so-called batch system; however, a roll-to-roll method, which has high productivity among the industrial manufacturing methods, can also be used.

In addition, the active material layer that is used for manufacturing an all-solid state secondary battery may be prepared, for example, by cutting out or punching an electrode sheet for an all-solid state secondary battery; however, it is preferable to use the produced sheet for an all-solid state secondary battery as it is, in terms of productivity and reduction of a production cost.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state where the pressing pressure is increased and then releasing the pressure up to a pressure at which the all-solid state secondary battery is ordinarily used.

[Use Application of all-Solid State Secondary Battery]

The all-solid state secondary battery according to the embodiment of the present invention can be applied to a variety of usages. The application aspect thereof is not particularly limited, and in a case of being mounted in an electronic apparatus, examples thereof include a notebook computer, a pen-based input personal computer, a mobile personal computer, an e-book player, a mobile phone, a cordless phone handset, a pager, a handy terminal, a portable fax, a mobile copier, a portable printer, a headphone stereo, a video movie, a liquid crystal television, a handy cleaner, a portable CD, a mini disc, an electric shaver, a transceiver, an electronic notebook, a calculator, a memory card, a portable tape recorder, a radio, and a backup power supply. Additionally, examples of consumer usages include automobiles (electric vehicles and the like), electric motor vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with a solar battery.

EXAMPLES

Hereinafter, the present invention will be described in more detail based on Examples; however, the present invention is not limited thereto be interpreted. "Parts" and "%" that represent compositions in the following Examples are based on the mass unless particularly otherwise described. In the present invention, "room temperature" means 25° C.

1. Polymer Synthesis and Preparation of Binder Solution or Dispersion Liquid

Each of polymers having the chemical formulae described later and shown in Table 1 was synthesized as follows.

Synthesis Example S-1: Synthesis of Polymer S-1 and Preparation of Binder Solution S-1

To a 100 mL graduated cylinder, 34.9 g of dodecyl acrylate (manufactured by Tokyo Chemical Industry Co., Ltd.), 1.1 g of maleic acid anhydride (manufactured by FUJIFILM Wako Pure Chemical Corporation), and 0.36 g of a polymerization initiator V-601 (product name, manufactured by FUJIFILM Wako Pure Chemical Corporation) were added and dissolved in 36.0 g of butyl butyrate to prepare a monomer solution.

To a 300 mL three-necked flask, 18.0 g of butyl butyrate was added and stirred at 80° C., and then the above monomer solution was added dropwise thereto over 2 hours. After the completion of the dropwise addition, the solution was heated to 90° C. and stirred for 2 hours. The obtained polymerization solution was poured into 480 g of a water/acetone mixed solvent (weight ratio: 70/30), stirred for 10 minutes, and then allowed to stand for 10 minutes. The precipitate obtained after removing the supernatant was dissolved in 80 g of butyl butyrate and heated at 30 hPa and 60° C. for 1 hour to distill off methanol.

In this way, a polymer S-1 (a (meth)acrylic polymer as a random copolymer) was synthesized, and then a binder solution S-1 (concentration: 38% by mass) consisting of the polymer S-1 was obtained.

Synthesis Example S-2: Synthesis of Polymer S-2 and Preparation of Binder Solution S-2

100 parts by mass of ion exchange water, 65 parts by mass of vinylidene fluoride, 20 parts by mass of hexafluoropropene, and 15 parts by mass of tetrafluoroethylene were added to an autoclave, and 1 part by mass of a polymerization initiator PEROYL IPP (product name, chemical name: diisopropyl peroxydicarbonate, manufactured by NOF CORPORATION) was further added thereto and stirred at 40° C. for 24 hours. After stirring, the precipitate was filtered and dried at 100° C. for 10 hours. 150 parts by mass of butyl butyrate was added to 10 parts by mass of the obtained polymer and dissolved.

In this way, a polymer S-2 (a fluorine-based polymer as a random copolymer) was synthesized, and then a binder solution S-2 (concentration: 6.3% by mass) consisting of the polymer S-2 was obtained.

Synthesis Example S-3: Synthesis of Polymer S-3 and Preparation of Binder Solution S-3

100 parts by mass of ion exchange water, 70 parts by mass of vinylidene fluoride, and 30 parts by mass of hexafluoropropene were added to an autoclave, and 1 part by mass of a polymerization initiator PEROYL IPP (product name, chemical name: diisopropyl peroxydicarbonate, manufactured by NOF CORPORATION) was further added thereto and stirred at 40° C. for 24 hours. After stirring, the precipitate was filtered and dried at 100° C. for 10 hours. 40 parts by mass of butyl butyrate was added to 10 parts by mass of the obtained polymer and dissolved.

In this way, a polymer S-3 (a fluorine-based polymer as a random copolymer) was synthesized, and then a binder solution S-3 (concentration: 20% by mass) consisting of the polymer S-3 was obtained.

Synthesis Example S-4: Synthesis of Polymer S-4 and Preparation of Binder Solution S-4

To a 100 mL graduated cylinder, 34.2 g of dodecyl acrylate (manufactured by Tokyo Chemical Industry Co., Ltd.), 1.8 g of monoisopropyl fumarate (manufactured by Tokyo Chemical Industry Co., Ltd.), and 0.36 g of a polymerization initiator V-601 (product name, manufactured by FUJIFILM Wako Pure Chemical Corporation) were added and dissolved in 36.0 g of butyl butyrate to prepare a monomer solution.

To a 300 mL three-necked flask, 18.0 g of butyl butyrate was added and stirred at 80° C., and then the above monomer solution was added dropwise thereto over 2 hours. After the completion of the dropwise addition, the solution was heated to 90° C. and stirred for 2 hours.

In this way, a polymer S-4 (a (meth)acrylic polymer as a random copolymer) was synthesized, and then a binder solution S-4 (concentration: 40% by mass) consisting of the polymer S-4 was obtained.

Synthesis Example S-5: Synthesis of Polymer S-5 and Preparation of Binder Solution S-5

A polymer S-5 was synthesized in the same manner as in Synthesis Example S-1 to obtain a binder solution S-5 consisting of this polymer, except that in Synthesis Example S-1, a compound from which each constitutional component is derived was used so that the polymer S-5 had the composition (the content of the constitutional component) shown in Table 1, and the adding amount of V-601 was changed to 1.08 g.

Synthesis Example S-6: Synthesis of Polymer S-6 and Preparation of Binder Solution S-6

A polymer S-6 was synthesized in the same manner as in Synthesis Example S-1 to obtain a binder solution S-6 consisting of this polymer, except that in Synthesis Example S-1, a compound from which each constitutional component is derived was used so that the polymer S-6 had the composition (the content of the constitutional component) shown in Table 1, and the adding amount of V-601 was changed to 3.16 g.

Synthesis Examples S-7 and S-8: Synthesis of Polymers S-7 and S-8 and Preparation of Binder Solutions S-7 and S-8

Each of polymers S-7 and S-8 was synthesized in the same manner as in Synthesis Example S-1 to obtain each of binder solutions S-7 and S-8 consisting of respective polymers, except that in Synthesis Example S-1, a compound from which each constitutional component is derived was used so that the polymers S-7 and S-8 had the composition (the content of the constitutional component) shown in Table 1.

Synthesis Example S-9: Synthesis of Polymer S-9 and Preparation of Binder Solution S-9

A polymer S-9 was synthesized in the same manner as in Synthesis Example S-6 to obtain a binder solution S-9 consisting of this polymer, except that in Synthesis Example S-6, a compound from which each constitutional component is derived was used so that the polymer S-9 had the composition (the kind and the content of the constitutional component) shown in Table 1.

Synthesis Example S-10: Synthesis of Polymer S-10 and Preparation of Binder Solution S-10

A polymer S-10 was synthesized in the same manner as in Synthesis Example S-2 to obtain a binder solution S-10 consisting of this polymer, except that in Synthesis Example S-2, the adding amount of PEROYL IPP was changed to 0.1 parts by mass.

Synthesis Example 5-11: Synthesis of Polymer 5-11 and Preparation of Binder Dispersion Liquid S-11

To a 100 mL graduated cylinder, 14.4 g of dodecyl methacrylate (manufactured by Tokyo Chemical Industry Co., Ltd.), 3.6 g of hydroxyethyl acrylate (manufactured by Tokyo Chemical Industry Co., Ltd.), 18.0 g of mono(2-acryloyloxyethyl) succinate, and 0.36 g of a polymerization initiator V-601 (product name, manufactured by FUJIFILM Wako Pure Chemical Corporation) were added and dissolved in 36.0 g of butyl butyrate to prepare a monomer solution.

To a 300 mL three-necked flask, 18.0 g of butyl butyrate was added and stirred at 80° C., and then the above monomer solution was added dropwise thereto over 2 hours. After the completion of the dropwise addition, the solution was heated to 90° C. and stirred for 2 hours.

In this way, a polymer S-11 (a (meth)acrylic polymer as a random copolymer) was synthesized, and then a binder dispersion liquid S-11 (concentration: 40% by mass) consisting of the polymer 5-11 was obtained. The average particle diameter of the binder in this dispersion liquid was 140 nm.

Synthesis Example T-1: Synthesis of Polymer T-1 and Preparation of Binder Solution T-1

A polymer T-1 was synthesized in the same manner as in Synthesis Example S-1 to obtain a binder solution T-1 consisting of this polymer, except that in Synthesis Example S-1, the adding amount of V-601 was changed to 0.12 g.

Synthesis Example T-2: Synthesis of Polymer T-2 and Preparation of Binder Solution T-2

A polymer T-2 was synthesized in the same manner as in Synthesis Example S-2 to obtain a binder solution T-2 consisting of this polymer, except that in Synthesis Example S-2, the adding amount of PEROYL IPP was changed to 0.8 parts by mass.

Synthesis Example T-3: Synthesis of Polymer T-3 and Preparation of Binder Solution T-3

A polymer T-3 was synthesized in the same manner as in Synthesis Example S-3 to obtain a binder solution T-3 consisting of this polymer, except that in Synthesis Example S-3, the adding amount of PEROYL IPP was changed to 0.3 parts by mass.

Synthesis Example T-4: Synthesis of Polymer T-4 and Preparation of Binder Solution T-4

A polymer T-4 was synthesized in the same manner as in Synthesis Example S-4 to obtain a binder solution T-4 consisting of this polymer, except that in Synthesis Example S-4, the adding amount of V-601 was changed to 0.32 g.

Synthesis Example T-5: Synthesis of Polymer T-5 and Preparation of Binder Solution T-5

A polymer T-5 was synthesized in the same manner as in Synthesis Example S-5 to obtain a binder solution T-5 consisting of this polymer, except that in Synthesis Example S-5, the adding amount of V-601 was changed to 1.20 g.

Synthesis Example T-6: Synthesis of Polymer T-6 and Preparation of Binder Solution T-6

A polymer T-6 was synthesized in the same manner as in Synthesis Example S-6 to obtain a binder solution T-6 consisting of this polymer, except that in Synthesis Example S-6, the adding amount of V-601 was changed to 3.30 g.

Synthesis Example T-7: Synthesis of Polymer T-7 and Preparation of Binder Dispersion Liquid T-7

To a 100 mL graduated cylinder, 38.8 g of dodecyl acrylate (manufactured by Tokyo Chemical Industry Co., Ltd.), 0.80 g of maleic acid (manufactured by FUJIFILM Wako Pure Chemical Corporation), 0.40 g of poly(ethylene glycol)diacrylate (manufactured by Sigma-Aldrich Co., LLC), and 0.36 g of a polymerization initiator V-601 (product name, manufactured by FUJIFILM Wako Pure Chemical Corporation) were added and dissolved in 40.0 g of butyl butyrate to prepare a monomer solution.

To a 300 mL three-necked flask, 20.0 g of butyl butyrate was added and stirred at 80° C., and then the above monomer solution was added dropwise thereto over 2 hours. After completion of the dropwise addition, stirring was carried out at 80° C. for 2 hours, and then the temperature was raised to 90° C., and stirring was carried out for 2 hours.

In this way, a polymer T-7 (a crosslinked (meth)acrylic polymer as a random copolymer) was synthesized. This polymer T-7 was not dissolved in butyl butyrate, and thus a binder consisting of the polymer T-7 was obtained as a dispersion liquid T-7 (concentration: 40% by mass). The average particle diameter of the binder in this dispersion liquid was 180 nm.

Preparation Example T-8: Preparation of Binder Solution T-8

As the polymer T-8, a polyvinylidene fluoride-hexafluoropropylene copolymer (a PVDF-HFP polymer, manufactured by Arkema S.A., mass average molecular weight: 100,000) was used. This polymer T-8 was dissolved in butyl butyrate to prepare a binder solution T-8 having a concentration of 10% by mass.

Table 1 shows the composition, mass average molecular weight, rotation radius α, and SP value ($MPa^{1/2}$) of each synthesized polymer. The mass average molecular weight, the rotation radius α, and the SP value ($MPa^{1/2}$) of the polymer were respectively measured according to the above-described methods.

It is noted that in the polymers S-2, S-3, S-10, T-2, T-3, and T-8, a compound from which a constitutional component constituting the fluorine-based polymer is derived is described together in the column of "Constitutional component M1" by using "/". Since the composition of the polymer T-8 is unknown, it is indicated by "-" in the column of "Content" and the column of "SP value".

"S" and "T" attached to the above-described polymer No. are used to more clearly indicate that the polymer is mainly used in the electrode composition of Examples or Comparative Examples and thus have no further meaning.

Each of the polymers synthesized is shown below. The content (% by mass) of each constitutional component is shown in Table 1.

S-1
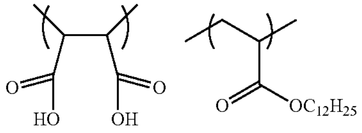
S-2 S-10
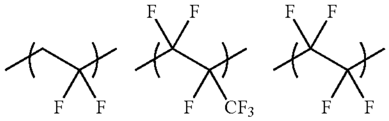
S-3
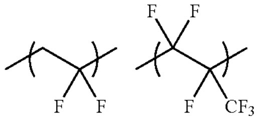
S-4
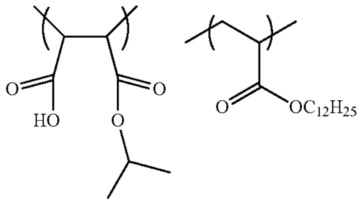
S-5
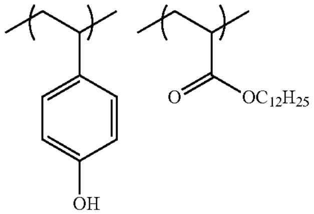
S-6 S-9
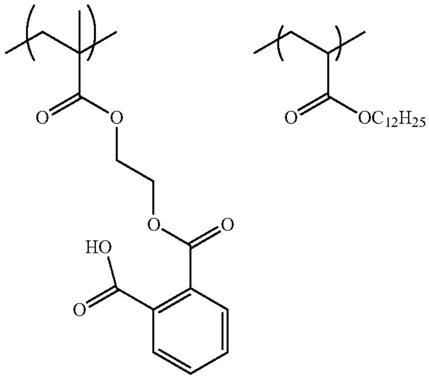
S-7
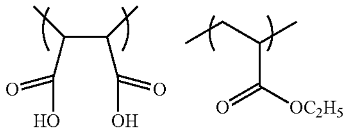
S-8
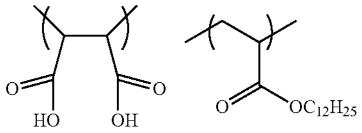
-continued
S-11
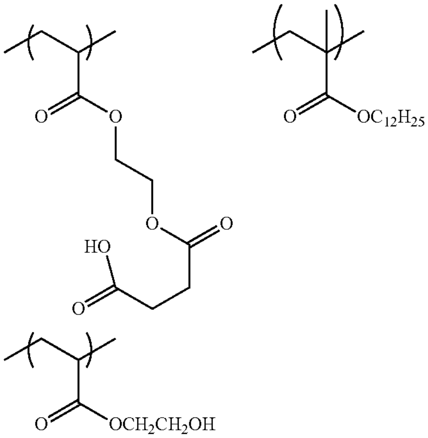
T-1
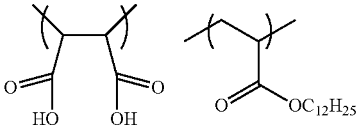
T-2
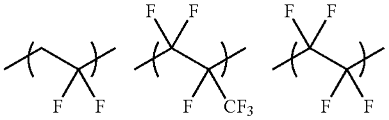
T-3 T-8
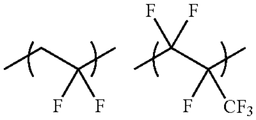
T-4
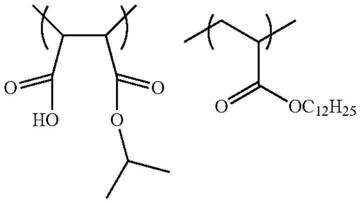
T-5
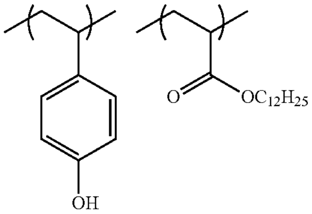

-continued

T-6

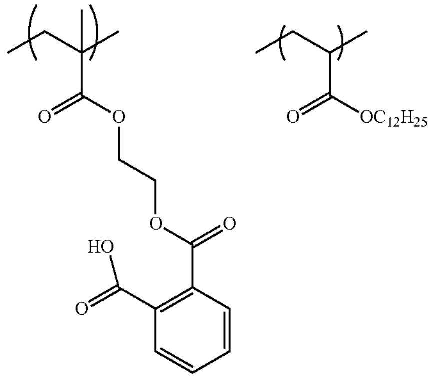

T-7

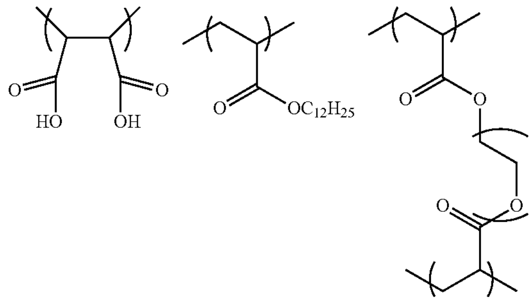

—Constitutional Component M1—

LA: Dodecyl acrylate (SP value: 18.8 $MPa^{1/2}$, manufactured by Tokyo Chemical Industry Co., Ltd.)

EA: Ethyl acrylate (SP value: 20.1 $MPa^{1/2}$, manufactured by Tokyo Chemical Industry Co., Ltd.)

LMA: Dodecyl methacrylate (SP value: 18.5 $MPa^{1/2}$, manufactured by Tokyo Chemical Industry Co., Ltd.)

VDF: Vinylidene fluoride (SP value: 13.1 $MPa^{1/2}$, manufactured by SynQuest Labs, Inc.)

HFP: Hexafluoropropylene (SP value: 9.4 $MPa^{1/2}$, manufactured by SynQuest Labs, Inc.)

TFE: Tetrafluoroethylene (SP value: 10.1 $MPa^{1/2}$, manufactured by SynQuest Labs, Inc.)

—Constitutional Component M2—

A constitutional component M2 represents a constitutional component having a functional group having a pKa of 8 or less.

Maleic acid: (SP value: 22.2 $MPa^{1/2}$, manufactured by FUJIFILM Wako Pure Chemical Corporation)

Monoisopropyl fumarate: (SP value: 20.3 $MPa^{1/2}$, manufactured by Tokyo Chemical Industry Co., Ltd.)

4-hydroxystyrene: (SP value: 21.9 $MPa^{1/2}$, manufactured by Tokyo Chemical Industry Co., Ltd.)

MAEHP: Mono-2-(methacryloyloxy)ethyl phthalate (SP value: 21.4 $MPa^{1/2}$, manufactured by Tokyo Chemical Industry Co., Ltd.)

AEHS: Mono(2-acryloyloxyethyl) succinate (manufactured by Tokyo Chemical Industry Co., Ltd., SP value: 21.8 $MPa^{1/2}$)

—Constitutional Component M3—

A constitutional component M3 represents a constitutional component that does not correspond to any of the constitutional components M1 and M2.

TABLE 1

| No. | Constitutional component M1 | Content (% by mass) | Constitutional component M2 | Content (% by mass) | Constitutional component M3 | Content (% by mass) | Rotation radius α (nm) | Mass average molecular weight | SP value ($MPa^{1/2}$) |
|---|---|---|---|---|---|---|---|---|---|
| S-1 | LA | 97 | Maleic acid | 3 | — | — | 50 | 81,000 | 18.9 |
| S-2 | VDF/HFP/TFE | 65/20/15 | — | — | — | — | 123 | 410,000 | 12.0 |
| S-3 | VDF/HFP | 70/30 | — | — | — | — | 172 | 980,000 | 12.1 |
| S-4 | LA | 95 | Monoisopropyl fumarate | 5 | — | — | 85 | 180,000 | 18.9 |
| S-5 | LA | 92 | 4-hydroxystyrene | 8 | — | — | 37 | 42,000 | 19.1 |
| S-6 | LA | 92 | MAEHP | 8 | — | — | 12 | 13,000 | 19.0 |
| S-7 | EA | 97 | Maleic acid | 3 | — | — | 55 | 95,000 | 20.2 |
| S-8 | LA | 90 | Maleic acid | 10 | | | 70 | 92,000 | 19.2 |
| S-9 | LA | 90 | MAEHP | 10 | — | — | 16 | 15,000 | 19.1 |
| S-10 | VDF/HFP/TFE | 65/20/15 | — | — | — | — | 178 | 1,100,000 | 12.0 |
| S-11 | LMA | 40 | AEHS | 50 | HEA | 10 | 140 | 630,000 | 21.0 |
| T-1 | LA | 97 | Maleic acid | 3 | — | — | 60 | 110,000 | 18.9 |
| T-2 | VDF/HFP/TFE | 65/20/15 | — | — | — | — | 140 | 620,000 | 12.0 |
| T-3 | VDF/HFP | 70/30 | — | — | — | — | 185 | 1,300,000 | 12.1 |
| T-4 | LA | 95 | Monoisopropyl fumarate | 5 | — | — | 72 | 160,000 | 18.9 |
| T-5 | LA | 92 | 4-hydroxystyrene | 8 | — | — | 30 | 35,000 | 19.1 |
| T-6 | LA | 92 | MAEHP | 8 | — | — | 7 | 10,000 | 19.0 |
| T-7 | LA | 97 | Maleic acid | 2 | PEGDA 700 | 1 | 114 | 350,000 | 18.8 |
| T-8 | VDF/HFP | — | — | — | — | — | 29 | 100,000 | — |

<Abbreviations in table>

In the table, "—" in the column of the constitutional component indicates that the constitutional component does not have a corresponding constitutional component.

The compounds from which the respective constitutional components are derived will be described below. It is noted that the SP value in the following compounds is a value in a case of being used as a constitutional component (a homopolymer).

HEA: Hydroxyethyl acrylate (SP value: 25.9 $MPa^{1/2}$, manufactured by Tokyo Chemical Industry Co., Ltd.)

PEGDA700: Poly(ethylene glycol)diacrylate (number average molecular weight: 700, SP value: 21.7 $MPa^{1/2}$, manufactured by Sigma-Aldrich Co., LLC)

2. Synthesis of Sulfide-Based Inorganic Solid Electrolyte

Synthesis Example L-1: Synthesis of Inorganic Solid Electrolyte LPS1 Having Median Diameter $D_{S1-50}$ of 60 nm A sulfide-based inorganic solid electrolyte was synthesized with reference to a non-patent document of T. Ohtomo, A. Hayashi, M. Tatsumisago, Y Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box in an argon atmosphere (dew point: −70° C.), lithium sulfide ($Li_2S$, manufactured by Sigma-Aldrich Co., LLC, purity: >99.98%) (2.42 g) and diphosphorus pentasulfide ($P_2S_5$, manufactured by Sigma-Aldrich Co., LLC, purity: >99%) (3.90 g) each were weighed, put into an agate mortar, and mixed using an agate pestle for five minutes. The mixing ratio between $Li_2S$ and $P_2S_5$ ($Li_2S$:$P_2S_5$) was set to 75:25 in terms of molar ratio.

Next, 66 g of zirconia beads having a diameter of 5 mm were put into a 45 mL container made of zirconia (manufactured by FRITSCH), the entire amount of the mixture of the above lithium sulfide and the diphosphorus pentasulfide was put thereinto, and the container was completely sealed in an argon atmosphere. The container was set in a planetary ball mill P-7 (product name, manufactured by FRITSCH), mechanical milling was carried out at a temperature of 25° C. and a rotation speed of 700 rpm for 48 hours, thereby obtaining a yellow powder (6.20 g) of a sulfide-based inorganic solid electrolyte (Li—P—S-based glass, hereinafter, may be denoted as LPS).

In this way, an inorganic solid electrolyte LPS1 having a median diameter $D_{S1-50}$ of 60 nm was synthesized.

Synthesis Example L-2: Synthesis of Inorganic Solid Electrolyte LPS2 Having Median Diameter $D_{S2-50}$ of 1,500 nm An inorganic solid electrolyte LPS2 having a median diameter $D_{S1-50}$ of 1,500 nm was synthesized in the same manner as in Synthesis Example L-1, except that in Synthesis Example L-1, the mechanical milling conditions were changed to 8 hours at a rotation speed of 700 rpm.

Synthesis Example L-3: Synthesis of Inorganic Solid Electrolyte LPS3 Having Median Diameter $D_{S3-50}$ of 2,900 nm An inorganic solid electrolyte LPS3 having a median diameter $D_{S1-50}$ of 2,900 nm was synthesized in the same manner as in Synthesis Example L-1, except that in Synthesis Example L-1, the mechanical milling conditions were changed to 4 hours at a rotation speed of 700 rpm.

Synthesis Example L-4: Synthesis of Inorganic Solid Electrolyte LPS4 Having Median Diameter $D_{S4-50}$ of 4,200 nm An inorganic solid electrolyte LPS4 having a median diameter $D_{S1-50}$ of 4,200 nm was synthesized in the same manner as in Synthesis Example L-1, except that in Synthesis Example L-1, the mechanical milling conditions were changed to 4 hours at a rotation speed of 650 rpm.

3. NMC: Preparation of $LiNi_{1/3}Co_{1/3}Mn_{1/3}O_2$ (Lithium Nickel Manganese Cobalt Oxide)

Synthesis Example C-1: Synthesis of NMC1 Having Median Diameter $D_{AC-50}$ of 55 nm Sodium hydroxide and ammonia were continuously supplied at 60° C. to an aqueous solution (1 mol/L), in which nickel sulfate, cobalt sulfate, and manganese sulfate were dissolved, to adjust the pH to 11.3, and a metal composite hydroxide, which is obtained by making nickel, manganese, and cobalt be solid-soluted in a molar ratio of 33:33:33 by a coprecipitation method, was prepared. This metal composite hydroxide and lithium carbonate were weighed so that the ratio of the total number of moles of metals (Ni, Co, and Mn) other than Li to the number of moles of Li was 1:1, and then they mixed sufficiently. The temperature was raised at a temperature rising rate of 5° C./min, and preliminary baking was carried out at 750° C. for 2 hours in an air atmosphere, and then the temperature was raised at a temperature rising rate of 3° C./min, and main baking was carried out at 850° C. for 10 hours, followed by cooling to room temperature to synthesize NMC1 having a median diameter $D_{AC-50}$ of 55 nm.

Synthesis Example C-2: Synthesis of NMC2 Having Median Diameter $D_{AC-50}$ of 140 nm NMC2 having a median diameter $D_{AC-50}$ of 140 nm was synthesized in the same manner as in Synthesis Example C-1, except that in Synthesis Example C-1, the preliminary baking temperature was set to 800° C. and the main baking temperature was set to 830° C.

Synthesis Example C-3: Synthesis of NMC3 Having Median Diameter $D_{AC-50}$ of 200 nm NMC3 having a median diameter $D_{AC-50}$ of 200 nm was synthesized in the same manner as in Synthesis Example C-1, except that in Synthesis Example C-1, the preliminary baking temperature was set to 820° C. and the main baking temperature was set to 890° C.

Synthesis Example C-4: Synthesis of NMC4 Having Median Diameter $D_{AC-50}$ of 1,700 nm NMC4 having a median diameter $D_{AC-50}$ of 1,700 nm was synthesized in the same manner as in Synthesis Example C-1, except that in Synthesis Example C-1, the preliminary baking temperature was set to 900° C. and the main baking temperature was set to 960° C.

Synthesis Example C-5: Synthesis of NMC5 Having Median Diameter $D_{AC-50}$ of 2,000 nm NMC5 having a median diameter $D_{AC-50}$ of 2,000 nm was synthesized in the same manner as in Synthesis Example C-1, except that in Synthesis Example C-1, the preliminary baking temperature was set to 930° C. and the main baking temperature was set to 960° C.

Synthesis Example C-6: Synthesis of NMC6 Having Median Diameter $D_{AC-50}$ of 2,500 nm NMC6 having a median diameter $D_{AC-50}$ of 2,500 nm was synthesized in the same manner as in Synthesis Example C-1, except that in Synthesis Example C-1, the preliminary baking temperature was set to 930° C. and the main baking temperature was set to 990° C.

Synthesis Example C-7: Synthesis of NMC7 Having Median Diameter $D_{AC-50}$ of 2,600 nm NMC7 having a median diameter $D_{AC-50}$ of 2,600 nm was synthesized in the same manner as in Synthesis Example C-1, except that in Synthesis Example C-1, the preliminary baking temperature was set to 960° C. and the main baking temperature was set to 990° C.

Synthesis Example C-8: Synthesis of NMC8 Having Median Diameter $D_{AC-50}$ of 4,000 nm NMC8 having a median diameter $D_{AC-50}$ of 4,000 nm was synthesized in the same manner as in Synthesis Example C-1, except that in Synthesis Example C-1, the preliminary baking temperature was set to 980° C. and the main baking temperature was set to 1,040° C.

Synthesis Example C-9: Synthesis of NMC9 Having Median Diameter $D_{AC-50}$ of 4,600 nm NMC9 having a median diameter $D_{AC-50}$ of 4,600 nm was synthesized in the same manner as in Synthesis Example C-1, except that in Synthesis Example C-1, the preliminary baking temperature was set to 1,000° C. and the main baking temperature was set to 1,080° C.

Synthesis Example C-10: Synthesis of NMC10 Having Median Diameter $D_{AC-50}$ of 5,000 nm NMC10 having a median diameter $D_{AC-50}$ of 5,000 nm was synthesized in the same manner as in Synthesis Example C-1, except that in Synthesis Example C-1, the preliminary baking temperature was set to 1,040° C. and the main baking temperature was set to 1,120° C.

Synthesis Example C-11: Synthesis of NMC 11 Having Median Diameter $D_{AC-50}$ of 5,300 nm NMC11 having a median diameter $D_{AC-50}$ of 5,300 nm was synthesized in the same manner as in Synthesis Example C-1, except that in Synthesis Example C-1, the preliminary baking temperature was set to 1,080° C. and the main baking temperature was set to 1,150° C.

4. Preparation of Silicon (Si)

- Silicon 1: Median diameter $D_{AA-50}$=55 nm (manufactured by Sigma-Aldrich Co., LLC)
- Silicon 2: Median diameter $D_{AA-50}$=200 nm (Silgrain MicronCut, manufactured by Elkem)
- Silicon 3: Median diameter $D_{AA-50}$=350 nm (Silgrain MicronCut, manufactured by Elkem)
- Silicon 4: Median diameter $D_{AA-50}$=2,000 nm (manufactured by Japan Natural Energy & Resources Co., Ltd.)
- Silicon 5: Median diameter $D_{AA-50}$=2,400 nm (manufactured by Japan Natural Energy & Resources Co., Ltd.)
- Silicon 6: Median diameter $D_{AA-50}$=2,800 nm (manufactured by Japan Natural Energy & Resources Co., Ltd.)
- Silicon 7: Median diameter $D_{AA-50}$=3,000 nm (manufactured by Japan Natural Energy & Resources Co., Ltd.)
- Silicon 8: Median diameter $D_{AA-50}$=4,000 nm (manufactured by Japan Natural Energy & Resources Co., Ltd.)
- Silicon 9: Median diameter $D_{AA-50}$=5,000 nm (manufactured by IPROS CORPORATION)
- Silicon 10: Median diameter $D_{AA-50}$=5,300 nm (manufactured by Japan Natural Energy & Resources Co., Ltd.)

Example 1

Each of the compositions shown in Table 2-1 to Table 2-4 (collectively referred to as Table 2) was prepared as follows.

<Preparation of Positive Electrode Composition>

60 g of zirconia beads having a diameter of 5 mm were put into a 45 mL container made of zirconia (manufactured by FRITSCH), and then 10.2 g of LPS shown in the column of "Inorganic solid electrolyte" of Table 2-1, where the LPS had been synthesized in each Synthesis Example L, and 13 g (total amount) of butyl butyrate as a dispersion medium were put thereinto. The container was set in a planetary ball mill P-7 (product name, manufactured by FRITSCH) and the components were stirred for 30 minutes at 25° C. and a rotation speed of 200 rpm. Then, into this container, 25.9 g of NMC as the positive electrode active material shown in the column of "Positive electrode active material" of Table 2-2, where the NMC had been synthesized in each Synthesis Example C, 0.74 g of acetylene black (AB) as the conductive auxiliary agent, and 0.19 g (in terms of solid content mass) of the binder solution or dispersion liquid shown in the column of "Binder solution or dispersion liquid" of Table 2-1 were put, the container was set in a planetary ball mill P-7, and mixing was continued for 30 minutes at a temperature of 25° C. and a rotation speed of 200 rpm to prepare each of positive electrode compositions (slurries) PK-1 to PK-14 and PKc21 to PKc31.

<Preparation of Negative Electrode Composition>

60 g of zirconia beads having a diameter of 5 mm was put into a 45 mL container made of zirconia (manufactured by FRITSCH), and 11.4 g of LPS shown in the column of "Inorganic solid electrolyte" of Table 2-3, where the LPS had been synthesized in each Synthesis Example L, 0.13 g (in terms of solid content mass) of the binder solution or dispersion liquid shown in the column of "Binder solution or dispersion liquid" of Table 2-3, and 25.0 g (total amount) of butyl butyrate were put thereinto. The container was set in a planetary ball mill P-7 (product name, manufactured by FRITSCH) and the components were mixed for 60 minutes at a temperature of 25° C. and a rotation speed of 300 rpm. Then, 12.5 g of silicon (Si) as the negative electrode active material shown in the column of "Negative electrode active material" of Table 2-4, where the silicon had been prepared as described above, and 1.0 g of VGCF (manufactured by Showa Denko K.K.) as the conductive auxiliary agent were put into the container. Similarly, the container was subsequently set in a planetary ball mill P-7, and mixing was carried out at a temperature of 25° C. for 10 minutes at a rotation speed of 100 rpm to prepare each of negative electrode compositions (slurries) NK-1 to NK-17 and NKc21 to NKc31.

Table 2 shows each of the viscosity (cP), the median diameters $D_{S-50}$ (nm) and $D_{A-50}$ (nm) of the inorganic solid electrolyte and the active material regarding each of the prepared compositions, as well as the mass average molecular weight, the rotation radius α, the SP value ($MPa^{1/2}$), the adsorption rate $A_{AM}$ (%) with respect to the active material, and the pKa of the functional group regarding the polymer that forms the binder. In addition, the median diameters $D_{50}$ of the inorganic solid electrolyte and the active material, which are contained in each composition, are calculated according to the above method and shown in the column of "$D_{50}$" of Table 2 (units are omitted in the table). Further, the difference (in terms of absolute value) between the SP value of each polymer and the SP value of the dispersion medium (SP value of butyl butyrate: 18.6 $MPa^{1/2}$) and pKa are calculated and are respectively shown in the column of "SP value difference" and the column of "pKa" of Table 2.

The viscosity (cP) of the composition, each median diameter (nm), mass average molecular weight, rotation radius α, and SP value ($MPa^{12}$) were respectively measured or calculated according to the above-described methods. The adsorption rate $A_{AM}$ (%) with respect to the active material was measured according to the following method (units are omitted in the table).

In Table 2, the composition content is the content (% by mass) with respect to the total mass of the composition, and the solid content is the content (% by mass) with respect to 100% by mass of the solid content of the composition. The unit is omitted in the table. In addition, the unit of each of the SP value and the SP value difference shown in Table 2 is $MPa^{12}$, and the unit of the adsorption rate is % by mass; however, the description of the unit is omitted in Table 2.

It is noted that in each composition, the polymer binder consisting of each of the polymers S-1 to S-10, T-1 to T-6, and T-8 was dissolved in the dispersion medium, and the binder consisting of each of the polymers S-11 and T-7 was dispersed in a particle shape in the dispersion medium.

[Measurement of Adsorption Rate $A_{AM}$ of Binder with Respect to Active Material]

The adsorption rate $A_A$m was measured using the active material, the polymer binder, and the dispersion medium, which had been used in the preparation of each electrode composition shown in Table 2.

That is, the polymer binder was dissolved in a dispersion medium (butyl butyrate) to prepare a binder solution having a concentration of 1% by mass. It is noted that regarding the polymers S-11 and T-7, binder dispersion liquids having a concentration of 1% by mass were used. The binder solution or dispersion liquid and the active material were put into a 15 mL of vial at a proportion such that the mass ratio of this binder solution or polymer binder in the dispersion liquid to the active material was 42:1, and stirred for 1 hour with a mix rotor at room temperature and a rotation speed of 80 rpm, and then allowed to stand. The supernatant obtained by solid-liquid separation was filtered through a filter having a pore diameter of 1 m, and the entire amount of the obtained filtrate was dried to be solid, and then the mass of the polymer binder remaining in the filtrate (the mass of the polymer binder that had not adsorbed to the active material) $W_A$ was measured. From this mass $W_A$ and the mass $W_B$ of the polymer binder contained in the binder solution used for the measurement, the adsorption rate $A_{AM}$ (in terms of % by mass) of the polymer binder with respect to the active material was calculated according to the following expression.

The adsorption rate $A_A$m of the polymer binder is the average value of the adsorption rates obtained by carrying out the above measurement twice.

$$\text{Adsorption rate } A_{AM}\ (\%) = \left[(W_B - W_A)/W_B\right] \times 100$$

It is noted that as a result of measuring the adsorption rate $A_{AM}$ using the active material and the polymer binder, which had been extracted from the active material layer subjected to film formation, and the dispersion medium which had been used for the preparation of the electrode composition, the same value was obtained.

TABLE 2

| | | Inorganic solid electrolyte | | | | Binder solution or dispersion liquid | |
|---|---|---|---|---|---|---|---|
| No. | Point in FIG. 3 | | $D_{S-50}$ | Composition content | Solid content | | Mass average molecular weight |
| PK-1 | AP | LPS1 | 60 | 20.4 | 27.5 | S-1 | 81000 |
| PK-2 | | LPS3 | 2900 | 20.4 | 27.5 | S-2 | 410000 |
| PK-3 | BP | LPS4 | 4200 | 20.4 | 27.5 | S-3 | 980000 |
| PK-4 | | LPS4 | 4200 | 20.4 | 27.5 | S-2 | 410000 |
| PK-5 | CP | LPS4 | 4200 | 20.4 | 27.5 | S-4 | 180000 |
| PK-6 | GP | LPS3 | 2900 | 20.4 | 27.5 | S-5 | 42000 |
| PK-7 | DP | LPS2 | 1500 | 20.4 | 27.5 | S-9 | 15000 |
| PK-8 | FP | LPS3 | 2900 | 20.4 | 27.5 | S-4 | 180000 |
| PK-9 | | LPS1 | 60 | 20.4 | 27.5 | S-5 | 42000 |
| PK-10 | EP | LPS1 | 60 | 20.4 | 27.5 | S-9 | 15000 |
| PK-11 | HP | LPS2 | 1500 | 20.4 | 27.5 | S-1 | 81000 |
| PK-12 | | LPS3 | 2900 | 20.4 | 27.5 | S-2 | 410000 |
| PK-13 | | LPS2 | 1500 | 20.4 | 27.5 | S-7 | 95000 |
| PK-14 | | LPS2 | 1500 | 20.4 | 27.5 | S-8 | 92000 |
| PKc21 | | LPS1 | 60 | 20.4 | 27.5 | T-1 | 110000 |
| PKc22 | | LPS3 | 2900 | 20.4 | 27.5 | T-2 | 620000 |
| PKc23 | | LPS4 | 4200 | 20.4 | 27.5 | T-3 | 1300000 |
| PKc24 | | LPS4 | 4200 | 20.4 | 27.5 | S-2 | 410000 |
| PKc25 | | LPS4 | 4200 | 20.4 | 27.5 | T-4 | 160000 |
| PKc26 | | LPS3 | 2900 | 20.4 | 27.5 | T-5 | 35000 |
| PKc27 | | LPS2 | 1500 | 20.4 | 27.5 | T-6 | 10000 |
| PKc28 | | LPS1 | 60 | 20.4 | 27.5 | T-6 | 10000 |
| PKc29 | | LPS1 | 60 | 20.4 | 27.5 | T-7 | 350000 |
| PKc30 | | LPS3 | 2900 | 20.4 | 27.5 | T-8 | 100000 |
| PKc31 | | LPS3 | 2900 | 20.4 | 27.5 | T-7 | 350000 |

| | Binder solution or dispersion liquid | | | | | |
|---|---|---|---|---|---|---|
| No. | α | SP value | $A_{AM}$ | pKa | Composition content | Solid content |
| PK-1 | 50 | 18.9 | 5 | 4.1 | 0.4 | 0.5 |
| PK-2 | 123 | 12.0 | 2 | — | 0.4 | 0.5 |

TABLE 2-continued

| | | | | | | |
|---|---|---|---|---|---|---|
| PK-3 | 172 | 12.1 | 5 | — | 0.4 | 0.5 |
| PK-4 | 123 | 12.0 | 2 | — | 0.4 | 0.5 |
| PK-5 | 85 | 18.9 | 10 | 4.1 | 0.4 | 0.5 |
| PK-6 | 37 | 19.1 | 8 | 10.1 | 0.4 | 0.5 |
| PK-7 | 16 | 19.1 | 9 | 3.2 | 0.4 | 0.5 |
| PK-8 | 85 | 18.9 | 10 | 4.1 | 0.4 | 0.5 |
| PK-9 | 37 | 19.1 | 8 | 10.1 | 0.4 | 0.5 |
| PK-10 | 16 | 19.1 | 9 | 3.2 | 0.4 | 0.5 |
| PK-11 | 50 | 18.9 | 5 | 4.1 | 0.4 | 0.5 |
| PK-12 | 123 | 12.0 | 2 | — | 0.4 | 0.5 |
| PK-13 | 55 | 20.2 | 16 | 4.1 | 0.4 | 0.5 |
| PK-14 | 70 | 19.2 | 48 | 4.1 | 0.4 | 0.5 |
| PKc21 | 60 | 18.9 | 8 | 4.1 | 0.4 | 0.5 |
| PKc22 | 140 | 12.0 | 5 | — | 0.4 | 0.5 |
| PKc23 | 185 | 12.1 | 9 | — | 0.4 | 0.5 |
| PKc24 | 123 | 12.0 | 2 | — | 0.4 | 0.5 |
| PKc25 | 72 | 18.9 | 12 | 4.1 | 0.4 | 0.5 |
| PKc26 | 30 | 19.1 | 18 | 10.1 | 0.4 | 0.5 |
| PKc27 | 7 | 19.0 | 9 | 3.2 | 0.4 | 0.5 |
| PKc28 | 7 | 19.0 | 9 | 3.2 | 0.4 | 0.5 |
| PKc29 | 114 | 18.8 | 5 | 4.1 | 0.4 | 0.5 |
| PKc30 | 29 | — | 0 | — | 0.4 | 0.5 |
| PKc31 | 114 | 18.8 | 5 | 4.1 | 0.4 | 0.5 |

| | Dispersion medium | | Positive electrode active material | | | | |
|---|---|---|---|---|---|---|---|
| No | | Compo-sition content | | $D_{A-50}$ | Compo-sition content | Solid content | Conductive auxiliary agent |
| PK-1 | Butyl butyrate | 26.0 | NMC2 | 140 | 51.8 | 70.0 | AB |
| PK-2 | Butyl butyrate | 26.0 | NMC7 | 2600 | 51.8 | 70.0 | AB |
| PK-3 | Butyl butyrate | 26.0 | NMC9 | 4600 | 51.8 | 70.0 | AB |
| PK-4 | Butyl butyrate | 26.0 | NMC9 | 4600 | 51.8 | 70.0 | AB |
| PK-5 | Butyl butyrate | 26.0 | NMC9 | 4600 | 51.8 | 70.0 | AB |
| PK-6 | Butyl butyrate | 26.0 | NMC6 | 2500 | 51.8 | 70.0 | AB |
| PK-7 | Butyl butyrate | 26.0 | NMC4 | 1700 | 51.8 | 70.0 | AB |
| PK-8 | Butyl butyrate | 26.0 | NMC7 | 2600 | 51.8 | 70.0 | AB |
| PK-9 | Butyl butyrate | 26.0 | NMC3 | 200 | 51.8 | 70.0 | AB |
| PK-10 | Butyl butyrate | 26.0 | NMC2 | 140 | 51.8 | 70.0 | AB |
| PK-11 | Butyl butyrate | 26.0 | NMC4 | 1700 | 51.8 | 70.0 | AB |
| PK-12 | Butyl butyrate | 26.0 | NMC8 | 4000 | 51.8 | 70.0 | AB |
| PK-13 | Butyl butyrate | 26.0 | NMC4 | 1700 | 51.8 | 70.0 | AB |
| PK-14 | Butyl butyrate | 26.0 | NMC4 | 1700 | 51.8 | 70.0 | AB |
| PKc21 | Butyl butyrate | 26.0 | NMC1 | 55 | 51.8 | 70.0 | AB |
| PKc22 | Butyl butyrate | 26.0 | NMC7 | 2600 | 51.8 | 70.0 | AB |
| PKc23 | Butyl butyrate | 26.0 | NMC10 | 5000 | 51.8 | 70.0 | AB |
| PKc24 | Butyl butyrate | 26.0 | NMC11 | 5300 | 51.8 | 70.0 | AB |
| PKc25 | Butyl butyrate | 26.0 | NMC10 | 5000 | 51.8 | 70.0 | AB |
| PKc26 | Butyl butyrate | 26.0 | NMC7 | 2600 | 51.8 | 70.0 | AB |
| PKc27 | Butyl butyrate | 26.0 | NMC5 | 2000 | 51.8 | 70.0 | AB |
| PKc28 | Butyl butyrate | 26.0 | NMC1 | 55 | 51.8 | 70.0 | AB |
| PKc29 | Butyl butyrate | 26.0 | NMC1 | 55 | 51.8 | 70.0 | AB |

TABLE 2-continued

| | | | | | | | |
|---|---|---|---|---|---|---|---|
| PKc30 | Butyl butyrate | 26.0 | NMC7 | 2600 | 51.8 | 70.0 | AB |
| PKc31 | Butyl butyrate | 26.0 | NMC7 | 2600 | 51.8 | 70.0 | AB |

| No | Conductive auxiliary agent Composition content | Solid content | $D_{50}$ | SP value difference | Viscosity (cP) | Note |
|---|---|---|---|---|---|---|
| PK-1 | 1.5 | 2.0 | 120 | 0.3 | 1500 | Present invention |
| PK-2 | 1.5 | 2.0 | 2700 | 6.6 | 3200 | Present invention |
| PK-3 | 1.5 | 2.0 | 4500 | 6.5 | 3500 | Present invention |
| PK-4 | 1.5 | 2.0 | 4500 | 6.6 | 3300 | Present invention |
| PK-5 | 1.5 | 2.0 | 4500 | 0.3 | 2200 | Present invention |
| PK-6 | 1.5 | 2.0 | 2600 | 0.5 | 560 | Present invention |
| PK-7 | 1.5 | 2.0 | 1600 | 0.5 | 900 | Present invention |
| PK-8 | 1.5 | 2.0 | 2700 | 0.3 | 900 | Present invention |
| PK-9 | 1.5 | 2.0 | 160 | 0.5 | 570 | Present invention |
| PK-10 | 1.5 | 2.0 | 120 | 0.5 | 3000 | Present invention |
| PK-11 | 1.5 | 2.0 | 1600 | 0.3 | 2800 | Present invention |
| PK-12 | 1.5 | 2.0 | 3700 | 6.6 | 3500 | Present invention |
| PK-13 | 1.5 | 2.0 | 1600 | 1.6 | 1900 | Present invention |
| PK-14 | 1.5 | 2.0 | 1600 | 0.6 | 1800 | Present invention |
| PKc21 | 1.5 | 2.0 | 60 | 0.3 | 80 | Comparative Example |
| PKc22 | 1.5 | 2.0 | 2700 | 6.6 | 5600 | Comparative Example |
| PKc23 | 1.5 | 2.0 | 4800 | 6.5 | 4500 | Comparative Example |
| PKc24 | 1.5 | 2.0 | 5000 | 6.6 | 4900 | Comparative Example |
| PKc25 | 1.5 | 2.0 | 4800 | 0.3 | 200 | Comparative Example |
| PKc26 | 1.5 | 2.0 | 2700 | 0.5 | 280 | Comparative Example |
| PKc27 | 1.5 | 2.0 | 1900 | 0.4 | 150 | Comparative Example |
| PKc28 | 1.5 | 2.0 | 60 | 0.4 | 190 | Comparative Example |
| PKc29 | 1.5 | 2.0 | 60 | 0.2 | 4500 | Comparative Example |
| PKc30 | 1.5 | 2.0 | 2700 | — | 250 | Comparative Example |
| PKc31 | 1.5 | 2.0 | 2700 | 0.2 | 3200 | Comparative Example |

TABLE 2-continued

| No. | Point in FIG. 3 | Inorganic solid electrolyte | $D_{S-50}$ | Composition content | Solid content | Binder solution or dispersion liquid | Mass average molecular weight |
|---|---|---|---|---|---|---|---|
| NK-1 | A | LPS1 | 60 | 22.8 | 45.5 | S-1 | 81000 |
| NK-2 | | LPS3 | 2900 | 22.8 | 45.5 | S-2 | 410000 |
| NK-3 | B | LPS4 | 4200 | 22.8 | 45.5 | S-10 | 1100000 |
| NK-4 | | LPS4 | 4200 | 22.8 | 45.5 | S-2 | 410000 |
| NK-5 | C | LPS4 | 4200 | 22.8 | 45.5 | S-4 | 180000 |
| NK-6 | G | LPS3 | 2900 | 22.8 | 45.5 | S-5 | 42000 |
| NK-7 | D | LPS2 | 1500 | 22.8 | 45.5 | S-6 | 13000 |
| NK-8 | F | LPS3 | 2900 | 22.8 | 45.5 | S-4 | 180000 |
| NK-9 | | LPS1 | 60 | 22.8 | 45.5 | S-5 | 42000 |
| NK-10 | E | LPS1 | 60 | 22.8 | 45.5 | S-6 | 13000 |
| NK-11 | H | LPS2 | 1500 | 22.8 | 45.5 | S-1 | 81000 |
| NK-12 | | LPS3 | 2900 | 22.8 | 45.5 | S-2 | 410000 |
| NK-13 | | LPS2 | 1500 | 22.8 | 45.5 | S-7 | 95000 |
| NK-14 | | LPS2 | 1500 | 22.8 | 45.5 | S-8 | 92000 |
| NK-15 | J | LPS2 | 1500 | 22.8 | 45.5 | S-1 | 81000 |
| NK-16 | I | LPS2 | 1500 | 22.8 | 45.5 | S-6 | 13000 |
| NK-17 | | LPS3 | 2900 | 22.8 | 45.5 | S-11 | 630000 |
| NKc21 | | LPS1 | 60 | 22.8 | 45.5 | T-1 | 110000 |
| NKc22 | | LPS3 | 2900 | 22.8 | 45.5 | T-2 | 620000 |
| NKc23 | | LPS4 | 4200 | 22.8 | 45.5 | T-3 | 1300000 |
| NKc24 | | LPS4 | 4200 | 22.8 | 45.5 | S-2 | 410000 |
| NKc25 | | LPS4 | 4200 | 22.8 | 45.5 | T-4 | 160000 |
| NKc26 | | LPS3 | 2900 | 22.8 | 45.5 | T-5 | 35000 |
| NKc27 | | LPS2 | 1500 | 22.8 | 45.5 | T-6 | 10000 |
| NKc28 | | LPS1 | 60 | 22.8 | 45.5 | T-6 | 10000 |
| NKc29 | | LPS1 | 60 | 22.8 | 45.5 | T-7 | 350000 |
| NKc30 | | LPS3 | 2900 | 22.8 | 45.5 | T-8 | 100000 |
| NKc31 | | LPS3 | 2900 | 22.8 | 45.5 | T-7 | 350000 |

| No. | Binder solution or dispersion liquid α | SP value | $A_{AM}$ | pKa | Composition content | Solid content |
|---|---|---|---|---|---|---|
| NK-1 | 50 | 18.9 | 2 | 4.1 | 0.3 | 0.5 |
| NK-2 | 123 | 12.0 | 0 | — | 0.3 | 0.5 |
| NK-3 | 178 | 12.0 | 3 | — | 0.3 | 0.5 |
| NK-4 | 123 | 12.0 | 0 | — | 0.3 | 0.5 |
| NK-5 | 85 | 18.9 | 6 | 4.1 | 0.3 | 0.5 |
| NK-6 | 37 | 19.1 | 3 | 10.1 | 0.3 | 0.5 |
| NK-7 | 12 | 19.0 | 3 | 3.2 | 0.3 | 0.5 |
| NK-8 | 85 | 18.9 | 6 | 4.1 | 0.3 | 0.5 |
| NK-9 | 37 | 19.1 | 3 | 10.1 | 0.3 | 0.5 |
| NK-10 | 12 | 19.0 | 3 | 3.2 | 0.3 | 0.5 |
| NK-11 | 50 | 18.9 | 2 | 1.1 | 0.3 | 0.5 |
| NK-12 | 123 | 12.0 | 0 | — | 0.3 | 0.5 |
| NK-13 | 55 | 20.2 | 13 | 4.1 | 0.3 | 0.5 |
| NK-14 | 70 | 19.2 | 42 | 4.1 | 0.3 | 0.5 |
| NK-15 | 50 | 18.9 | 2 | 4.1 | 0.3 | 0.5 |
| NK-16 | 12 | 19.0 | 3 | 3.2 | 0.3 | 0.5 |
| NK-17 | 140 | 21.0 | 10 | 4.5 | 0.3 | 0.5 |
| NKc21 | 60 | 18.9 | 5 | 4.1 | 0.3 | 0.5 |
| NKc22 | 140 | 12.0 | 3 | — | 0.3 | 0.5 |
| NKc23 | 185 | 12.1 | 5 | — | 0.3 | 0.5 |
| NKc24 | 123 | 12.0 | 0 | — | 0.3 | 0.5 |
| NKc25 | 72 | 18.9 | 8 | 4.1 | 0.3 | 0.5 |
| NKc26 | 30 | 19.1 | 14 | 10.1 | 0.3 | 0.5 |
| NKc27 | 7 | 19.0 | 5 | 3.2 | 0.3 | 0.5 |
| NKc28 | 7 | 19.0 | 5 | 3.2 | 0.3 | 0.5 |
| NKc29 | 114 | 18.8 | 3 | 4.1 | 0.3 | 0.5 |
| NKc30 | 29 | — | 0 | — | 0.3 | 0.5 |
| NKc31 | 114 | 18.8 | 3 | 4.1 | 0.3 | 0.5 |

| No. | Dispersion medium | Composition content | Negative electrode active material | $D_{A-50}$ | Composition content | Solid content | Conductive auxiliary agent |
|---|---|---|---|---|---|---|---|
| NK-1 | Butyl butyrate | 50.0 | Si1 | 55 | 25.0 | 50.0 | VGCF |
| NK-2 | Butyl butyrate | 50.0 | Si6 | 2800 | 25.0 | 50.0 | VGCF |

TABLE 2-continued

| | | | | | | | |
|---|---|---|---|---|---|---|---|
| NK-3 | Butyl butyrate | 50.0 | Si9 | 5000 | 25.0 | 50.0 | VGCF |
| NK-4 | Butyl butyrate | 50.0 | Si9 | 5000 | 25.0 | 50.0 | VGCF |
| NK-5 | Butyl butyrate | 50.0 | Si9 | 5000 | 25.0 | 50.0 | VGCF |
| NK-6 | Butyl butyrate | 50.0 | Si6 | 2800 | 25.0 | 50.0 | VGCF |
| NK-7 | Butyl butyrate | 50.0 | Si5 | 2400 | 25.0 | 50.0 | VGCF |
| NK-8 | Butyl butyrate | 50.0 | Si6 | 2800 | 25.0 | 50.0 | VGCF |
| NK-9 | Butyl butyrate | 50.0 | Si2 | 200 | 25.0 | 50.0 | VGCF |
| NK-10 | Butyl butyrate | 50.0 | Si1 | 55 | 25.0 | 50.0 | VGCF |
| NK-11 | Butyl butyrate | 50.0 | Si5 | 2400 | 25.0 | 50.0 | VGCF |
| NK-12 | Butyl butyrate | 50.0 | Si8 | 4000 | 25.0 | 50.0 | VGCF |
| NK-13 | Butyl butyrate | 50.0 | Si5 | 2400 | 25.0 | 50.0 | VGCF |
| NK-14 | Butyl butyrate | 50.0 | Si5 | 2400 | 25.0 | 50.0 | VGCF |
| NK-15 | Butyl butyrate | 50.0 | Si3 | 350 | 25.0 | 50.0 | VGCF |
| NK-16 | Butyl butyrate | 50.0 | Si3 | 350 | 25.0 | 50.0 | VGCF |
| NK-17 | Butyl butyrate | 50.0 | Si8 | 4000 | 25.0 | 50.0 | VGCF |
| NKc21 | Butyl butyrate | 50.0 | Si1 | 55 | 25.0 | 50.0 | VGCF |
| NKc22 | Butyl butyrate | 50.0 | Si7 | 3000 | 25.0 | 50.0 | VGCF |
| NKc23 | Butyl butyrate | 50.0 | Si9 | 5000 | 25.0 | 50.0 | VGCF |
| NKc24 | Butyl butyrate | 50.0 | Si10 | 5300 | 25.0 | 50.0 | VGCF |
| NKc25 | Butyl butyrate | 50.0 | Si9 | 5000 | 25.0 | 50.0 | VGCF |
| NKc26 | Butyl butyrate | 50.0 | Si7 | 3000 | 25.0 | 50.0 | VGCF |
| NKc27 | Butyl butyrate | 50.0 | Si4 | 2000 | 25.0 | 50.0 | VGCF |
| NKc28 | Butyl butyrate | 50.0 | Si1 | 55 | 25.0 | 50.0 | VGCF |
| NKc29 | Butyl butyrate | 50.0 | Si1 | 55 | 25.0 | 50.0 | VGCF |
| NKc30 | Butyl butyrate | 50.0 | Si7 | 3000 | 25.0 | 50.0 | VGCF |
| NKc31 | Butyl butyrate | 50.0 | Si6 | 2800 | 25.0 | 50.0 | VGCF |

| | Conductive auxiliary agent | | | | | |
|---|---|---|---|---|---|---|
| No. | Composition content | Solid content | $D_{50}$ | SP value difference | Viscosity (cP) | Note |
| NK-1 | 2.0 | 4.0 | 60 | 0.3 | 1500 | Present invention |
| NK-2 | 2.0 | 4.0 | 2800 | 6.6 | 3200 | Present invention |
| NK-3 | 2.0 | 4.0 | 4600 | 6.6 | 3500 | Present invention |
| NK-4 | 2.0 | 4.0 | 4600 | 6.6 | 3300 | Present invention |
| NK-5 | 2.0 | 4.0 | 4600 | 0.3 | 2200 | Present invention |
| NK-6 | 2.0 | 4.0 | 2800 | 0.5 | 510 | Present invention |
| NK-7 | 2.0 | 4.0 | 2000 | 0.4 | 900 | Present invention |
| NK-8 | 2.0 | 4.0 | 2800 | 0.3 | 900 | Present invention |
| NK-9 | 2.0 | 4.0 | 130 | 0.5 | 420 | Present invention |
| NK-10 | 2.0 | 4.0 | 60 | 0.4 | 3000 | Present invention |

TABLE 2-continued

| | | | | | | |
|---|---|---|---|---|---|---|
| NK-11 | 2.0 | 4.0 | 2000 | 0.3 | 2800 | Present invention |
| NK-12 | 2.0 | 4.0 | 3500 | 6.6 | 750 | Present invention |
| NK-13 | 2.0 | 4.0 | 2000 | 1.6 | 1900 | Present invention |
| NK-14 | 2.0 | 4.0 | 2000 | 0.6 | 1800 | Present invention |
| NK-15 | 2.0 | 4.0 | 900 | 0.3 | 1200 | Present invention |
| NK-16 | 2.0 | 4.0 | 900 | 0.4 | 1300 | Present invention |
| NK-17 | 2.0 | 4.0 | 3500 | 2.4 | 100 | Present invention |
| NKc21 | 2.0 | 4.0 | 60 | 0.3 | 90 | Comparative Example |
| NKc22 | 2.0 | 4.0 | 3000 | 6.6 | 6000 | Comparative Example |
| NKc23 | 2.0 | 4.0 | 4600 | 6.5 | 4200 | Comparative Example |
| NKc24 | 2.0 | 4.0 | 4800 | 6.6 | 4100 | Comparative Example |
| NKc25 | 2.0 | 4.0 | 4600 | 0.3 | 250 | Comparative Example |
| NKc26 | 2.0 | 4.0 | 3000 | 0.5 | 220 | Comparative Example |
| NKc27 | 2.0 | 4.0 | 1800 | 0.4 | 120 | Comparative Example |
| NKc28 | 2.0 | 4.0 | 60 | 0.4 | 170 | Comparative Example |
| NKc29 | 2.0 | 4.0 | 60 | 0.2 | 4100 | Comparative Example |
| NKc30 | 2.0 | 4.0 | 3000 | — | 280 | Comparative Example |
| NKc31 | 2.0 | 4.0 | 2800 | 0.2 | 3200 | Comparative Example |

<Abbreviations in table>
LPS1 to LPS4: LPS1 to LPS4 synthesized in Synthesis Examples L-1 to L-4
NMC1 to NMC11: NMC1 to NMC11 synthesized in Synthesis Examples C-1 to C-10
Si1 to Si10: Silicon 1 to silicon 10 prepared as described above
AB: Acetylene black
VGCF: Carbon nanotube <Production of Positive Electrode Sheet for all-Solid State Secondary Battery>

Each of the positive electrode compositions obtained as described above, which is shown in the column of "Electrode composition No." in Table 3, was applied onto an aluminum foil having a thickness of 20 m by using a baker type applicator (product name: SA-201, manufactured by Tester Sangyo Co., Ltd.), heating was carried out at 80° C. for 1 hour, and then heating was further carried out at 110° C. for 1 hour to dry (to remove the dispersion medium) the positive electrode composition. Then, using a heat press machine, the dried positive electrode composition was pressurized (10 MPa, 1 minute) at 25° C. to produce each of positive electrode sheets 101 to 114, and c11 to c21 for an all-solid state secondary battery, having a positive electrode active material layer having a film thickness of 120 m (in Table 3, it is written as "Positive electrode sheet").

<Production of Negative Electrode Sheet for all-Solid State Secondary Battery>

Each of the negative electrode compositions obtained as described above, which is shown in the column of "Electrode composition No." in Table 3, was applied onto a copper foil having a thickness of 20 m by using a baker type applicator (product name: SA-201), heating was carried out at 80° C. for 1 hour, and then heating was further carried out at 110° C. for 1 hour to dry (to remove the dispersion medium) the negative electrode composition. Then, using a heat press machine, the dried negative electrode composition was pressurized (10 MPa, 1 minute) at 25° C. to produce each of negative electrode sheets 115 to 131 and c22 to c32 for an all-solid state secondary battery, having a negative electrode active material layer having a film thickness of 110 m (in Table 3, it is written as "Negative electrode sheet").

<Evaluation 1: Coating Unevenness Test>

The active material layer of each of the produced positive electrode sheets for an all-solid state secondary battery and the produced negative electrode sheets for an all-solid state secondary battery (height (length) 50 mm×side (width) 20 mm) were peeled from a base material (an aluminum foil or a copper foil), and then a test piece TP having a height of 10 mm and a side of 10 mm was cut out from a substantially central portion of this active material layer in the width direction. In each of the active material layers, the position in the vertical direction in which the test piece TP was cut out was set to the same position avoiding both ends in the vertical direction. Using a constant pressure thickness measuring instrument (manufactured by TECLOCK Co., Ltd.), the layer thicknesses at five points of this test piece TP were measured, and the arithmetic mean value of the layer thicknesses was calculated.

From the respective measured values and the arithmetic mean value Y thereof, the larger deviation value (the maximum deviation value) among the deviation values (%) obtained according to Expression (a) or (b) was applied to the following evaluation standard to evaluate the occurrence of coating unevenness. In this test, it is indicated that the smaller the maximum deviation value (%) is, the more uniform the layer thickness of the active material layer is, that is, it is possible to suppress the occurrence of coating unevenness of the electrode composition. In this test, an evaluation standard of "D" or higher is the pass level.

$$100\times(\text{maximum value among layer thickness at five points} - \text{arithmetic mean value } Y)/(\text{arithmetic mean value } Y) \quad \text{Expression (a)}$$

$$100\times(\text{arithmetic mean value } Y - \text{minimum value among layer thickness at five points})/(\text{arithmetic mean value } Y) \quad \text{Expression (b)}$$

The measurement points of the layer thickness were the following "five points: A to E" for each test piece TP.

Figure 4:
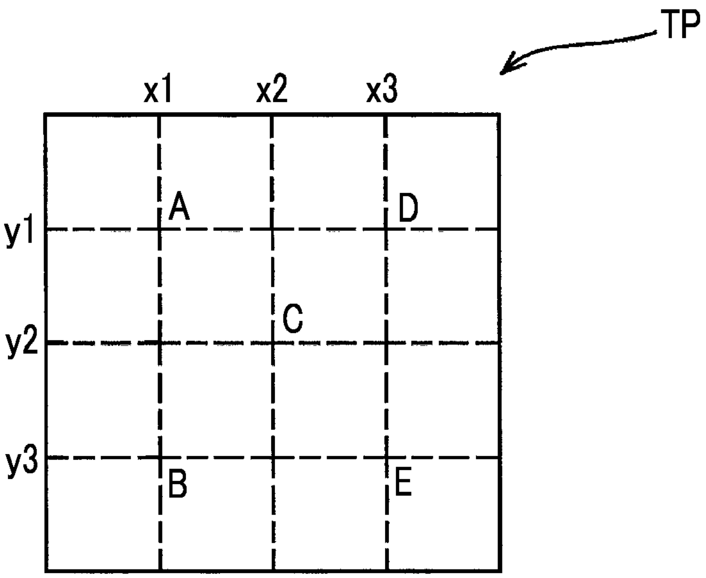
FIG. 4 is a view illustrating layer thickness measurement points in a coating unevenness test in Examples.

First, as shown in FIG. 4, three virtual lines y1, y2, and y3, which divide the vertical direction of the test piece TP into four equal parts are drawn, and then three virtual lines x1, x2, and x3, which divide the lateral direction of the test piece TP into four equal parts are drawn in the same manner, whereby the surface of the test piece TP is divided into a lattice form.

The measurement points are the intersection A of the virtual lines x1 and y1, the intersection B of the virtual lines x1 and y3, the intersection C of the virtual lines x2 and y2, the intersection D of the virtual lines x3 and y1, and the intersection E of the virtual lines x3 and y3.

—Evaluation Standards—

A: Maximum deviation value<1%

B: 1%≤maximum deviation value<3%

C: 3%≤maximum deviation value<5%

D: 5%≤maximum deviation value<10%

E: 10%≤maximum deviation value<20%

F: 20%≤maximum deviation value

<Evaluation 2: Dripping Test (Shape Maintenance Characteristics)>

Using a constant pressure thickness measuring instrument (manufactured by TECLOCK Co., Ltd.), the layer thicknesses X1 and X2 were measured regarding each of the remaining active material layers from which the test piece TP used for the layer thickness measurement in <Evaluation 1: Coating unevenness test> described above had been cut out, where measurement points (two points) were set as points located inside by 2 mm in a direction perpendicular to edges, from both respective edges in a width direction of the active material layer. It is noted that in each of the active material layers, the position of the measurement point in the vertical direction was set to the same position avoiding both ends in the vertical direction.

The thickness ratio (each of X1/Y and X2/Y) of the layer thickness X1 or X2 to the "arithmetic mean value Y of the layer thickness" in <Evaluation 1: Coating unevenness test> described above was calculated, and the average value (X/Y) was applied to the following evaluation standard to evaluate the occurrence of dripping. In this test, it is indicated that the smaller the average value of the thickness ratios is, the more uniform the layer thickness of the active material layer in the width direction is, that is, it is possible to suppress the occurrence of dripping of the electrode composition. In this test, an evaluation standard of "D" or higher is the pass level.

—Evaluation Standards—

A: 0.95≤average value of thickness ratios (X/Y)

B: 0.90≤average value of thickness ratios (X/Y)<0.95

C: 0.85≤average value of thickness ratios (X/Y)<0.90

D: 0.80≤average value of thickness ratios (X/Y)<0.85

E: 0.70≤average value of thickness ratios (X/Y)<0.80

F: average value of thickness ratios (X/Y)<0.70

TABLE 3

| Sheet No. | Electrode composition No. | Binder polymer No. | Coating unevenness | Dripping | Note 1 | Note 2 |
|---|---|---|---|---|---|---|
| 101 | PK-1 | S-1 | B | A | Positive | Present invention |
| 102 | PK-2 | S-2 | C | B | electrode sheet | Present invention |
| 103 | PK-3 | S-3 | C | B | | Present invention |
| 104 | PK-4 | S-2 | C | B | | Present invention |
| 105 | PK-5 | S-4 | B | A | | Present invention |
| 106 | PK-6 | S-5 | B | B | | Present invention |
| 107 | PK-7 | S-9 | B | A | | Present invention |
| 108 | PK-8 | S-4 | B | A | | Present invention |
| 109 | PK-9 | S-5 | B | B | | Present invention |
| 110 | PK-10 | S-9 | B | A | | Present invention |
| 111 | PK-11 | S-1 | B | A | | Present invention |
| 112 | PK-12 | S-2 | C | B | | Present invention |
| 113 | PK-13 | S-7 | C | A | | Present invention |
| 114 | PK-14 | S-8 | C | A | | Present invention |
| 115 | NK-1 | S-1 | A | A | Negative | Present invention |
| 116 | NK-2 | S-2 | B | B | electrode sheet | Present invention |
| 117 | NK-3 | S-10 | B | B | | Present invention |
| 118 | NK-4 | S-2 | B | B | | Present invention |
| 119 | NK-5 | S-4 | A | A | | Present invention |
| 120 | NK-6 | S-5 | A | B | | Present invention |
| 121 | NK-7 | S-6 | A | A | | Present invention |
| 122 | NK-8 | S-4 | A | A | | Present invention |
| 123 | NK-9 | S-5 | A | B | | Present invention |
| 124 | NK-10 | S-6 | A | A | | Present invention |
| 125 | NK-11 | S-1 | A | A | | Present invention |
| 126 | NK-12 | S-2 | B | B | | Present invention |
| 127 | NK-13 | S-7 | B | A | | Present invention |
| 128 | NK-14 | S-8 | B | A | | Present invention |
| 129 | NK-15 | S-1 | A | A | | Present invention |
| 130 | NK-16 | S-6 | A | A | | Present invention |
| 131 | NK-17 | S-11 | C | C | | Present invention |
| c11 | PKc21 | T-1 | E | E | Positive | Comparative Example |

TABLE 3-continued

| Sheet No. | Electrode composition No. | Binder polymer No. | Coating unevenness | Dripping | Note 1 | Note 2 |
|---|---|---|---|---|---|---|
| c12 | PKc22 | T-2 | F | E | electrode sheet | Comparative Example |
| c13 | PKc23 | T-3 | F | D | | Comparative Example |
| c14 | PKc24 | S-2 | D | D | | Comparative Example |
| c15 | PKc25 | T-4 | D | E | | Comparative Example |
| c16 | PKc26 | T-5 | D | E | | Comparative Example |
| c17 | PKc27 | T-6 | E | E | | Comparative Example |
| c18 | PKc28 | T-6 | E | E | | Comparative Example |
| c19 | PKc29 | T-7 | D | E | | Comparative Example |
| c20 | PKc30 | T-8 | E | E | | Comparative Example |
| c21 | PKc31 | T-7 | E | D | | Comparative Example |
| c22 | NKc21 | T-1 | E | E | Negative | Comparative Example |
| c23 | NKc22 | T-2 | F | E | electrode sheet | Comparative Example |
| c24 | NKc23 | T-3 | F | D | | Comparative Example |
| c25 | NKc24 | S-2 | D | D | | Comparative Example |
| c26 | NKc25 | T-4 | D | E | | Comparative Example |
| c27 | NKc26 | T-5 | D | E | | Comparative Example |
| c28 | NKc27 | T-6 | E | E | | Comparative Example |
| c29 | NKc28 | T-6 | E | E | | Comparative Example |
| c30 | NKc29 | T-7 | D | E | | Comparative Example |
| c31 | NKc30 | T-8 | E | E | | Comparative Example |
| c32 | NKc31 | T-7 | E | D | | Comparative Example |

<Manufacture of all-Solid State Secondary Battery>

First, a positive electrode sheet for an all-solid state secondary battery, including a solid electrolyte layer, and a negative electrode sheet for an all-solid state secondary battery, including a solid electrolyte layer, which would be used for manufacturing an all-solid state secondary battery, were produced.

—Production of Positive Electrode Sheet for all-Solid State Secondary Battery, which has Solid Electrolyte Layer—

The solid electrolyte sheet K-1 for an all-solid state secondary battery, produced by the following method, was overlaid on the positive electrode active material layer of each of the positive electrode sheets for an all-solid state secondary battery shown in the column of "Electrode active material layer (sheet No.)" of Table 4 so that the solid electrolyte layer came into contact with the positive electrode active material layer, transferred (laminated) by being pressurized at 50 MPa and 25° C. using a press machine, and then further pressurized at 600 MPa and at 25° C., whereby each of positive electrode sheets 101 to 114 and c11 to c21 for an all-solid state secondary battery including a solid electrolyte layer having a thickness of 30 m (thickness of positive electrode active material layer: 90 m) was produced.

—Production of Negative Electrode Sheet for all-Solid State Secondary Battery, which has Solid Electrolyte Layer—

The solid electrolyte sheet K-1 for an all-solid state secondary battery, produced by the following method, was overlaid on the negative electrode active material layer of each of the negative electrode sheets for an all-solid state secondary battery shown in the column of "Electrode active material layer (sheet No.)" of Table 4 so that the solid electrolyte layer came into contact with the negative electrode active material layer, transferred (laminated) by being pressurized at 50 MPa and 25° C. using a press machine, and then further pressurized at 600 MPa and at 25° C., whereby each of negative electrode sheets 115 to 131 and c22 to c32 for an all-solid state secondary battery including a solid electrolyte layer having a thickness of 30 m (thickness of negative electrode active material layer: 80 m) was produced.

A solid electrolyte sheet K-1 for an all-solid state secondary battery used for producing an electrode sheet for an all-solid state secondary battery was prepared as follows.

—Preparation of Inorganic Solid Electrolyte-Containing Composition K-1—

60 g of zirconia beads having a diameter of 5 mm were put into a 45 mL container made of zirconia (manufactured by FRITSCH), and 8.4 g of the LPS synthesized in the above Synthesis Example L-2, 0.6 g (in terms of solid content mass) of KYNAR FLEX 2500-20 (product name, PVdF-HFP: polyvinylidene fluoride-hexafluoropropylene copolymer, manufactured by Arkema S.A.), and 11 g of butyl butyrate as the dispersion medium were put into the above container. Then, this container was set in a planetary ball mill P-7 (product name) manufactured by FRITSCH. Mixing was carried out at a temperature of 25° C. and a rotation speed of 150 rpm for 10 minutes to prepare an inorganic solid electrolyte-containing composition (slurry) K-1.

—Production of Solid Electrolyte Sheet K-1 for all-Solid State Secondary Battery—

Using a baker type applicator (product name: SA-201, manufactured by Tester Sangyo Co., Ltd.), the inorganic solid electrolyte-containing composition obtained as described above was applied on an aluminum foil having a thickness of 20 m, and heating was carried out at 80° C. for 2 hours to dry (remove the dispersion medium) the inorganic solid electrolyte-containing composition. Then, using a heat press machine, the dried inorganic solid electrolyte-containing composition was heated and pressurized at a temperature of 120° C. and a pressure of 40 MPa for 10 seconds to produce a solid electrolyte sheet K-1 for an all-solid state secondary battery. The film thickness of the solid electrolyte layer was 50 m.

—Manufacture of all-Solid State Secondary Battery—

Next, an all-solid state secondary battery No. 101 having a layer configuration illustrated in FIG. 1 was manufactured.

The positive electrode sheet No. 101 for an all-solid state secondary battery (the aluminum foil of the solid electrolyte-containing sheet K-1 had been peeled off), which included the solid electrolyte layer obtained as described above, was cut out into a disk shape having a diameter of 14.5 mm and placed, as illustrated in FIG. 2, in a stainless 2032-type coin case 11 into which a spacer and a washer (not illustrated in FIG. 2) had been incorporated. Next, a lithium foil cut out in a disk shape having a diameter of 15 mm was overlaid on the solid electrolyte layer. After further overlaying a stainless steel foil thereon, the 2032-type coin case 11 was crimped to manufacture an all-solid state secondary battery 13 (No. 101), illustrated in FIG. 2.

The all-solid state secondary battery manufactured in this manner has a layer configuration illustrated in FIG. 1 (however, the lithium foil corresponds to a negative electrode active material layer 2 and a negative electrode collector 1).

Each of all-solid state secondary batteries Nos. 102 to 114 and c101 to c11 was manufactured in the same manner as in the manufacturing of the all-solid state secondary battery No. 101, except that in the manufacturing of the all-solid state secondary battery No. 101, a positive electrode sheet for an all-solid state secondary battery, which has a solid electrolyte layer and is indicated by No. shown in the column of "Electrode active material layer (sheet No.)" of Table 4 was used instead of the positive electrode sheet No. 101 for an all-solid state secondary battery, which has a solid electrolyte layer.

In addition, an all-solid state secondary battery No. 115 having a layer configuration illustrated in FIG. 1 was manufactured as follows.

The negative electrode sheet No. 115 for an all-solid state secondary battery (the aluminum foil of the solid electrolyte-containing sheet K-1 had been peeled off), which included the solid electrolyte obtained as described above, was cut out into a disk shape having a diameter of 14.5 mm and placed, as illustrated in FIG. 2, in a stainless 2032-type coin case 11 into which a spacer and a washer (not illustrated in FIG. 2) had been incorporated. Next, a positive electrode sheet (a positive electrode active material layer) punched out from the positive electrode sheet for an all-solid state secondary battery produced below into a disk shape having a diameter of 14.0 mm was overlaid on the solid electrolyte layer. A stainless steel foil (a positive electrode collector) was further overlaid thereon to form a laminate 12 for an all-solid state secondary battery (a laminate consisting of stainless steel foil-aluminum foil-positive electrode active material layer-solid electrolyte layer-negative electrode active material layer-copper foil). Then, the 2032-type coin case 11 was crimped to manufacture an all-solid state secondary battery No. 115 illustrated in FIG. 2.

A positive electrode sheet for an all-solid state secondary battery to be used in the manufacturing of the all-solid state secondary battery No. 115 was prepared.

—Preparation of Positive Electrode Composition—

180 beads of zirconia beads having a diameter of 5 mm were put into a 45 mL container made of zirconia (manufactured by FRITSCH), 2.7 g of the LPS2 synthesized in the above Synthesis Example L-2, and 0.3 g of KYNAR FLEX 2500-20 (product name, PVdF-HFP: polyvinylidene fluoride-hexafluoropropylene copolymer, manufactured by Arkema S.A.) in terms of solid content mass and 22 g of butyl butyrate were put into the above container. The container was set in a planetary ball mill P-7 (product name, manufactured by FRITSCH) and the components were stirred for 60 minutes at 25° C. and a rotation speed of 300 rpm. Then, 7.0 g of $LiNi_{1/3}Co_{1/3}Mn_{1/3}O_2$ (NMC) was put into the container as the positive electrode active material, and similarly, the container was set in a planetary ball mill P-7, mixing was continued at 25° C. and a rotation speed of 100 rpm for 5 minutes to prepare a positive electrode composition.

—Production of Positive Electrode Sheet for all-Solid State Secondary Battery—

The positive electrode composition obtained as described above was applied onto an aluminum foil (a positive electrode collector) having a thickness of 20 m with a baker type applicator (product name: SA-201, manufactured by Tester Sangyo Co., Ltd.), heating was carried out at 100° C. for 2 hours to dry (to remove the dispersion medium) the positive electrode composition. Then, using a heat press machine, the dried positive electrode composition was pressurized (10 MPa, 1 minute) at 25° C. to produce each of positive electrode sheets for an all-solid state secondary battery, having a positive electrode active material layer having a film thickness of 80 m.

Each of all-solid state secondary batteries Nos. 116 to 131 and c112 to c122 was manufactured in the same manner as in the manufacturing of the all-solid state secondary battery No. 115, except that in the manufacturing of the all-solid state secondary battery No. 115, a negative electrode sheet for an all-solid state secondary battery, which has a solid electrolyte layer and is indicated by No. shown in the column of "Electrode active material layer (sheet No.)" of Table 4 was used instead of the negative electrode sheet No. 115 for an all-solid state secondary battery, which has a solid electrolyte layer.

<Evaluation 3: Ion Conductivity Measurement>

The ion conductivity of each of the manufactured all-solid state secondary batteries was measured. Specifically, the alternating-current impedance of each of the all-solid state secondary batteries was measured in a constant-temperature tank (25° C.) using a 1255B FREQUENCY RESPONSE ANALYZER (product name, manufactured by SOLARTRON Analytical) at a voltage magnitude of 5 mV and a frequency of 1 MHz to 1 Hz. From the measurement result, the resistance of the sample for measuring ion conductivity in the layer thickness direction was determined, and the ion conductivity was determined by the calculation according to Expression (1).

$$\text{Ion conductivity } \sigma\ (\text{mS/cm}) = 1{,}000 \times \text{sample layer thickness (cm)}/[\text{resistance } (\Omega) \times \text{sample area } (\text{cm}^2)] \qquad \text{Expression (1)}$$

In Expression (1), the sample layer thickness is a value obtained by measuring the thickness before placing the laminate 12 in the 2032-type coin case 11 and subtracting the thickness of the collector (the total layer thickness of the solid electrolyte layer and the electrode active material layer). The sample area is the area of the disk-shaped sheet having a diameter of 14.5 mm.

It was determined whether the obtained ion conductivity a was included in any of the following evaluation standards.

In this test, in a case where the evaluation standard is "D" or higher, the ion conductivity σ is the pass level.

—Evaluation Standards—

A: $0.60 \leq \sigma$

B: $0.50 \leq \sigma < 0.60$

C: $0.40 \leq \sigma < 0.50$

D: $0.30 \leq \sigma < 0.40$

E: $0.20 \leq \sigma < 0.30$

F: $\sigma < 0.20$

TABLE 4

| No. | Layer configuration: Electrode active material layer (sheet No.) | Solid electrolyte layer (sheet No.) | Ion conductivity | Note |
|---|---|---|---|---|
| 101 | 101 | K-1 | A | Present invention |
| 102 | 102 | K-1 | B | Present invention |
| 103 | 103 | K-1 | B | Present invention |
| 104 | 104 | K-1 | B | Present invention |
| 105 | 105 | K-1 | A | Present invention |
| 106 | 106 | K-1 | B | Present invention |
| 107 | 107 | K-1 | A | Present invention |
| 108 | 108 | K-1 | A | Present invention |
| 109 | 109 | K-1 | B | Present invention |
| 110 | 110 | K-1 | A | Present invention |
| 111 | 111 | K-1 | A | Present invention |
| 112 | 112 | K-1 | B | Present invention |
| 113 | 113 | K-1 | A | Present invention |
| 114 | 114 | K-1 | A | Present invention |
| 115 | 115 | K-1 | A | Present invention |
| 116 | 116 | K-1 | B | Present invention |
| 117 | 117 | K-1 | B | Present invention |
| 118 | 118 | K-1 | B | Present invention |
| 119 | 119 | K-1 | A | Present invention |
| 120 | 120 | K-1 | B | Present invention |
| 121 | 121 | K-1 | A | Present invention |
| 122 | 122 | K-1 | A | Present invention |
| 123 | 123 | K-1 | B | Present invention |
| 124 | 124 | K-1 | A | Present invention |
| 125 | 125 | K-1 | A | Present invention |
| 126 | 126 | K-1 | B | Present invention |
| 127 | 127 | K-1 | A | Present invention |
| 128 | 128 | K-1 | A | Present invention |
| 129 | 129 | K-1 | A | Present invention |
| 130 | 130 | K-1 | A | Present invention |
| 131 | 131 | K-1 | B | Present invention |
| c101 | c11 | K-1 | E | Comparative Example |
| c102 | c12 | K-1 | E | Comparative Example |
| c103 | c13 | K-1 | E | Comparative Example |
| c104 | c14 | K-1 | E | Comparative Example |
| c105 | c15 | K-1 | E | Comparative Example |
| c106 | c16 | K-1 | F | Comparative Example |
| c107 | c17 | K-1 | D | Comparative Example |
| c108 | c18 | K-1 | D | Comparative Example |
| c109 | c19 | K-1 | D | Comparative Example |
| c110 | c20 | K-1 | D | Comparative Example |
| c111 | c21 | K-1 | D | Comparative Example |
| c112 | c22 | K-1 | E | Comparative Example |
| c113 | c23 | K-1 | E | Comparative Example |
| c114 | c24 | K-1 | E | Comparative Example |
| c115 | c25 | K-1 | E | Comparative Example |
| c116 | c26 | K-1 | E | Comparative Example |
| c117 | c27 | K-1 | F | Comparative Example |
| c118 | c28 | K-1 | E | Comparative Example |
| c119 | c29 | K-1 | E | Comparative Example |
| c120 | c30 | K-1 | E | Comparative Example |
| c121 | c31 | K-1 | E | Comparative Example |
| c122 | c32 | K-1 | E | Comparative Example |

The following findings can be seen from the results of Table 3 and Table 4.

In the electrode compositions PKc21 to PKc31 and NKc21 to NKc31 of Comparative Examples, which do not satisfy the above-described relationship defined in the present invention, it is not possible to achieve a balance between the suppression of coating unevenness, the suppression of dripping, and the improvement of ion conductivity of an all-solid state secondary battery. This point also applies to the electrode compositions PKc29, PKc31, NKc29, and NKc31 of Comparative Examples, which contain a polymer binder consisting of the crosslinked polymer T-7.

On the other hand, in the electrode compositions PK-1 to PK-14 and NK-1 to NK-17 according to the embodiment of the present invention, which contain the polymer binder defined in the present invention and furthermore, satisfy the above-described relationship defined in the present invention, it is possible to form an active material layer having a predetermined shape, in which coating unevenness and dripping are suppressed and which is uniform and has an increased layer thickness even in a case where the active material layer is applied to a film forming method. In a case of using these electrode compositions for forming an active material layer of an all-solid state secondary battery, it is possible to realize a high ion conductivity (low resistance) for an all-solid state secondary battery to be obtained. From these results, it can be seen that it is possible to suppress coating unevenness and dripping and to form an active material layer capable of realizing a high ion conductivity even in a case of increasing the concentration of solid contents of the electrode composition according to the embodiment of the present invention or even in a case of increasing the coating amount of the electrode composition according to the embodiment of the present invention.

The present invention has been described together with the embodiments of the present invention. However, the inventors of the present invention do not intend to limit the present invention in any part of the details of the description unless otherwise designated, and it is conceived that the present invention should be broadly construed without departing from the spirit and scope of the invention shown in the attached “WHAT IS CLAIMED IS”.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: 2032-type coin case
12: laminate for all-solid state secondary battery
13: coin-type all-solid state secondary battery
TP: test piece

What is claimed is:

1. An electrode composition comprising:

an inorganic solid electrolyte having an ion conductivity of a metal belonging to Group 1 or Group 2 in the periodic table;

an active material;

a polymer binder; and a dispersion medium, wherein a linear polymer is contained to constitute the polymer binder, and a rotation radius $\alpha$ of the polymer binder in the dispersion medium and a median diameter $D_{50}$ obtained by converting, in terms of content, each of median diameters of the inorganic solid electrolyte and the active material are present within a region (provided that a boundary line is included) of a polygonal shape that has, as apices, a point A (50, 60), a point B (178, 4,600), a point C (85, 4,600), a point D (12, 2,000), and a point E (12, 60) in an orthogonal coordinate system in which the rotation radius $\alpha$ is on an x-axis and the median diameter $D_{50}$ is on a y-axis, wherein the rotation radius $\alpha$ is calculated by a Zimm plot created based on Expression (I), and from a slope of $q^2$ obtained when the zero concentration extrapolation ($c\rightarrow 0$) has been carried out:

$$Kc/R_\theta = \frac{1}{M_w}\left(1 + \frac{1}{3}\alpha^2 q^2 + O(q^4)\right) + 2A_2 c + O(c^2) \quad \text{Expression (I)}$$

wherein in Expression (I), K is an optical constant, c is a polymer concentration of the polymer binder, $R_\theta$ is an excess Rayleigh ratio, Mw is a mass average molecular weight of the polymer binder, q is a scattering vector, $A_2$ is a second virial coefficient, and the median diameter $D_{50}$ is calculated by the following formula:

median diameter $D_{50}$ in nm=$(D_{S-50}\times W_S)+(D_{A-50}\times W_A)$, whereby $D_{S-50}$ indicates the median diameter of the inorganic solid electrolyte, $D_{A-50}$ indicates the median diameter of the active material, $W_S$ indicate the mass fraction of the inorganic solid electrolyte with respect to the total mass of the inorganic solid electrolyte and the active material in the electrode composition, and $W_A$ indicate the mass fraction of the active material with respect to the total mass of the inorganic solid electrolyte and the active material in the electrode composition.

2. The electrode composition according to claim 1, wherein an SP value of the linear polymer is 16 to 20 $MPa^{1/2}$.

3. The electrode composition according to claim 1, wherein an adsorption rate of the polymer binder with respect to the active material in the dispersion medium is 40% or less.

4. The electrode composition according to claim 1, wherein the linear polymer contains a constitutional component having a functional group having a pKa of 8 or less.

5. The electrode composition according to claim 1, wherein the polymer binder is dissolved in the dispersion medium.

6. The electrode composition according to claim 1, wherein the active material has a silicon element as a constitutional element.

7. The electrode composition according to claim 1, wherein the inorganic solid electrolyte is a sulfide-based inorganic solid electrolyte.

8. The electrode composition according to claim 1, wherein an SP value of the dispersion medium is 14 to 24 $MPa^{1/2}$.

9. An electrode sheet for an all-solid state secondary battery, comprising a layer formed of the electrode composition according to claim 1, on a surface of a base material.

10. An all-solid state secondary battery comprising, in the following order:

a positive electrode active material layer;

a solid electrolyte layer; and a negative electrode active material layer, wherein at least one layer of the positive electrode active material layer or the negative electrode active material layer is a layer formed of the electrode composition according to claim 1.

11. A manufacturing method for an electrode sheet for an all-solid state secondary battery, the manufacturing method comprising forming a film of the electrode composition according to claim 1, on a surface of a base material.

12. A manufacturing method for an all-solid state secondary battery, the manufacturing method comprising manufacturing an all-solid state secondary battery through the manufacturing method according to claim 11.

* * * * *